US006566833B2

(12) United States Patent
Bartlett

(10) Patent No.: US 6,566,833 B2
(45) Date of Patent: May 20, 2003

(54) PRONE POSITIONING THERAPEUTIC BED

(75) Inventor: Alan L. Bartlett, New Braunfels, TX (US)

(73) Assignee: KCI Licensing, Inc., San Antonio, TX (US)

( * ) Notice: Subject to any disclaimer, the term of this patent is extended or adjusted under 35 U.S.C. 154(b) by 0 days.

(21) Appl. No.: 09/884,749

(22) Filed: Jun. 19, 2001

(65) Prior Publication Data

US 2002/0138905 A1 Oct. 3, 2002

Related U.S. Application Data

(63) Continuation-in-part of application No. 09/821,552, filed on Mar. 29, 2001.

(51) Int. Cl.[7] .......................... A61G 7/008; G05B 9/03

(52) U.S. Cl. ............................... 318/564; 5/600; 5/609

(58) Field of Search .......................... 318/16, 563, 564, 318/565; 388/909; 5/600, 609

(56) References Cited

U.S. PATENT DOCUMENTS

| | | | | |
|---|---|---|---|---|
| 3,434,165 A | | 3/1969 | Keane | |
| 3,827,089 A | | 8/1974 | Grow | |
| 4,751,754 A | | 6/1988 | Bailey | |
| 4,827,541 A | | 5/1989 | Vollman | |
| 4,868,937 A | | 9/1989 | Connolly | |
| 4,953,243 A | | 9/1990 | Birkmann | |
| 5,224,226 A | | 7/1993 | Groenewald | |
| 5,244,231 A | | 9/1993 | Bauer | |
| 5,335,313 A | * | 8/1994 | Douglas | 395/2.84 |
| 5,497,518 A | | 3/1996 | Iura | |
| 5,611,096 A | | 3/1997 | Bartlett | |
| 5,627,512 A | | 5/1997 | Bogar | |
| 5,664,270 A | * | 9/1997 | Bell et al. | 5/600 |
| 5,666,104 A | | 9/1997 | Pollack | |
| 5,778,887 A | | 7/1998 | Curtiss | |
| 5,831,221 A | | 11/1998 | Geringer | |
| 5,864,291 A | | 1/1999 | Walton | |
| 5,867,639 A | * | 2/1999 | Tuilier et al. | 395/182.04 |
| 6,282,736 B1 | | 9/2001 | Hand et al. | |

FOREIGN PATENT DOCUMENTS

| | | |
|---|---|---|
| WO | WO 96/27356 | 9/1996 |
| WO | WO 97/22323 | 6/1997 |
| WO | WO 00/07320 | 2/1999 |
| WO | WO 99/62454 | 12/1999 |
| WO | WO 00/00152 | 1/2000 |
| WO | WO 00/62731 | 10/2000 |

OTHER PUBLICATIONS

J. Mahlke, Continuous Axial Rotation in prone Position—Clincial Experiences with a new Kinetic Device for Patients with Respiratory Distress, Abstract, date and other bibliographic information unknown.

R.J. Stiletto MD, Computer–Supported Continuous Axial Rotation Therapy in Prone Position for complex Poly-Trauma Patients with ARDS, date and other bibliographic unknown.

(List continued on next page.)

*Primary Examiner*—Bentsu Ro

(57) ABSTRACT

A prone positioning therapeutic bed comprises a base frame and a patient support platform rotatably mounted on the base frame for rotational movement about a longitudinal rotational axis and a drive system for rotating the patient support platform on the base frame. A special head restraint apparatus maintains proper patient alignment during rotation. A weight monitoring system monitors a patient's weight over time. A touch screen user interface provides programmable therapy settings and displays statistics about past treatment. Circuitry is provided to minimize the risk that the failure of any single device or software program could endanger a patient. A "CPR" button is provided to arrest any program of therapy and return the patient support platform to a supine position.

31 Claims, 40 Drawing Sheets

OTHER PUBLICATIONS

R.J. Stiletto, The Role of Kinetic Therapy in the Treatment of Posttraumatic Respiratory Failure, http://www.med.uni–marburg.de/unfchir/forschung/f_lungentr_2.html, date and other bibliographic information unknown.

Barbara S. Marion, BSN, A Turn for the Better: 'Prone Positioning' of Patients with ARDS, American Journal of Nursing, v. 101 n.5, May 26, 2001, p. 26.

"Energy Chain Systems", IGUS Catalog, pp. 1.36–1.39; May 2000.

R. Stiletto, Kinetische Therapie zur Therapie und Prophylaxe der posttraumatischen Lungeninsuffizienz, Der Unfallchirung 12–2000, pp. 1057–1064. Relevance: Discusses Kinetic Therapy.

* cited by examiner

| | | | |
|---|---|---|---|
| rotational position | status:stopped,parked, rotating,paused | total time on bed | Matrix Data |
| Trendelenburg position | center pause time supine | today's time in prone > 40° | prone/supine overshoot in degrees |
| right therapy setting (supine) | right pause time supine | total time in prone > 40° | delay time after screen transition |
| left therapy setting (supine) | left pause time supine | total time prone from 90°-270° | total weight on load cells |
| right therapy setting (prone) | center pause time prone | today's time in supine > 40° | time since AC power loss |
| left therapy setting (prone) | right pause time prone | total time in supine > 40° | time since lock pin was pushed in |
| current position (prone or supine) | left pause time prone | total time supine from 90° - 270° | time since lock pin was locked at 0° |
| head lift jack position | move direction | resume flag | weight trend filename |
| foot lift jack position | acclimate: on or off | head current | foot current |
| current screen | time since last data matrix file save | saved for future data | current date |
| time at current screen in minutes | status time | saved for future data | current time |
| saved for future data | rotate current | saved for future data | pounds or kilograms |
| saved for future data | data file filename | saved for future data | current weight on bed |
| saved for future data | last data file filename | saved for future data | Supine > 40° |
| initial weight trend date | initial weight trend time | initial weight trend weight | weigh delay flag |
| current weight trend date | current weight trend time | current weight trend weight | weight hold flag |

Fig. 44

840

PRONE POSITIONING THERAPEUTIC BED

RELATED APPLICATION INFORMATION

This application is a continuation in part of and commonly assigned application for Letters Patent Ser. No. 09/821,552 filed Mar. 29, 2001, entitled "PRONE POSITIONING THERAPEUTIC BED."

BACKGROUND OF THE INVENTION

1. Field of the Invention

This invention relates generally to therapeutic beds, and more particularly to an improved rotating bed capable of placing a patient in a prone position.

2. Long-felt Needs and Description of the Related Art

Patient positioning has been used in hospital beds for some time to enhance patient comfort, prevent skin breakdown, improve drainage of bodily fluids, and facilitate breathing. One of the goals of patient positioning has been maximization of ventilation to improve systematic oxygenation. Various studies have demonstrated the beneficial effects of body positioning and mobilization on impaired oxygen transport. The support of patients in a prone position can be advantageous in enhancing extension and ventilation of the dorsal aspect of the lungs.

Proning has been recognized and studied as a method for treating acute respiratory distress syndrome "ARDS") for more than twenty-five years. Some studies indicate that approximately three quarters of patients with ARDS will respond with improved arterial oxygenation when moved from the supine to the prone position.

There are several physiological bases for patient proning. When a person lies flat in the supine position, the heart and sternum lie on top of and compress the lung volume beneath it. Moreover, the abdominal contents push upward against the diaphragm and further compress and increase the pressures on the most dorsal lung units, where perfusion (i.e., blood flow volume reaching alveolocapillary membranes) is greatest. In an ARDS patient, ventilation in these dorsal regions is inhibited by fluid and cellular debris that settle into the most dependent lung segments. Lung edema may further increase the plural pressures.in the most dependent regions. The combination of fluid accumulation with compression by the heart, sternum, and abdominal contents on the dorsal regions of the lung results in a significant ventilation-perfusion mismatch. Expressed more simply, the air entering the patient's lungs is not reaching those parts of the lungs (the dorsal regions where perfusion is greatest) that most need it.

Flipping a patient into the prone position improves arterial oxygenation through several mechanisms. First, moving the fluid-filled lungs into a nondependent ventral position facilitates drainage of the fluid and cellular debris that had accumulated in and blocked ventilation to the dorsal regions of the lung. Second, the weight of the heart is supported by the sternum, rather than the lungs. When a patient is in the supine position, as much as 25–44% of the lung volume may be displaced by the heart, especially if the heart is enlarged due to cardiovascular disease. Rotating the patient into the prone position can reduce that displacement to as little as 1–4% of lung volume. Third, if the patient is supported in the prone position in a manner that allows the abdomen to protrude, then the abdominal contents no longer push upward onto the diaphragm to compress the lungs.

Proning minimizes the mechanical forces that pressurize distressed alveolar units into collapse, and can also recruit atelectatic but functional units for gas exchange. Proning also causes changes in pleural pressures, which encourages more uniform distribution of ventilation within the lungs. Proning often reduces the intrapulmonary shunt (defined as the portion of blood that enters the left side of the heart without exchanging gases with alveolar gases) and improves arterial oxygenation. The results of proning can be immediate, resulting in significantly improved oxygenation in as little as one hour.

Despite its promises, prone positioning has not been widely practiced on patients because, due to the inadequacies of prior art devices, it is a difficult and labor-intensive process. Logistically, moving a patient to the prone position using prior art technology requires careful planning, coordination, and teamwork to prevent complications such as inadvertent extubation and loss of invasive lines and tubes.

Even when precautions are taken, proning using prior art technology is fraught with potential complications. For example, it is difficult to provide cardiopulmonary resuscitation ("CPR") to a patient lying in the prone position. Critical time may have to be spent recruiting a team of personnel to move the patient from the prone to the supine position before performing CPR. Accordingly, there is a need for a motor-operated proning device that will quickly rotate a proned patient from the prone position to the supine position. There is also a need for a system that enables a fast, one-step operation to cause the motor-operated proning device to rotate the patient back to a supine position.

A frequently cited complication with prone positioning is the development of pressure ulcers, especially on the forehead, chin, and upper chest wall. Immobility in the prone position can also result in breast and penile breakdown. Some of the most difficult areas to manage in the prone position are the head, face, eyes, and arms. Increased incidence of eye infection due to drainage, corneal abrasions, and even blindness caused by increased intraocular pressure have been reported as a consequence of prone positioning. Also, immobility and pressure on the arms have been reported to result in peripheral nerve injury and contractures. Accordingly, there is a need for a proning device that minimizes the risk of pressure-related complications.

Prone positioning using many prior art methods and devices has caused chest tubes, invasive lines, and infusions to become kinked. Worse, the rotation of a patient from the supine to the prone position on some beds has been reported to result in inadvertent extubation and decannulation, which can have catastrophic consequences. Accordingly, there is a need for a proning device with a patient line care management system that will minimize the risk of extubation, decannulation, or kinking of patient care lines.

Proning can also increase the risk of aspiration of gastric acid, food, or other foreign material into the lungs. Aspiration of gastric acid can result in severe pneumonia. Another complication, much more frequent than aspiration, is dependent edema. Most critically ill intensive care unit patients develop dependent edema. When moved into the prone position, the face is put into a dependent position, which often results in significant facial edema. Accordingly, there is a need for a proning device that will minimize aspiration and facial edema.

There are many prior art devices used to facilitate patient proning. One example is the Vollman Prone Device™, made by the Hill-Rom Co., Inc.®. The Vollman Prone Device comprises a set of foam pads to support the patient's head, chest, and pelvis and which are secured to a patient with straps, belts, and buckles while the patient in the supine position. After the foam pads are secured, the patient is manually rotated into the prone position on a regular hospital mattress. Of course, no special device is needed to place a patient in the prone position. Towels, blankets, egg crate mattresses, and foam positioning pads can be used to help maintain proper alignment in the prone position.

One difficulty with devices such as the Vollman Prone Device is that several personnel are still required to turn the patient over. Moreover, medical personnel must revisit the patient frequently to turn the patient toward different positions to prevent pressure sores and other complications from developing.

To make it easier to turn a patient into the prone position, other prior art devices have been provided comprising a rotatable frame to rotate a patient into the prone position. The Stryker Wedge® Turning Frame, for example, comprises a rotatable frame having a supine support surface and a prone support surface in between which a patient is wedged. The frame is manually rotated into the desired position. But the frame still suffers several shortcomings. One of its shortcomings, as with other manually-operated prior art proning devices, is inadequate compliance by medical personnel. Because it is difficult and labor intensive to manually operate a proning bed, many doctors do not begin proning ARDS patients until late in the course of the patient's disease process, after other recruitment measures have failed. However, there is a general consensus that if prone positioning is provided earlier, in the more exudative stages of ARDS, a patient will be more likely to respond positively. Accordingly, there is a need for a therapeutic bed that makes it simpler and less labor-intensive for medical personnel to prone a patient.

Another problem with manually-operated prior art beds such as the Stryker Wedge Frame is that unless manually rocked back and forth, patients will be left immobile, in a fixed position, for extended periods of time. Immobility leads to many of the complications discussed above that hinder the widespread adoption of prone positioning as a therapy for ARDS patients. Accordingly, there is a need for a therapeutic bed that provides not only prone positioning but also automated alternating side-to-side rotational therapy to intermittently relieve pressure from the dependent surfaces of the body.

Other beds made by Kinetic Concepts, Inc.®, such as the TriaDyne® II, also facilitate prone positioning. Specially designed proning cushions have been provided to accommodate moving a patient to the prone position and maintaining the patient there. The TriaDyne's low air loss pressure relief surface reduces the risk of certain complications like skin breakdown. While the TriaDyne has many benefits, its protocol calls for a team of about 5 to 8 people to move a patient from the supine to the prone position. One person should be assigned at the head of the bed to secure and manage the airway during the maneuver. The procedure also calls for the team to disconnect as many of the invasive lines as possible to simply the procedure, and then reconnect them when the patient has been placed in the prone position. Caution must be exercised with head positioning to prevent applying pressure directly to the eyes, ears, or endotracheal tube.

While it is possible to program the TriaDyne to perform continuous lateral rotation therapy while the patient is in the prone position, the TriaDyne is incapable of automatically rotating the patient from the supine to the prone position, and from there applying kinetic therapy. Moreover, the arc of rotation in the prone position is limited because of the absence of restraints to keep the patient centered on the bed while turning to a significant angle from the prone position. In practice, the range of motion in the TriaDyne is generally limited to no more than 30 degrees to the left and right of prone. The Centers for Disease Control ("CDC") defines kinetic therapy as lateral rotation of greater than 40 degrees to the horizontal left and right, or an arc of at least 80 degrees.

Moreover, the TriaDyne and many other beds are not capable of rotation beyond 62 degrees from even the supine position, much less so from the prone position, because the beds lack restraints to hold the patient on the bed. It is the belief of the inventors that further therapeutic benefits could be obtained by rotating patients to angle limits beyond 62 degrees in either direction, to, for example, 90 degrees or more in either direction, in order to recruit further areas of a collapsed lung to participate in gas exchange, and also to further reduce pressure on the dorsal regions of the patient's body. Accordingly, there is a need for a therapeutic bed that can automatically rotate a patient from the supine to the prone position and back, and that is capable of providing kinetic therapy (i.e., with an arc of at least 80 degrees) while still securing the patient to the center of the bed.

Another type of prone positioning bed comprises a base frame, a patient support platform rotatably mounted on the base frame for rotational movement about a longitudinal rotational axis of the patient support platform, and a drive system for rotating the patient support platform on the base frame. Such therapeutic beds are described in international patent applications having publication numbers WO 97/22323 and WO 99/62454. This type of bed is particularly advantageous for the treatment of patients with severe respiratory problems. Preferably, as described in publication number WO 99/62454, each end of the bed has a central opening at or near the longitudinal rotational axis of the patient support platform for efficiently managing the numerous patient care lines that are generally necessary for treating a patient on the patient support platform.

In the therapeutic bed of WO 99/62454, the central opening for receiving patient care lines at the head of the bed is provided by a continuous upright end ring, which also serves as a means for rotatably mounting the patient support platform on rollers. One drawback of such an arrangement is that the continuous end ring obstructs access to the head of the patient. Additionally, the initial placement of a patient on the bed requires disconnection of all patient care lines, and to remove a patient care line from the end ring requires that one end of the patient care line be unplugged from either the patient or the piece of equipment to which the line is attached, which can be very inconvenient and may jeopardize the patient, depending on the particular condition of the patient.

To retain a patient on the patient support platform in the prone position, the bed of WO 99/62454 has a pair of side rails fixedly mounted to the patient support platform in an upright position using stanchions and complementary sockets. A plurality of patient support packs are pivotally mounted on the side rails, and associated straps are buckled over the patient to hold the patient in place. Although the patient support packs may be flipped to the outside of the bed to uncover the patient in the supine position, the side rails remain upright and thus obstruct access to the patient in the supine position. To improve access to the patient in the supine position, it would be desirable to be able to move the side rails completely out of the way without removing them from the bed. Also, it would be advantageous to have a reliable way to ascertain whether the straps that buckle over the patient are properly tensioned to support the patient prior to moving the patient to the prone position.

One of the problems in the art of prone positioning therapeutic beds is to provide electrical connections to the bed for both the power and controller equipment that moves the bed and for the patient monitoring systems on the bed. To allow unrestricted rotation of the bed of WO 99/62454, electrical power has been provided by wire brushes at the interface between the rotating part of the bed and the nonrotating part of the bed. However, due to vibration and other abrupt movements, such wire brushes cause problems of electrical intermittence, which can be detrimental to the therapy of the patient. A direct, wired electrical connection would be preferable to eliminate such intermittence, provided that the wired electrical connection is capable of articulation during movement of the rotating part of the bed into the prone position.

Another problem in the field of prone positioning beds is to sufficiently support the head of a patient during rotation. In the past, elastic straps have been stretched across the patient's head to secure the head to the patient support platform. However, such straps are generally uncomfortable for the patient and do not provide sufficient lateral support for the patient's head. Additionally, such straps do not provide sufficient adjustability. It would be a significant improvement to provide a comfortable, adjustable head restraint that supports the patient's head both laterally and vertically.

Typically, prone positioning beds have lateral support pads for supporting the sides or legs of the patient during rotation. It is known in the art for such lateral support pads to be laterally adjustable. For purposes of rotational stability, it is desirable for the patient to be centered on the patient support platform. Therefore, it would be an advancement in the art to provide adjustable lateral support pads that automatically center the patient on the patient support platform. In conjunction with automatically centering lateral support pads, it would also be an advancement to provide symmetric leg abductors.

As mentioned above, prone positioning beds preferably have a drive system for rotating the patient support platform on the base frame. However, such drive systems generally prevent manual rotation of the patient support platform by medical personnel. If a patient develops an emergency condition, such as the need for CPR, while the bed is in a position other than the supine position, the drive system must be used to rotate the bed back to the supine position before administering appropriate care to the patient. Because the drive systems are subject to mechanical and electrical failures, it would be advantageous to provide a back-up means for quick, manual rotation of the patient support platform in emergency conditions.

Prone positioning beds also preferably have a locking mechanism to lock the patient support platform in a desired rotational position. One known locking mechanism comprises a lock pin longitudinally mounted in the base frame that is insertable into a corresponding hole on the patient support platform. However, such lock pins may be jostled loose under the influence of vibration and other abrupt movements of the bed. It would be an improvement to provide a means to prevent accidental disengagement or locking of the lock pin.

It is also known in the art of prone positioning beds to provide a sensor for determining and controlling the rotational position of the patient support platform. As taught in WO 99/62454, the rotational position of the patient support platform may be monitored and controlled by a rotary opto encoder of the type described therein. However, such a rotary opto encoder is fairly cumbersome and must be reinitialized by moving to an index location in the event of power interruptions. It would be more desirable to provide a simple and reliable sensor that determines angle positioning relative to a fixed reference to control the rotational position of the patient support platform.

Medical personnel often consider it valuable to monitor a patient's weight during the course of medical treatment. Many hospital beds have been designed and used that include weight scales to detect the combined weight of a patient and any accessories or equipment placed on the bed. Many of these beds sum the outputs of three or more load cells in analog and convert the summed analog signal to a digital value to detect the total weight borne by the load cells. Load cells, however, can malfunction, especially if they have experienced significant vibration or shock during transportation. However, it is difficult to detect when only one out of four or more load cells is malfunctioning if only the combined output is measured. Accordingly, there is a need for a weight monitoring system that evaluates the output of each load cell to detect malfunctioning load cells.

Because different doctors may develop different preferences for certain therapy settings, there is also a need for memory capabilities that enable medical personnel to program a course of therapy and to store it in memory for later retrieval and use. Because research studies on the benefits of kinetic therapy, prone positioning, or a combination of the two need to be based upon a consistent, pre-defined study-wide therapy protocol, there is a need for a data input interface that allows researchers to import a predefined protocol for operating the bed. Because it is important to monitor and record the effect that a course of kinetic, prone, or supine therapy, or some combination of them, has on a patient's condition, there is also a need for a data output interface for relaying or permanently recording the course of therapy given to a patient. These are all long-felt needs that have been unmet or insufficiently met by prior art devices.

Through research and innovation, the inventors overcame numerous other challenges in developing the present invention. To prevent an operating system crash from causing unplanned rotation of the bed, which could be dangerous if a patient is not adequately secured, a redundant hardware and software design is needed so that no single hardware or software failure will result in a condition that would be harmful to the patient. There is also a need for a therapeutic bed that has a suitable user interface for operating, monitoring, and standardizing its various functions.

SUMMARY OF THE INVENTION

A therapeutic bed in accordance with the present invention is directed to solving the aforementioned problems. The bed is a prone positioning bed comprising a base frame, a patient support platform rotatably mounted on the base frame for rotational movement about a longitudinal rotational axis of the patient support platform, and a drive system for rotating the patient support platform on the base frame. The surface of the patient support platform is comprised of one or more honeycomb composite core panels, a lightweight yet strong material that is also radiolucent. A fan may be mounted on the patient support platform proximate the foot end ring to provide ventilation to a patient's legs. A camera may also be mounted on the patient support platform proximate the head end ring to capture images of a patient's face.

An upright end ring at the head end of the bed is split into an upper section and a lower section. The upper section is removable from the lower section to allow improved access to the head of the patient and to allow placement or removal of the patient from the bed by removal of patient care lines from the end ring without removing the patient care lines from the patient or the equipment to which the lines are attached. A slotted wheel may be used as an alternative to the upright end ring, where the wheel has an outer perimeter, a center, and a slot extending from the outer perimeter to the center for routing patient care lines. Likewise, at the foot end of the bed, an opening is provided that is of sufficient size to permit passing of various patient connected devices, such as foley bags, through the opening without disconnecting the devices from the patient.

The therapeutic bed is mounted on the base frame by placing the upright end rings on a plurality of rollers rotatably mounted on a plurality of respective axles protruding from the base frame. To account for minor tolerances in the manufacturing and assembly of the patient support platform or base frame, all but one of the rollers is laterally slidable along its respective axle.

Additionally, the bed is provided with pivotally mounted side rails that may be folded neatly out of the way underneath the patient support platform for improved access to the patient in the supine position. Straps are provided to secure the opposing side rails over the patient before rotation into the prone position. Preferably, a pressure-sensitive tape switch is mounted on the patient support platform adjacent each side rail. When the side rail straps are properly tensioned, the side rails engage the tape switches, which allows the patient support platform to be rotated into the prone position. Alternatively, the straps that secure the opposing side rails over the patient may be connected to the patient support platform with tension-sensitive strap connectors that provide an indication of whether the straps are sufficiently tensioned before the patient is rotated into the prone position. The tension-sensitive strap connectors provide both a visual indication and an electrical signal that may be used by a controller to control the rotation of the patient support platform.

The present invention also incorporates a direct, wired electrical connection to the patient support platform while still allowing full rotation of the patient support platform in either direction. The necessary electrical wires are housed within a chain-like cable carrier that is disposed within an annular channel attached to the patient support platform. An annular cover is installed adjacent the annular channel to retain the cable carrier within the annular channel, but the annular cover is not attached to the annular channel. Rather, the annular cover is attached to the nonrotating part of the bed. One end of the cable carrier is attached to the annular channel, and the other end is attached to the annular cover. The length of the cable carrier is sufficient to allow a full 360 degrees rotation of the patient support platform in either direction from 0 degrees supine flat while maintaining a direct electrical connection.

More preferably, the direct, wired electrical connection to the patient support platform may be provided with a flexible printed circuit board (PCB) in lieu of a chain-like cable carrier. The flexible PCB resides within an annular channel attached to the patient support platform, and an annular cover is fastened to a flange of the annular channel such that a gap exists between the annular channel and the annular cover around the outer periphery. One end of the flexible PCB is attached to the annular channel, which provides power and electrical signals to the rotating part of the bed, and the other end of the flexible PCB passes through the gap between the annular channel and the annular cover and is connected to the electrical apparatus on the nonrotating part of the bed. Like the cable carrier mentioned above, the flexible PCB has a length sufficient to allow a full 360 degrees rotation of the patient support platform in either direction while maintaining a direct electrical connection between the nonrotating and rotating parts of the bed. To ensure that the wired electrical connection is not articulated beyond its physical limit as a result of manually rotating the bed in the emergency backup mode, a mechanical stop is provided to limit rotation of the patient support platform to about 365 degrees. Sensors are provided to detect activation of the mechanical stop.

A pair of adjustable head restraints are provided for the therapeutic bed. Each head restraint, which is slidably mounted on transverse rails of the patient support platform, includes a clamping mechanism that fixes the position of the head restraint both vertically and laterally through the operation of a single lever. Each head restraint includes a pad that comfortably supports the front and side of the patient's head.

As an alternative to the pair of adjustable head restraints, a head restraint apparatus is provided comprising a casing having a closed bottom end, an open top end, and an open front end. The casing, which is configured to substantially encompass the back and sides of a person's head, encloses a cavity for receiving a person's head resting in a supine position. A face piece configured to restrain at least a portion of the front of a person's head is also provided for removable attachment to the top end of the casing. Optionally, the casing comprises left and right side members hingedly connected to a headrest member, so that a patient's head can easily be placed on and removed from the casing by swinging the right and left side members outwardly from the casing. Openings are also provided in the right and left sides of the casing to provide access to a patient's ears.

The casing may be pivotally mounted on a gas strut in order to enable limited movement of the head of a person being laterally rotated on the therapeutic bed. The casing may also be mounted on a guide member that mounts the casing to the bed and provides adjustable lateral and longitudinal positioning of the casing with respect to the bed.

A therapeutic bed in accordance with the present invention further includes a pair of symmetrically mounted lateral support pads or adductors that serve to automatically center the patient on the patient support platform. The lateral support pads are symmetrically mounted to a threaded rod that is transversely mounted to the patient support platform. The threaded rod has right-hand threads on one side and left-hand threads on the other side. One of the lateral support pads is mounted to the right-hand threaded portion of the threaded rod, and the other lateral support pad is mounted to the left-hand threaded portion of the threaded rod. By rotating the threaded rod in the desired direction, the lateral support pads may be moved symmetrically toward or away from the patient. Similarly, a preferred bed also includes a pair of leg abductors that are mounted with a threaded rod in like manner as the lateral support pads.

A motor and shaft brake are provided to safely drive the therapeutic bed of the present invention. The brake engages and impedes rotation of the motor's shaft unless power is supplied to the brake. Therefore, if there is a fault in the system providing power to the therapeutic bed, the brake will arrest movement of the patient support platform.

The present therapeutic bed also preferably has a quick release mechanism for manually disengaging the patient support platform from the drive system. The quick release mechanism preferably comprises a manually operable lever and linkage that cooperate to push and pull a shaft to which a roller is mounted. The roller may thus be brought into or out of engagement with the belt of the drive system. When the roller is disengaged from the drive belt, the patient support platform may be manually rotated, which is useful in emergency conditions such as CPR.

The present bed further includes a lock pin mounted to the base frame that is insertable into a cooperating hole of a locking ring on the patient support platform to mechanically prevent rotation of the patient support platform. Preferably, the lock pin assembly incorporates a detent and a pair of proximity switches that indicate the position of the lock pin with respect to the locking ring and electrically control whether the patient support platform is allowed to rotate. The lock pin may be twistable to engage a protrusion on the lock pin with the patient support platform and thereby prevent retraction of the pin from its locked position.

The present invention also preferably includes an electrical angle sensor mounted to the patient support platform. A preferred angle sensor comprises an inclinometer that is sensitive to its position with respect to the direction of gravity. The output signal from the angle sensor may be calibrated for a controller of the drive system to control the rotational position of the patient support platform.

The present invention also preferably has a computer to operate the motor control circuitry in accordance with control signals received over a parallel cable from a computer mounted to the therapeutic bed. To prevent operating system crashes from causing the motor to operate unexpectedly by freezing the bits on the parallel cable, the motor control circuitry is preferably configured to require a code to be emitted by the computer over a separate serial bus to enable the motor control circuitry to operate the motor.

The present invention also preferably includes a weight monitoring system using a plurality of; load cells and circuitry (which may include computer hardware and software) capable of detecting failures in any one of the load cells. Each load cell produces an analog electrical output corresponding to a load borne by the load cell. The circuitry converts the analog electrical outputs of each of the load cells into a digital signal, and only then sums the digital signals together to calculate at least a portion of the bed's weight. The circuitry further comprises memory for storing a patient's weight trend data, calibration functions for determining the tare weight of the bed, a data entry function for entering a patient's weight, and means for displaying a patient's weight trend data.

A monitoring circuit is provided for the therapeutic bed to compute the total time a patient spent in kinetic therapy, prone kinetic therapy, prone kinetic therapy over an arc of at least 80 degrees, supine kinetic therapy, and supine kinetic therapy over an arc of at least 80 degrees.

A touch screen user interface is provided to monitor and control the operations of the therapeutic bed. The touch screen user interface guides a caregiver through a set of procedures for the caregiver to perform before rotating the patient support platform to the prone position. The user interface also provides programmable left angle limits, right angle limits, and a plurality of dwell times for a course of kinetic therapy. Alternatively, therapy settings can be imported through a data import interface and selected on the touch screen user interface. The touch screen interface also provides an emergency CPR button that, when selected, lowers both ends of the patient support platform and rotates it to the supine position. The touch screen interface also provides a hidden lockout button that, when selected, causes at least a portion of the touch screen interface to become nonresponsive to touch until a code is entered. The touch screen user interface also provides a data screen to display diagnostic information based upon readings from the plurality of sensors.

The therapeutic bed of the present invention is capable of rotating a patient from the supine position to the prone position and providing kinetic therapy in the prone position through an arc of rotation of up to approximately 730 degrees. Preferably, the patient support platform rotates at an angular velocity of no more than two degrees per second.

It is an object of the present invention to provide a therapeutic bed having a split end ring or slotted wheel at the head of the bed for improved access to the head of a patient lying on the bed and for placement or removal of the patient from the bed without disconnecting patient care lines from the patient.

It is another object of this invention to provide an opening at the foot of the bed having sufficient size to permit passing of patient connected devices, such as foley bags, through the opening without disconnecting the devices from the patient.

It is a further object of the present invention to provide a therapeutic bed having side rails that fold underneath the patient support platform of the bed for improved bedside access to the patient.

It is yet another object of this invention to provide a therapeutic bed with patient retaining straps having strap connectors that indicate whether the straps are sufficiently tensioned.

It is another object of the present invention to provide a therapeutic bed with side rails that are engageable with pressure-sensitive tape switches mounted to the patient support platform to indicate whether the straps on opposing side rails are properly tensioned.

It is still another object of this invention to provide a prone positioning therapeutic bed having a direct, wired electrical connection between the rotating part of the bed and the nonrotating part of the bed.

It is yet another object of this invention to mechanically limit rotation of the bed in either direction to one full 360° turn plus about 50, and to electrically detect when one full turn has been reached.

It is a further object of this invention to provide a prone positioning therapeutic bed having a flexibly mounted head restraint apparatus to maintain proper patient alignment.

It is yet another object of this invention to provide a therapeutic bed having a pair of symmetrically mounted lateral support pads that serve to automatically center the patient on the patient support platform.

It is still another object of this invention to provide a prone positioning therapeutic bed with a patient support platform, a drive system for rotating the patient support platform, and a quick release mechanism for manually disengaging the patient support platform from the drive system to allow manual rotation of the patient support platform.

Another object of this invention is to provide a prone positioning therapeutic bed having a lock pin for mechanically preventing rotation of the patient support platform as desired.

Still another object of this invention is to provide a prone positioning therapeutic bed having a lock pin with cooperating proximity switches for electrically preventing rotation of the patient support platform as desired.

A further object of this invention is to provide a rotating therapeutic bed having a lock pin that is twistable to prevent disengagement of the lock pin.

Yet another object of this invention is to provide a therapeutic bed having a rotatable patient support platform with gravity-sensitive angle sensors for controlling the rotation of the patient support platform and for determining the longitudinal (Trendelenburg) angle of the patient surface.

Another object of this invention is to provide a therapeutic bed with foam having semi-independent pressure relieving pillars.

Still another object of this invention is to provide a user-friendly touch screen interface to control and monitor the operation of the therapeutic bed.

Further objects of this invention are to provide a system for monitoring a patient's weight over time, detecting malfunctioning load cells, providing programmable therapy settings, and maintaining a log of past therapy provided.

Further objects and advantages of the present invention will be readily apparent to those skilled in the art from the following detailed description taken in conjunction with the annexed sheets of drawings, which illustrate the invention.

BRIEF DESCRIPTION OF THE DRAWINGS

FIG. 44 illustrates a retrievable data matrix stored in memory for one embodiment of the therapeutic bed of FIG. 1.

DETAILED DESCRIPTION

Figure 1:
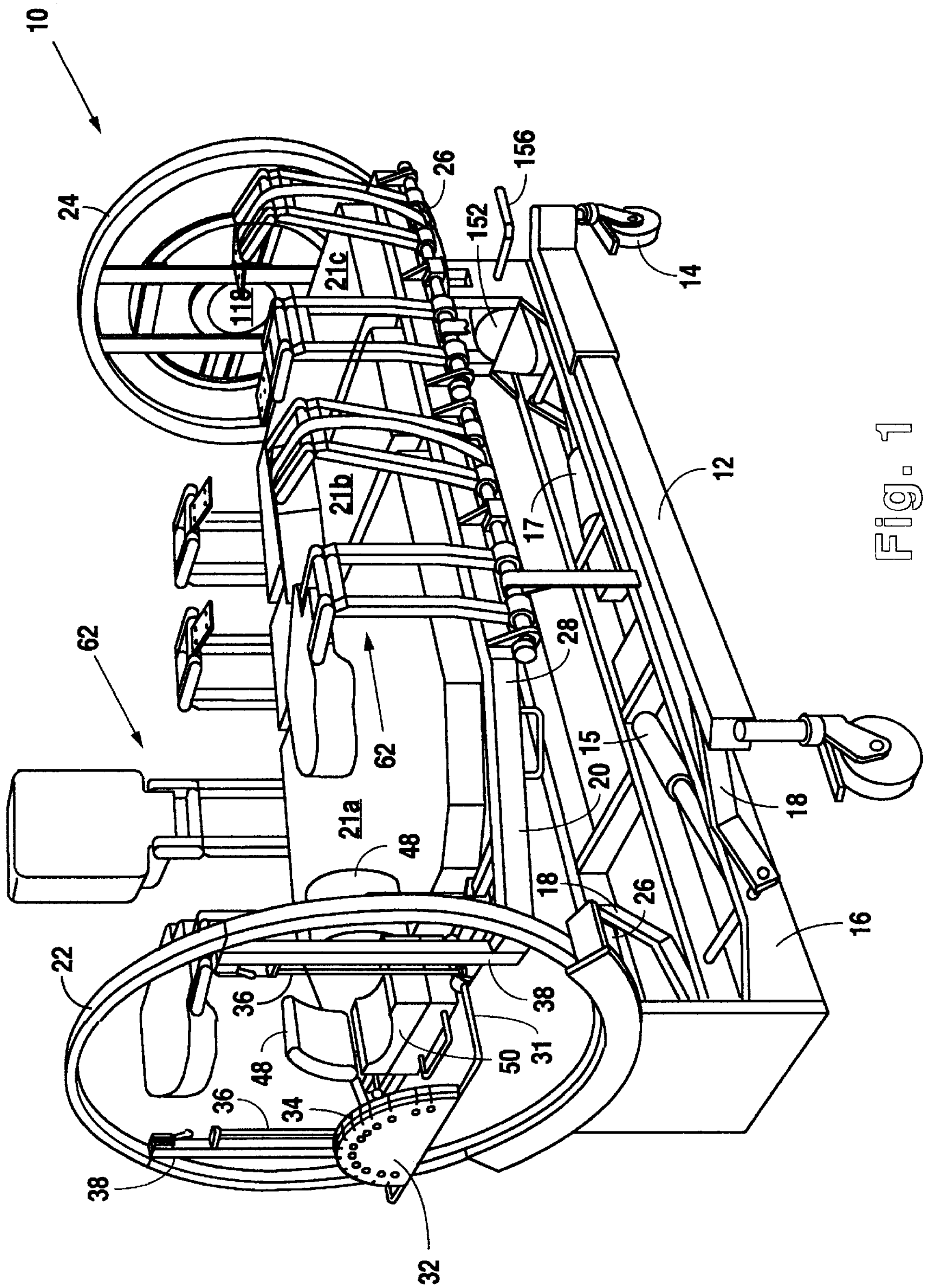
FIG. 1 is a perspective view of a therapeutic bed in accordance with the present invention.
Figure 2:
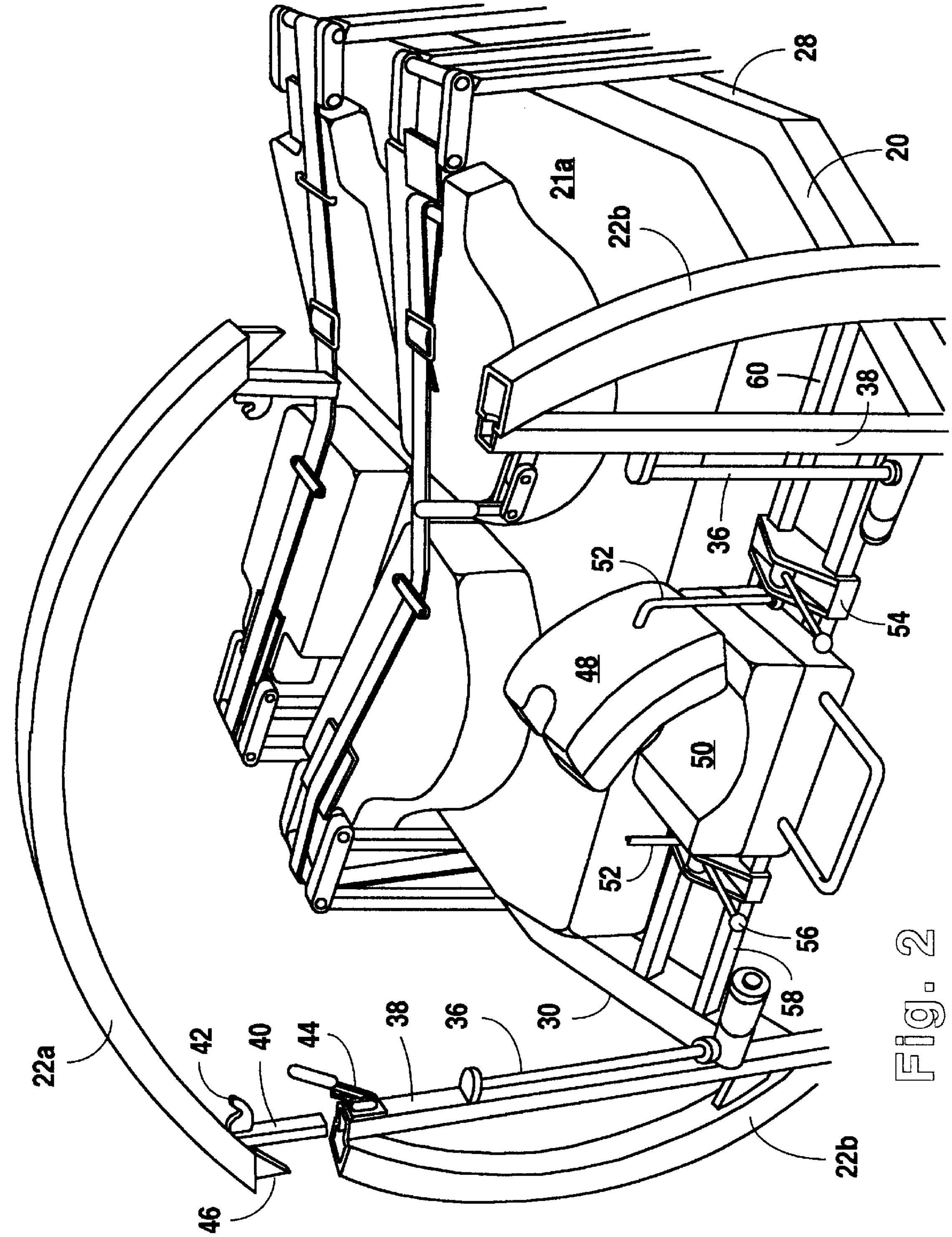
FIG. 2 is a perspective view of the head portion of the therapeutic bed of FIG. 1 looking toward the foot of the bed.

Referring to FIGS. 1 and 2, a therapeutic bed 10 in accordance with the present invention preferably comprises a ground engaging chassis 12 mounted on wheels 14. A base frame 16 is mounted on chassis 12 with pivot linkages 18. Rams 15, 17 housed within base frame 16 cooperate with pivot linkages 18 to form a lift system to raise and lower base frame 16 on chassis 12. A patient support platform 20 having upright end rings 22, 24 is rotatably mounted on base frame 16 with rollers 26 such that patient support platform 20 may rotate about a longitudinal axis between a supine position and a prone position. Mattress or foam padding (not shown for clarity), such as the type described in co-pending and commonly assigned application for Letters Patent Ser. No. 09/588,513 filed Jun. 6, 2000, entitled "MATTRESS WITH SEMI-INDEPENDENT PRESSURE RELIEVING PILLARS INCLUDING TOP AND BOTTOM PILLARS," which is incorporated herein by reference, overlays patient support platform 20.

Side support bars 28, 30 extend between end rings 22, 24. At the head of bed 10, a guide body 32 having a plurality of slots 34 for routing patient care lines (not shown) is slidably mounted on rails 36 with support rod 31. Similarly, at the foot of bed 10, a central opening 118 is provided for receiving a removable patient care line holder (not shown) having a plurality of circumferential slots for routing patient care lines.

Central opening 118 is preferably of sufficient size to allow passing of patient connected devices, such as foley bags (not shown), through the central opening 118 without disconnecting such devices from the patient. For such purposes, central opening 118 is preferably as large as possible, provided that strength and configuration requirements of the bed are maintained. More particularly, the inner diameter of central opening 118 is preferably at least eight inches, more preferably, at least about 12 inches, in diameter. The foregoing basic structure and function of bed 10 is disclosed in greater detail in international application number PCT/IE99/00049 filed Jun. 3, 1999, which is incorporated herein by reference.

Still referring to FIG. 1, bed 10 preferably comprises one or more folding side rails 62 pivotally mounted to patient support platform 20 to assist in securing a patient to support platform 20 before rotation into the prone position. As further described below in connection with FIG. 15, side rails 62 fold underneath platform 20 for easy access to a patient lying atop cushions 21*a*, 21*b*, 21*c* in the supine position. Bed 10 also preferably has a head rest 50 and a pair of head restraints 48, which are described in more detail below in connection with FIG. 3. Although not shown for the sake of clarity, a fan may be mounted on the patient support platform 20 near the end ring 24 at the foot of bed 10 to ventilate a patient's legs.

As shown in FIG. 2, end ring 22 at the head of bed 10 is split into two sections for improved access to a patient lying on bed 10. Upper section 22*a* is removable from lower section 22*b*. Upper section 22*a* has a pair of shafts 40 that are inserted into vertical stabilizer tubes 38 in the closed position. Likewise, tabs 46 on upper section 22*a* mate with tubular openings on lower section 22*b*. Latches 44 secure upper section 22*a* to lower section 22*b* in the closed position. When latches 44 are unlatched, upper section 22*a* may be raised, pivoted about the vertical axis of one of the shafts 40, and left in an open position supported by one of the shafts 40 in corresponding stabilizer tube 38. Alternatively, upper section 22*a* may be removed entirely. In either case, upper section 22*a* may be moved out of the way for unobstructed access to the patient and manipulation of patient care lines. An alternative to a split end ring is to provide a slotted wheel 41 (FIG. 2B) having a radial slot 43 supported by a plurality of rollers 42. Patient care lines would be inserted or removed from the center of wheel 41 through slot 43. As another alternative to a split end ring, patient support platform 20 could be cantilevered from the base frame at one end of the bed, but such a configuration would be extremely heavy.

One of the key challenges in patient proning is adequately supporting the head in a manner that facilitates proper alignment of the patient's vertebrae in both the prone and supine positions, as well as at all angular positions of rotation. Other challenges include minimizing the risk of skin, face, and ear abrasions and avoiding entanglement or kinking of patient care lines to the patient's head, throat, or face.

Figure 3A:
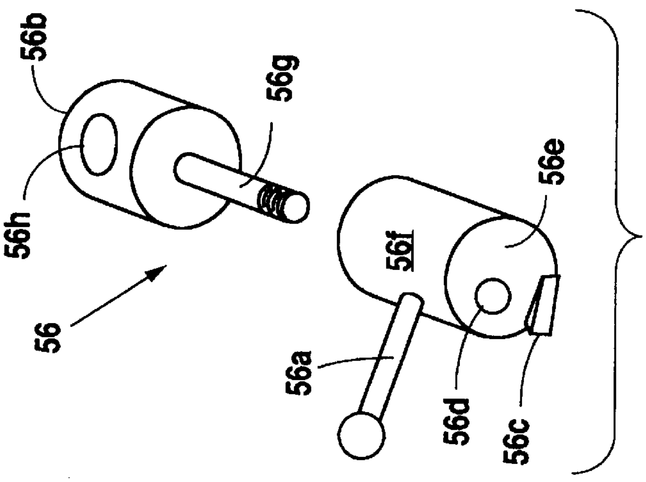
FIG. 3A is an exploded perspective view of the clamping mechanism for the head restraints of the therapeutic bed of FIG. 1.
Figure 3:
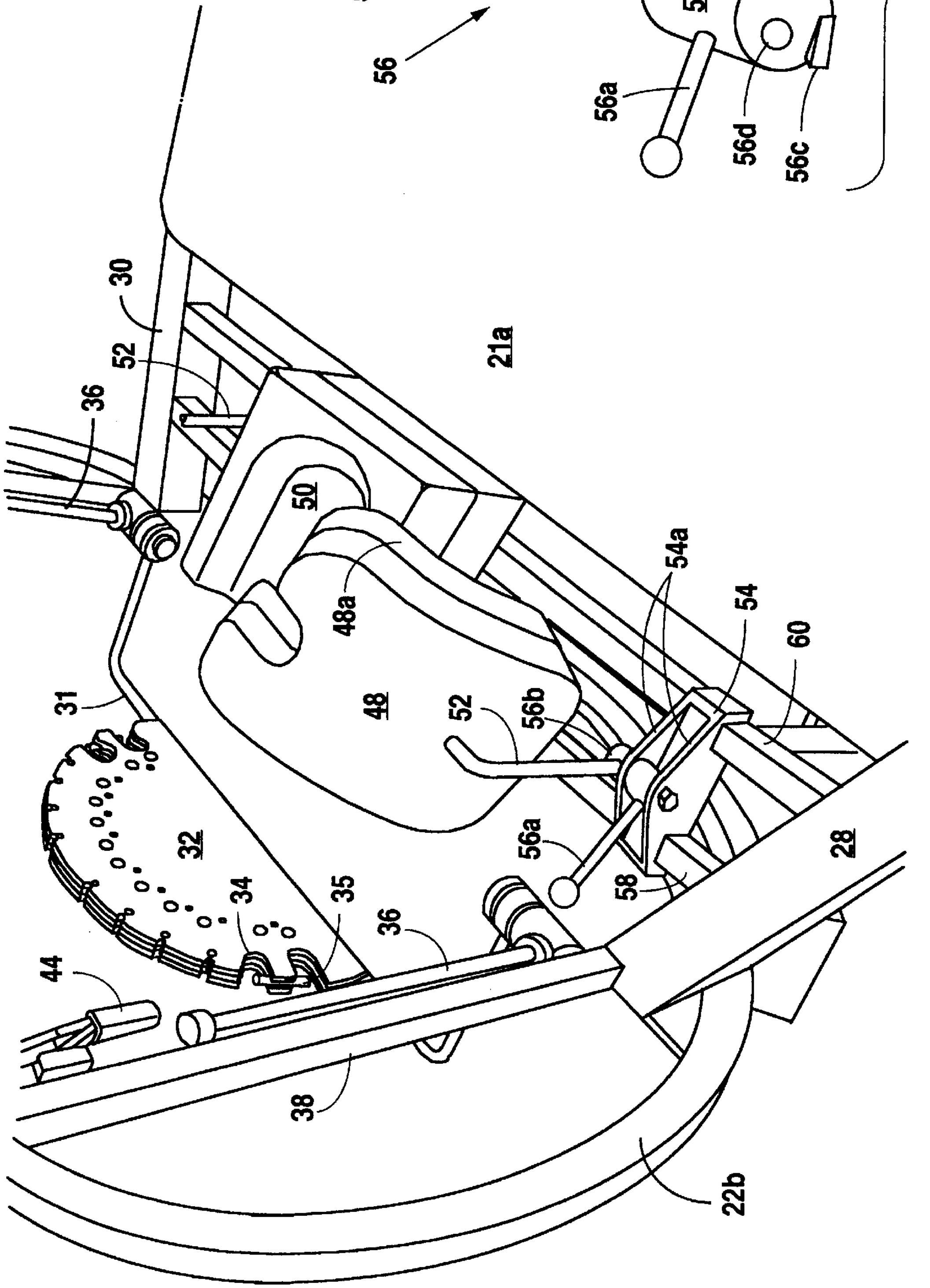
FIG. 3 is a perspective view of the head portion of the therapeutic bed of FIG. 1 looking toward the head of the bed.

Referring now to FIGS. 3 and 3A, head restraints 48 are slidably mounted to transverse support rails 58, 60 on guides 54 with mounting arms 52. For the sake of clarity, only one head restraint 48 is shown in FIGS. 2 and 3. Each guide 54 has a clamp 56 that is manually operable by a handle 56*a* and serves to secure each guide 54 in a desired lateral position as further described below. Mounting arms 52 are slidably mounted in holes 56*h* of bosses 56*b* to provide vertical positioning of head restraints 48. Handle 56*a* is attached to a drum 56*f* that is rotationally mounted to flanges 54*a* of guide 54 by shaft 56*g* which is disposed within hole 56*d* of drum 56*f*. Drum 56*f* has a ramp 56*c* for engaging one of the flanges 54*a*, and hole 56*d* is offset from the central axis of drum 56*f* to form a cam 56*e*. Movement of handle 56*a* in the appropriate direction causes ramp 56*c* to engage one of the flanges 54*a* and thereby spread flanges 54*a* apart slightly, which causes one of the flanges 54*a* to frictionally engage mounting arm 52 and thereby fix the vertical position of head restraint 48. Simultaneously, such rotation of handle 56*a* causes cam 56*e* to frictionally engage one of the transverse support rails 58, 60 and thereby fix the lateral position of head restraint 48. Thus, clamps 56 simultaneously provide both lateral and vertical positioning of head restraints 48, which have pads 48*a* for comfortably engaging the front and sides of the head of a patient whose head is resting on head rest 50. Head rest 50 may be mounted to transverse support rails 58, 60 or to pad 21*a*. Head restraints 48 thereby provide increased stability and comfort for a patient when bed 10 is rotated to the prone position.

Although not shown for the sake of clarity, a camera for taking images of a patient's face may optionally be mounted over or proximate to the head restraints 48 using another guide and mounting arm slidably mounted on transverse support rails 58, 60. Providing a camera would help medical personnel monitor the effect of kinetic therapy on a patient from a remote location.

Figure 2A:
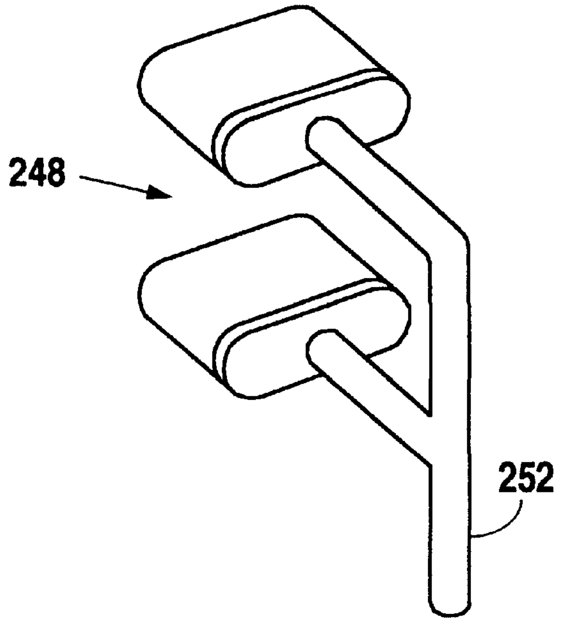
FIG. 2A is a perspective view of an alternative head restraint for the therapeutic bed of FIG. 1.
Figure 2B:
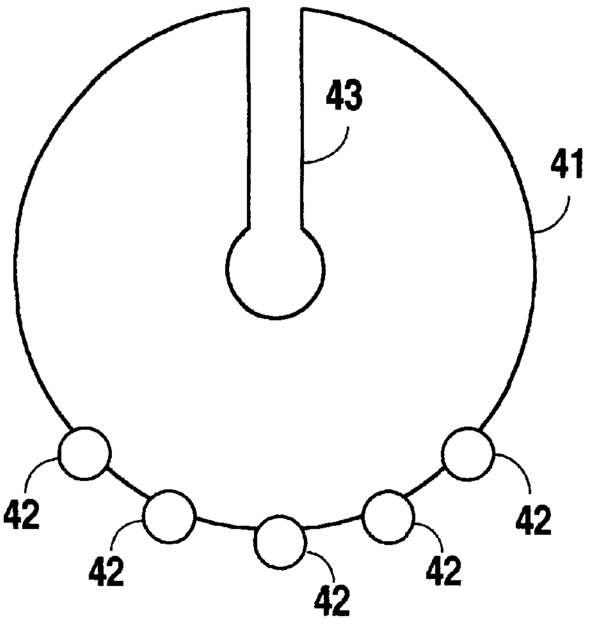
FIG. 2B illustrates a slotted wheel that can be used as an alternative to the end rings of FIG. 2.

If a particular patient requires only partial rotation for therapy such that patient support platform 20 need not be rotated beyond about, for example, 30 degrees in either direction, alternative head restraints 248 as shown in FIG. 2A may be mounted in clamps 56 using mounting arms 252 in like manner as head restraints 48. Alternative head restraint 248 is designed to provide lateral support for the patient's head in instances when the patient will not be rotated into the prone position such that vertical restraint of the head is not required.

Figure 26:
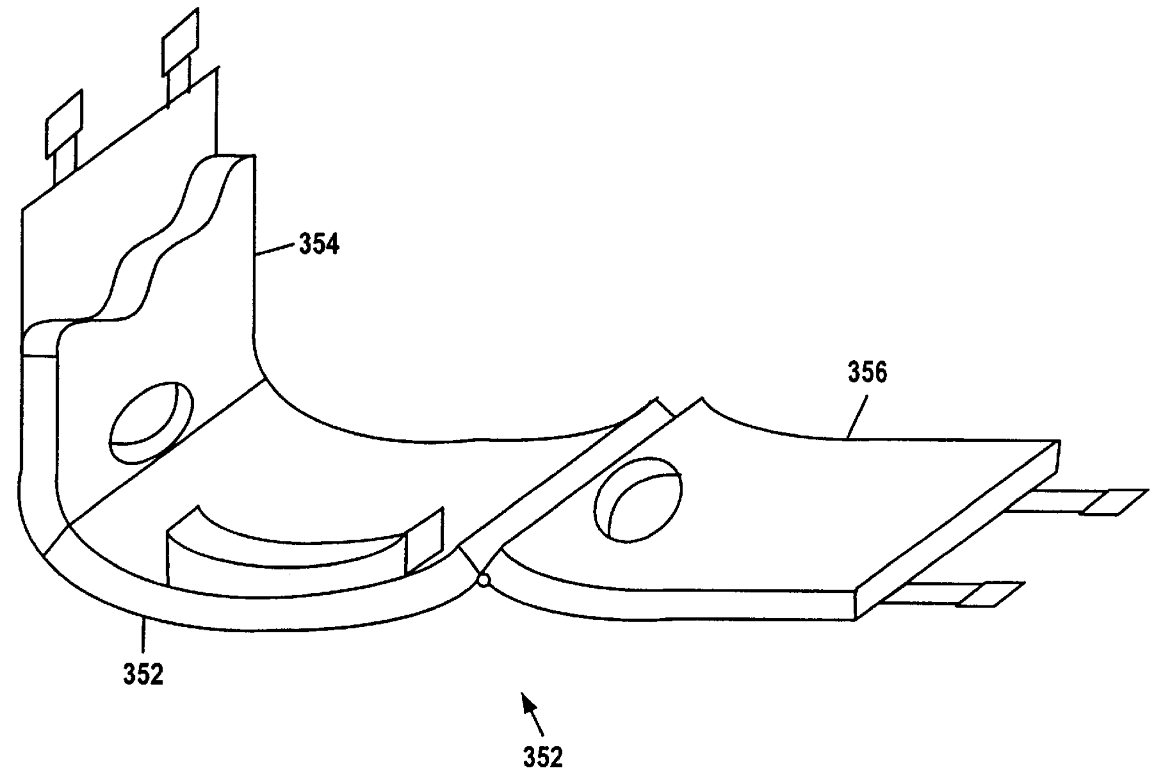
FIG. 26 is another perspective view of the alternative head restraint apparatus of FIG. 25.
Figure 27:
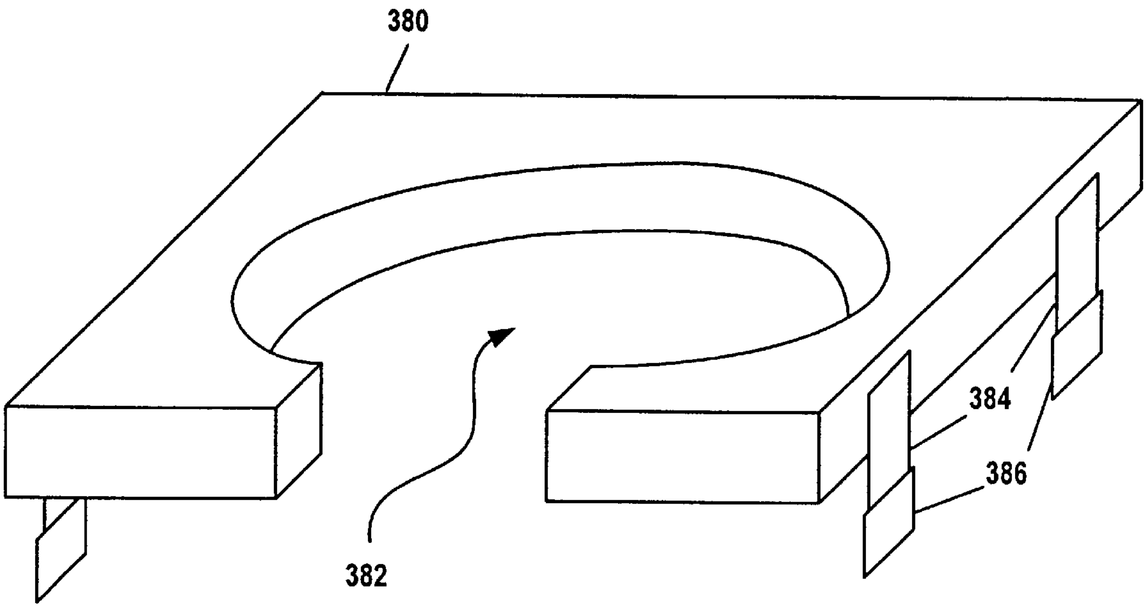
FIG. 27 is a perspective view of a face piece for the alternative head restraint apparatus of FIG. 25.

FIGS. 25 through 28 illustrate portions of another alternative head restraint apparatus 348 that permits the head to rest dependent over a greater surface area in order to lessen the risk of pressure sores and abrasions. The head restraint apparatus 348 comprises a U-shaped casing 350 that supports a patient's head in both supine and lateral positions and a face piece 380 that supports a patient's head in the prone position. The casing 350 comprises, at its base, a headrest member 3152 and two upright side members 354 and 356. Preferably, the two upright side members 354 and 356 are connected to the headrest member 352 with hinges 368 so that, as illustrated in FIG. 26, side members 354 and 356 can be swung outwardly to facilitate easy positioning and transport of a patient on or off the patient support platform 20 and casing 350. Cushions 358, such as foam or gel pads, line the inside of casing 350. An additional neck support cushion 359 is provided to support the neck of a patient in the supine position. Straps 364 with adjustable buckles 366 connected to side members 354 are provided to secure the face piece 380 to the top of the patient's head.

The face piece 380 comprises foam or cushion material supported by a flexible plastic plate, which allows the foam to more fully contour to the patient's head. The face piece 380 has one or more apertures 382 for the nose and mouth, and optionally also the mouth. For the sake of simplicity, the face piece 380 is shown substantially flat, but preferably, the face piece is contoured so that the weight of the head in the prone position will be distributed over a large surface area of the face piece 380. Straps 384 terminating in clasps 386 descend from sides of the face piece, for mating with adjustable buckles 366 of strap connectors 364.

After resting a patient's head on the headrest member 352, the face piece 380 is fitted over the patient's forehead. Clasps 384 are mated with buckles 366 and the strap 364 is tightened to tightly fit a patient's head between the casing 350 and the face piece 380.

One embodiment of casing 350 incorporates relatively short upright side members 354 and 356. In a preferred embodiment, the upright side members 354 and 356 are elongated to prevent a patient's head from tending to push out of the casing and into straps 364 and 384 when the patient is rotated into a substantially lateral position. Also preferably, side members 354 and 356 further comprise apertures 362 to provide ventilation and access to the ears of a patient.

To facilitate patient placement on or off the patient support platform 20, the headrest portion 352 of the casing 350 is mounted on a swiveling shaft 360. The swivel feature enables the casing 350 to rotate in the horizontal plane toward one of the sides of the patient support platform 20.

When a patient is rotated from the prone to the supine position, the patient's weight will cause the patient to sink into the proning cushions 64 and away from the patient support platform 20. To maintain proper spinal column alignment, the head should be allowed to descend with the rest of the patient's body as the patient is rotated into the prone position. Accordingly, in one embodiment the swiveling shaft 360 is coupled to the patient support platform 20 through a mounting block 357. The shaft 360 slides up and down with respect to the mounting block 357 as gravity dictates. Furthermore, a flexible mount 361, preferably made of rubber, couples the casing 350 to the swiveling shaft 360. The ability of the swiveling shaft 360 to slide up and down with respect to mounting block 357, and the flex provided by the flexible mount 361, both help maintain proper alignment of the patient's spinal column while the patient is in the prone position and during kinetic therapy. In addition, spring (not shown) can be used to resist movement of the swiveling shaft 360 with respect to the mounting block 357. Alternatively, a gas strut (not shown) mounted directly to the patient support platform 20 or a slidable mount apparatus may be used in place of the swiveling shaft 360 and mounting block 357. A further alternative to the swiveling shaft 360 and mounting block 357 is a lead screw assembly that facilitates gradual vertical adjustment of the casing 350 between two defined vertical positions.

Figure 28:
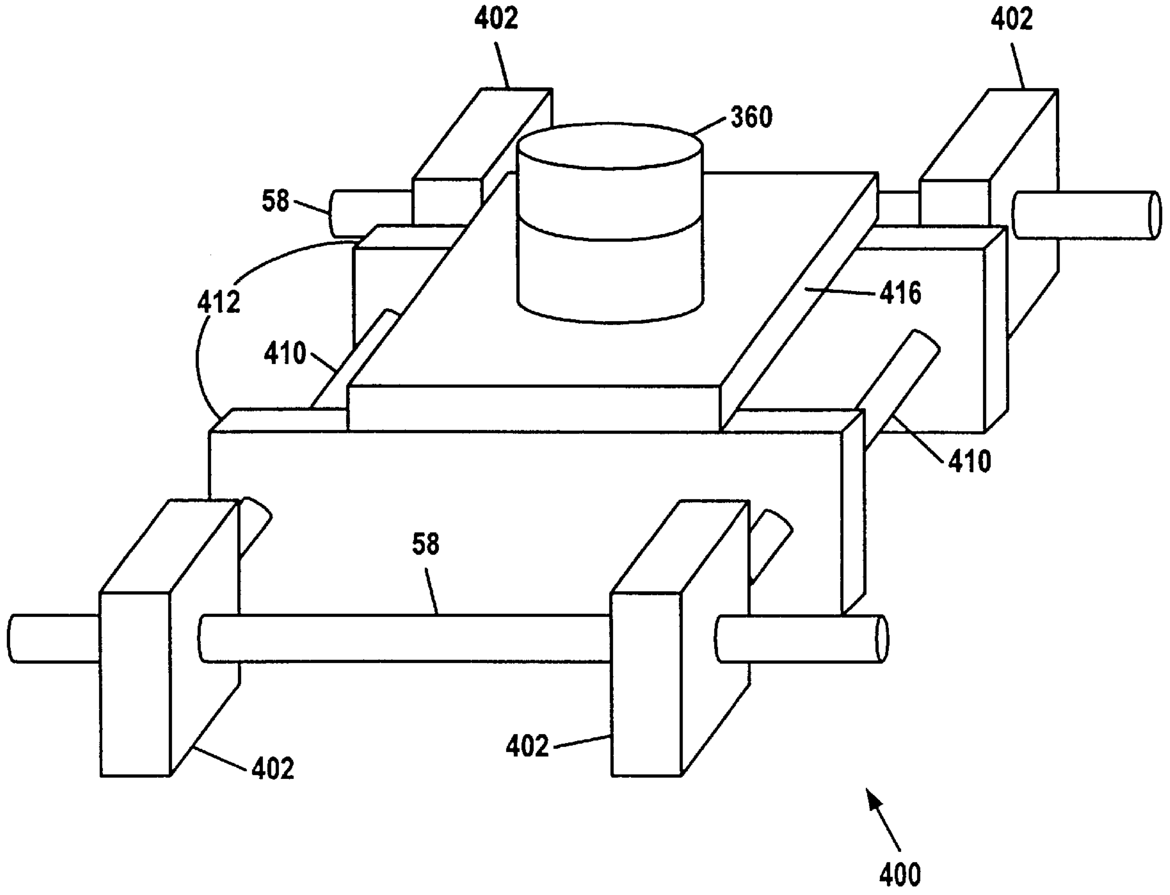
FIG. 28 is a perspective view of a slidable mount apparatus for the alternative head restraint apparatus of FIG. 25.

Referring now to FIG. 28, a slidable mount apparatus 400 is provided to connect the casing 350 to the patient support platform 20. The slidable mount apparatus comprises lateral guides 402 slidably mounted on transverse support rails 58 (FIG. 3). Lateral guides 402 carry longitudinal support rails 410 on which longitudinal guides 412 are slidably mounted. A head restraint mounting platform 412, to which the swiveling shaft 361 (FIG. 25) or mounting block 357 (not shown in FIG. 28) is attached, bridges longitudinal guides 412 together. The slidable mount apparatus 400 provides limited movement of the head restraint apparatus 348 in both the "x" and "y" directions along a plane substantially parallel to a patient support surface of the bed.

Figure 4:
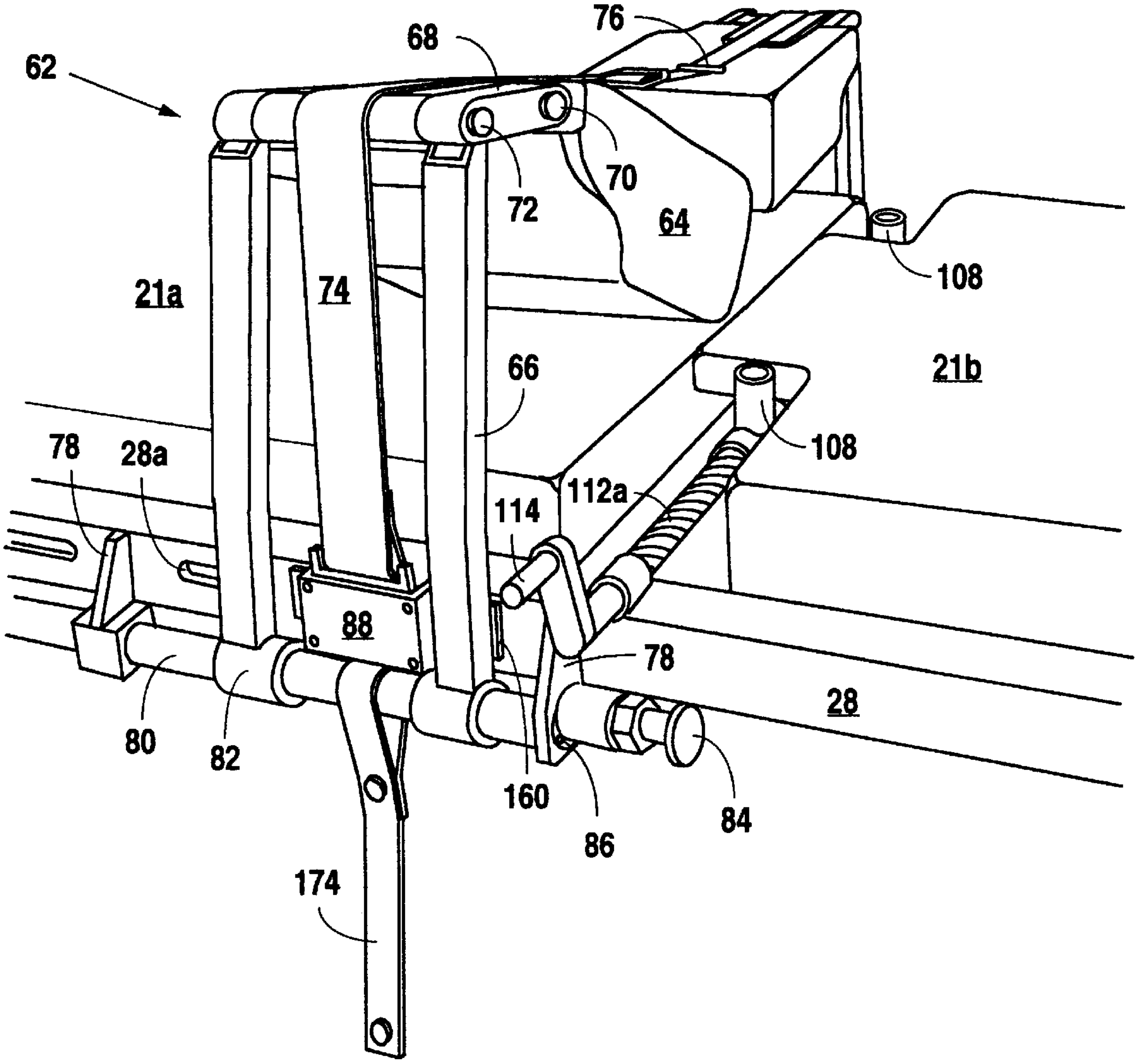
FIG. 4 is a perspective view of a side rail of the therapeutic bed of FIG. 1.
Figure 15:
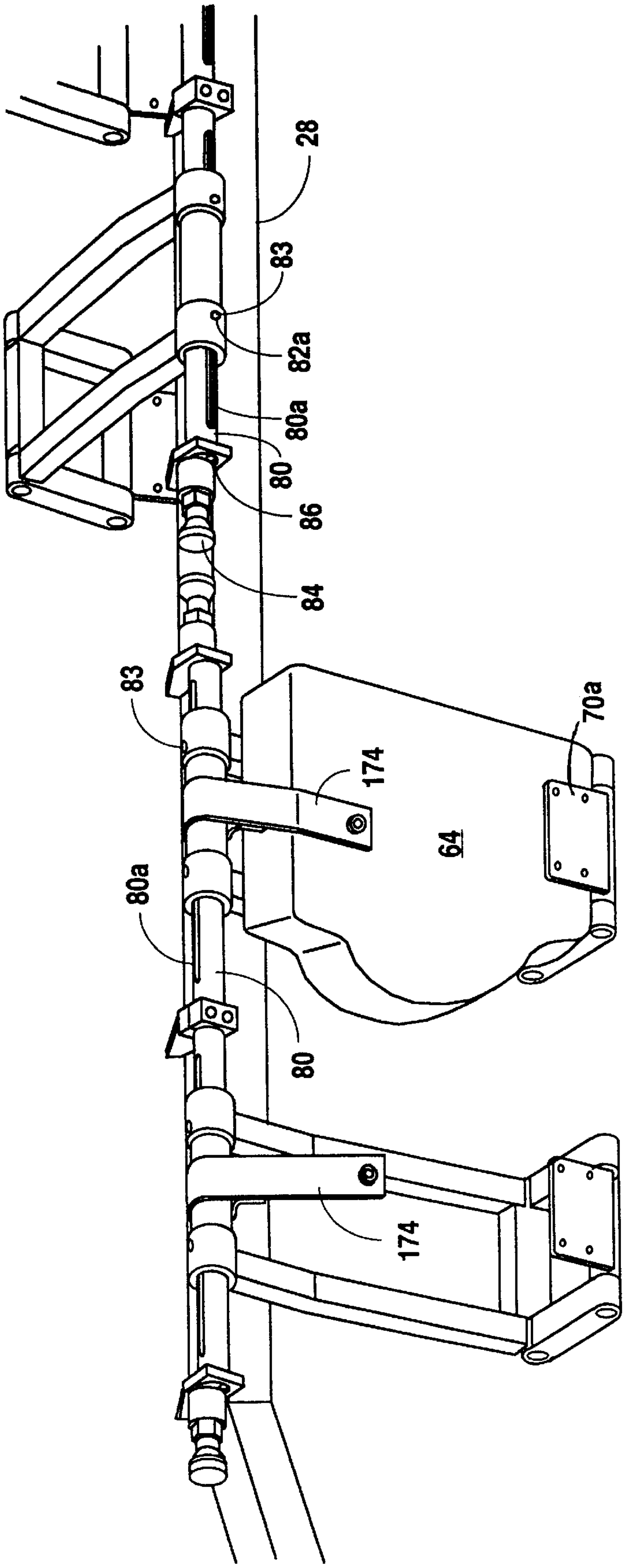
FIG. 15 is a perspective,view looking up at a side rail folded under the patient support platform of the therapeutic bed of FIG. 1.

FIGS. 4 and 15 illustrate a preferred structure and operation of folding side rails 62. Preferably, four independently operable side rails 62 are pivotally mounted on each side of bed 10. For each side rail 62, main rail 66 is slidably mounted on shaft 80 with mounting cylinders 82. Shaft 80 has a slot **80*a* for receiving guides such as set screws 83 installed in holes 82*a* of mounting cylinders 82. Preferably, set screws 83 are not tightened against slot 80*a* but simply protrude into slot 80*a* to prevent side rail 62 from rotating with respect to shaft 80. In that regard, set screws 83 could be replaced with unthreaded pins. When set screws 83 are loosened, side rail 62 is free to slide longitudinally along shaft 80 for proper positioning with respect to the patient. When set screws 83 are tightened, side rail 62 is fixed with respect to shaft 80. Shaft 80 is rotatably mounted to side support bar 28, 30 with rail mounts 78. Pivot link 68 is hinged to main rail 66 with hinge 72, and cushion 64 is hinged to pivot link 68 with hinge 70, which has a hinge plate 70*a* for attaching cushion 64. Side rails 62 are thus capable of folding under patient support platform 20 as shown in FIG. 15, which is a view looking up from beneath patient support platform 20. A strap 174 with one end secured around shaft 80 may be provided to retain cushion 64 in the folded under position with mating portions of a snap respectively provided on cushion 64 and strap 174. A pair of straps 74 and an adjustable buckle 76 are provided to fasten each opposing pair of side rails 62 securely over the patient. One end of strap 74 is secured to side support bar 28 with a strap connector 88, which is slidably mounted in slot 28*a* of side support bar 28. When strap 74 is properly secured with the appropriate tension using buckle 76, tabs 160 on strap connector 88 are sandwiched between main rail 66 and side support bar 28, which further helps to prevent longitudinal movement of side rail 62. Side rails 62 thus serve to hold the patient securely in place as bed 10 is rotated into the prone position, and side rails 62** fold neatly out of the way for easy access to the patient in the supine position.

Figure 4A:
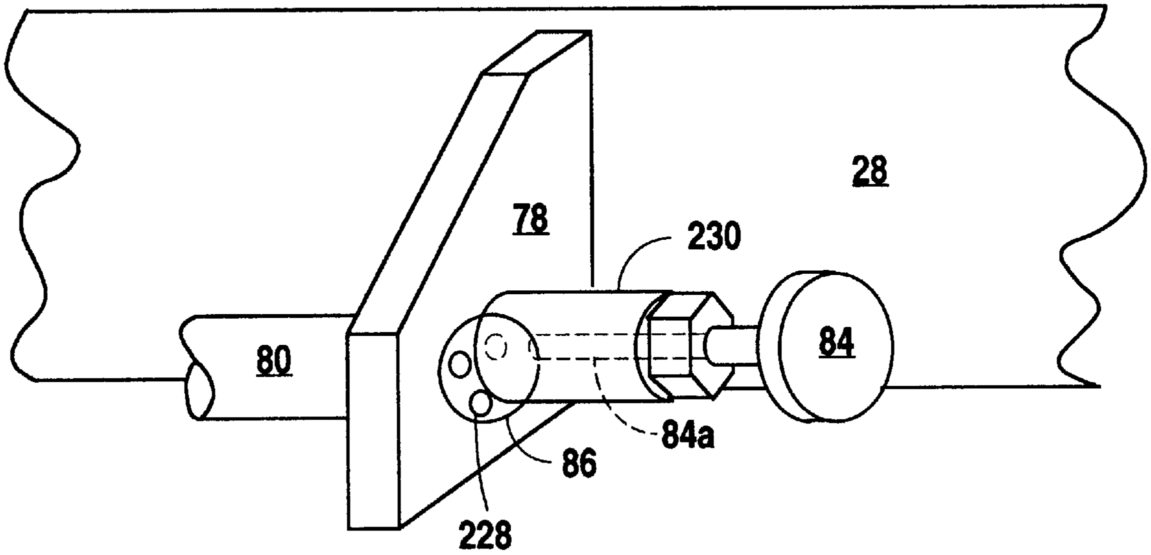
FIG. 4A is a perspective view of the detent for the side rail of FIG. 4.

As best illustrated in FIG. 4A, an indexed disc 86 is preferably provided on one end of shaft 80 for cooperation with a pull knob 84 to form a detent that holds side rail 62 in one or more predetermined rotational positions. To that end, disc 86 preferably has one or more recesses 228 for receiving a pin 84*a* which is manually operated by pull knob 84. Pull knob 84 is fixedly mounted to rail mount 78 with boss 230. Preferably, pin 84*a* is biased into engagement with disc 86. By engaging one of the recesses 228, pin 84*a* prevents rotation of shaft 80 and thereby functions as a detent to hold side rail 62 in a predetermined rotational position. Side rail 62 may be moved to a different predetermined rotational position by pulling knob 84 sufficiently to disengage pin 84*a* from the given recess 228 so that shaft 80 is free to rotate. Preferably, one of the predetermined rotational positions of side rail 62 corresponds to the folded under position.

Figure 5:
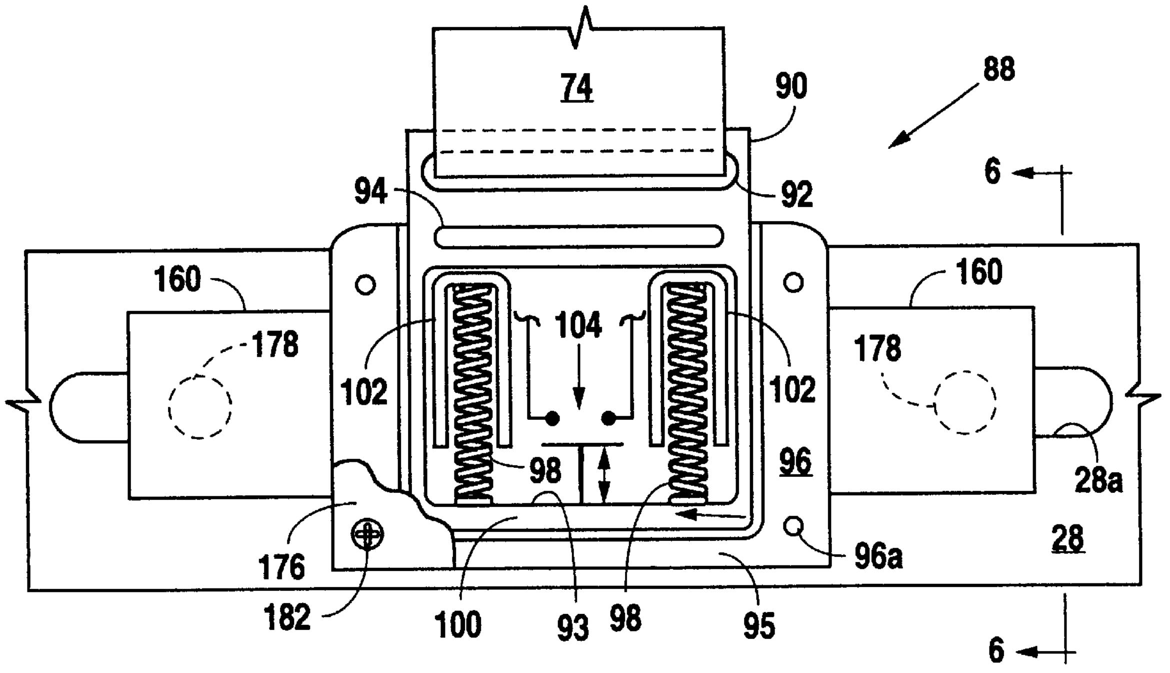
FIG. 5 is a side elevational view of a strap connector for the side rail of FIG. 4.
Figure 6:
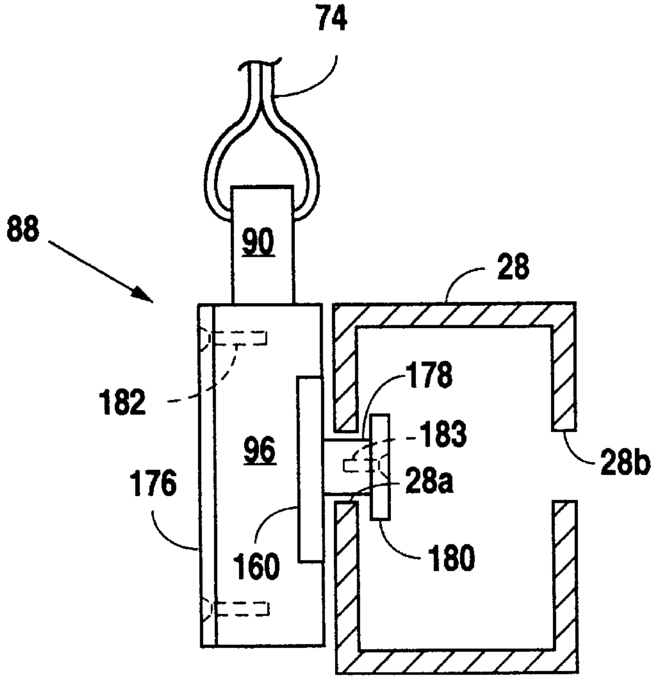
FIG. 6 is a rear elevational view of the strap connector of FIG. 5.

Referring now to FIGS. 5 and 6, each strap connector 88 comprises a tension-sensitive mechanism that provides both visual and electrical indications of whether strap 74 is properly secured over the patient. The following description describes the attachment of a strap connector 88 to side support bar 28. It will be understood that strap connectors 88 may be similarly attached to side support bar 30. Each strap connector 88 comprises a tension plate 90 that partially resides within a housing 96. A cover plate 176 is attached to housing 96 by fasteners 182 inserted into holes 96*a*. Tabs 160 extend from housing 96, and studs 178 protrude from tabs 160 as shown. Discs 180 are mounted to studs 178 with screws 183. Slots 28*b* on the inner side of support bar 28 provide access for installation of screws 183. Studs 178 are adapted to slide in slots 28*a* of side support bar 28, and discs 180 serve to retain strap connector 88 on side support bar 28. Tension plate 90 has a slot 92 to which strap 74 is attached and a central cut-out 93 that forms a land 100. Inverted U-shaped channels 102 protrude from the back of housing 96 into central cut-out 93 of tension plate 90. Land 100 of tension plate 90 cooperates with channels 102 of housing 96 to capture springs 98 which tend to force tension plate 90 downward toward lower edge 95 of housing 96 such that switch 104 is disengaged when strap 74 is slack. Switch 104 is connected to an electrical monitoring and control system (not shown) in a customary manner. When strap 74 is buckled and tightened sufficiently, the tension in strap 74 overcomes the biasing force of springs 98, and tension plate 90 moves upward to engage switch 104, which sends a signal to the electrical monitoring and control system indicating that strap 74 is properly tensioned. Preferably, the electrical monitoring and control system is programmed such that bed 10 cannot rotate until each strap 74 is properly tensioned to ensure that the patient will be safely secured in bed 10 as it rotates to the prone position. Additionally, tension plate 90 preferably has a tension indicator line 94 that becomes visible outside housing 96 when strap 74 is properly tensioned.

Figure 16:
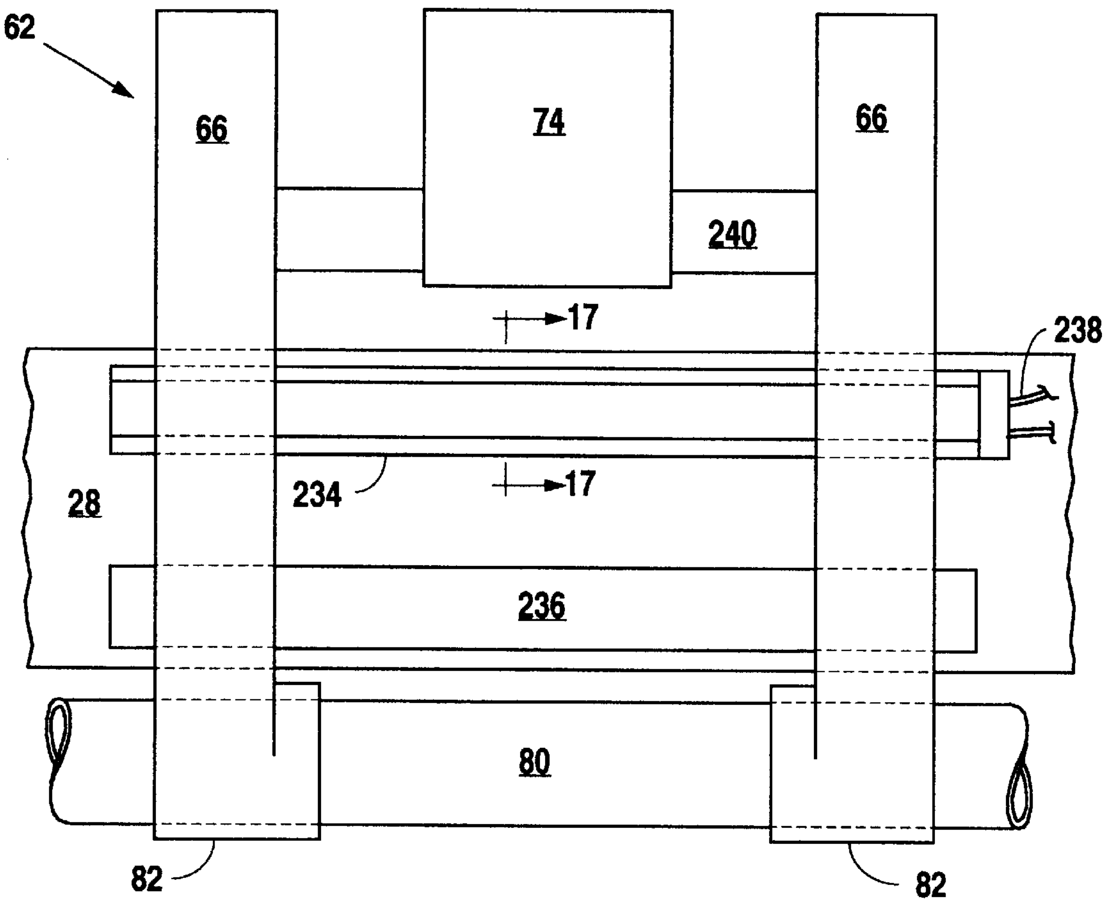
FIG. 16 is a side elevational view of a side rail and cooperating tape switch on a therapeutic bed in accordance with the present invention.

More preferably, as illustrated in FIG. 16, instead of utilizing tension-sensitive strap connectors 88, a pressure-sensitive tape switch 234 may be installed to side support bars 28, 30 adjacent each side rail 62. Tape switch 234 is preferably of the type commonly available from the Tape Switch company. Strap 74 is attached to a crossbar 240 that spans main rails 66. When strap 74 is properly tensioned, main rails 66 depress tape switch 234, which sends a signal through electrical leads 238 to the monitoring and control system indicating that side rail 62 is properly secured over the patient. Preferably, the monitoring and control system is programmed such that the patient support platform 20 is not allowed to rotate into the prone position unless all side rails 62 have been properly secured as indicated by tape switches 234. To help calibrate each tape switch 234, a pad 236 may be attached to side support bars 28, 30 below the tape switch 234 adjacent each side rail 62. Pads 236 are made of a compressible material, such as rubber, having a suitable hardness and thickness so that, as strap 74 is buckled, main rails 66 will first compress pads 236 and then depress tape switch 234 when strap 74 is buckled to the appropriate tension.

Figure 17:
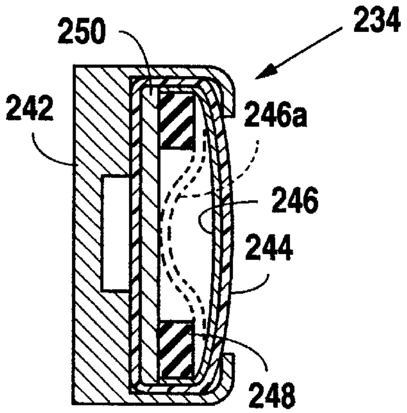
FIG. 17 is a cross-sectional view of the tape switch of FIG. 16.

FIG. 17 illustrates a preferred embodiment of tape switch 234. A mounting bracket 242, which is preferably made of extruded aluminum, houses two conductive strips 250 and 246 that are separated at their upper and lower edges by insulator strips 248. Conductive strip 250 is a planar conductor oriented in a vertical plane as shown. Conductive strip 246 is installed under a preload such that it is bowed away from conductive strip 250 in its undisturbed position. Conductive strips 250, 246 and insulator strips 248 are enclosed within a plastic shroud 244. When main rails 66 engage tape switch 234 with sufficient pressure, conductive strip 246 is displaced to the position shown at 246*a*, which completes the circuit with conductive strip 250 and sends a signal through leads 238 indicating that the strap 74 is properly secured.

Figure 7:
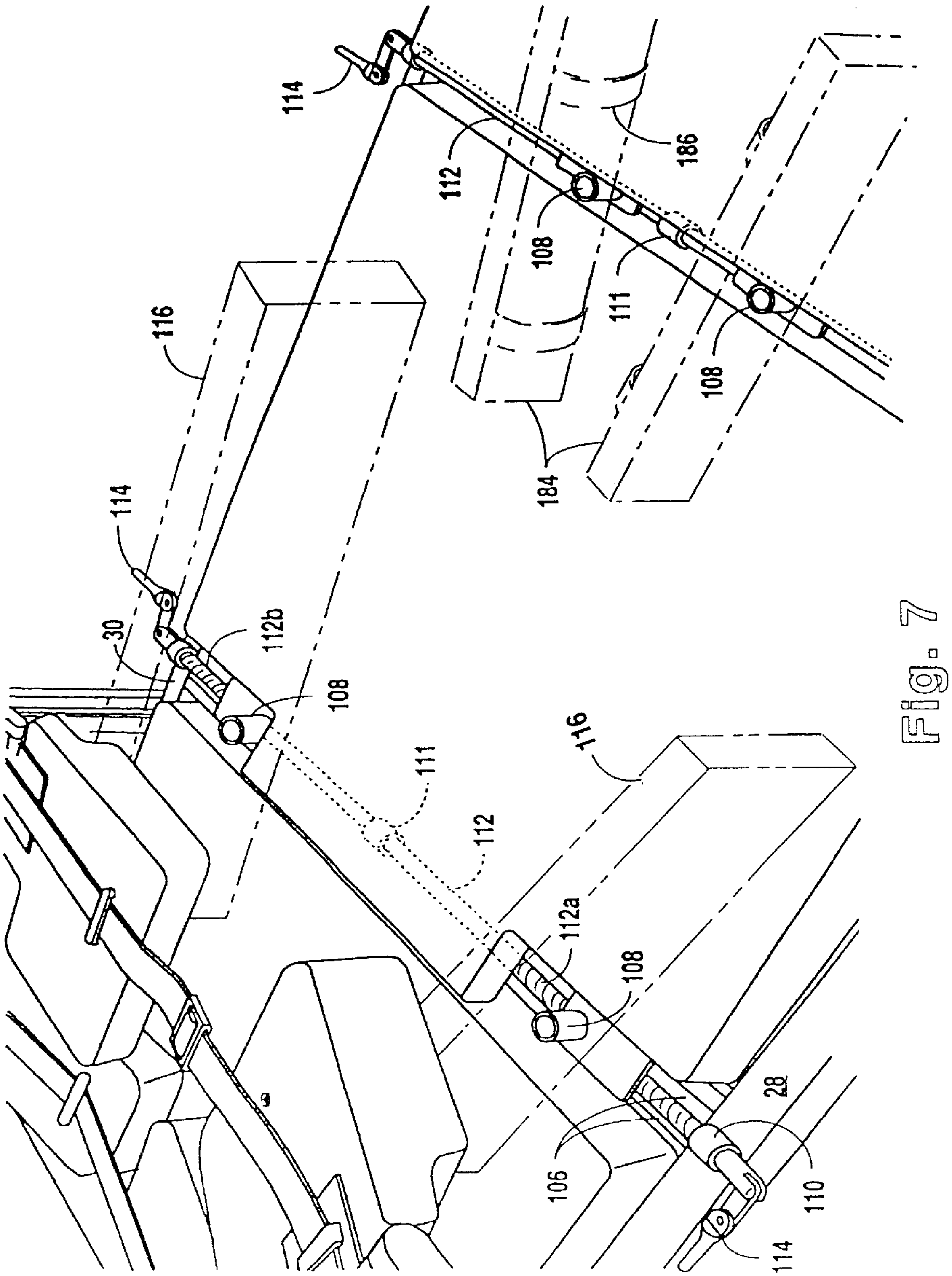
FIG. 7 is a perspective view of the therapeutic bed of FIG. 1 showing symmetric lateral support pads and leg abductors.
Figure 9:
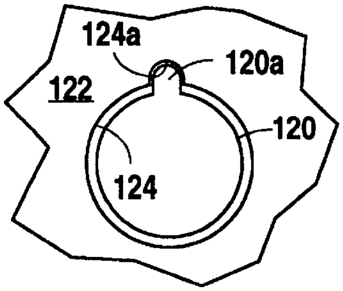
FIG. 9 is a front elevational view of a portion of FIG. 8.

As shown in FIG. 7, bed 10 preferably comprises a pair of lateral support pads 116 for holding a patient in place laterally. Lateral support pads 116 are connected to mounts 108, which are slidably mounted on transverse support rails 106 that span the gap between side support bars 28, 30. Mounts 108 are also threadably engaged with a threaded rod 112, the ends of which are mounted in side support bars 28, 30 with bearings 110. Mounts 108 are symmetrically spaced from the longitudinal centerline of bed 10. Preferably, another bearing 111 supports the middle portion of rod 112, and a manually operable handle 114 is provided on at least one end of rod 112. With respect to element 114, the term “handle” as used herein is intended to mean any manually graspable item that may be used to impart rotation to rod 112. Alternatively, rod 112 may be motor driven. One side 112*a* of rod 112 has right-hand threads, and the other side 112*b* has left-hand threads. By rotating handle 114 in the appropriate direction, lateral support pads 116 are symmetrically moved toward or away from the patient, as desired. Due to the symmetrical spacing of mounts 108 and the mirror image threading 112*a*, 112*b* of rod 112, lateral support pads 116 provide for automatic centering of the patient on bed 10, which enhances rotational stability. Similarly, leg abductors 184 having straps 186 for securing a patient’s legs may be mounted to mounts 108 in like manner as lateral support pads 116. The term “patient support accessory” is used herein to mean any such auxiliary equipment, including but not limited to lateral support pads and leg abductors, that is attachable to mounts 108 for the purpose of providing symmetric lateral support to a patient on bed 10.

Figure 8:
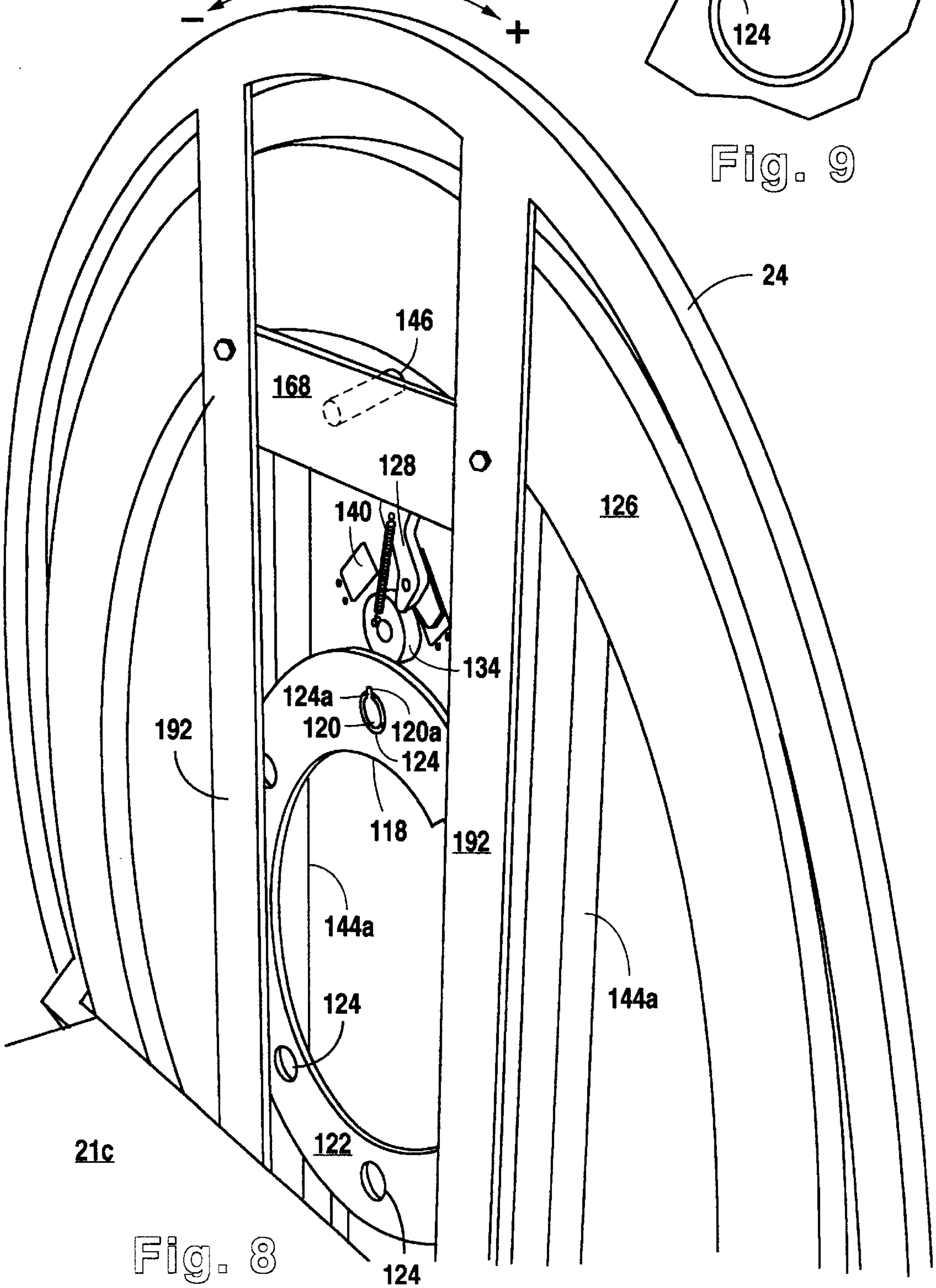
FIG. 8 is a perspective view of the foot portion of the therapeutic bed of FIG. 1 looking toward the foot of the bed.
Figure 11:
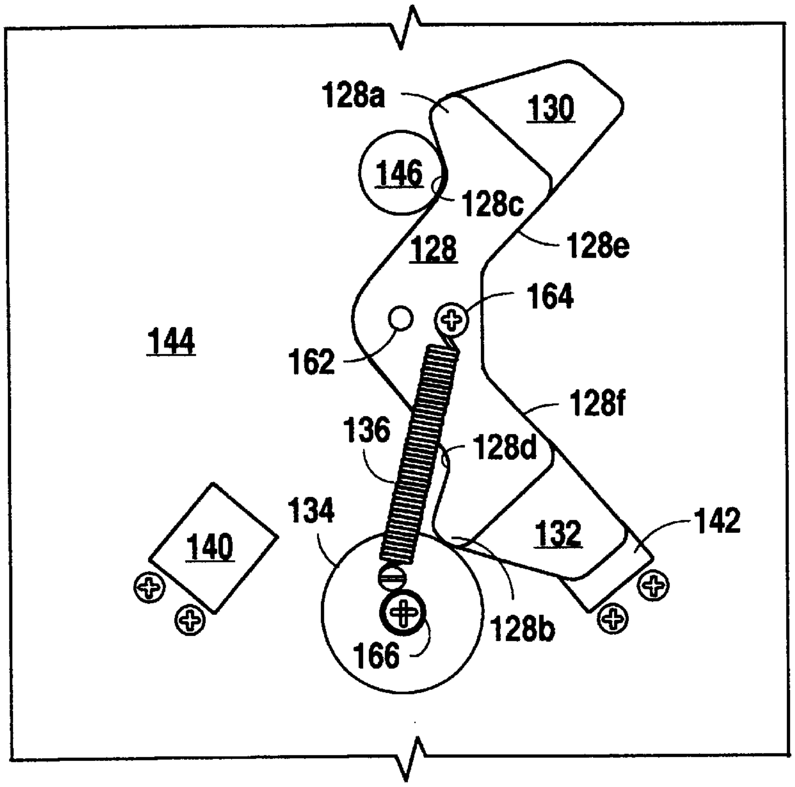
FIG. 11 is a front elevational view of the rotation limiter of the therapeutic bed of FIG. 1 shown in a position of maximum positive rotation.
Figure 12:
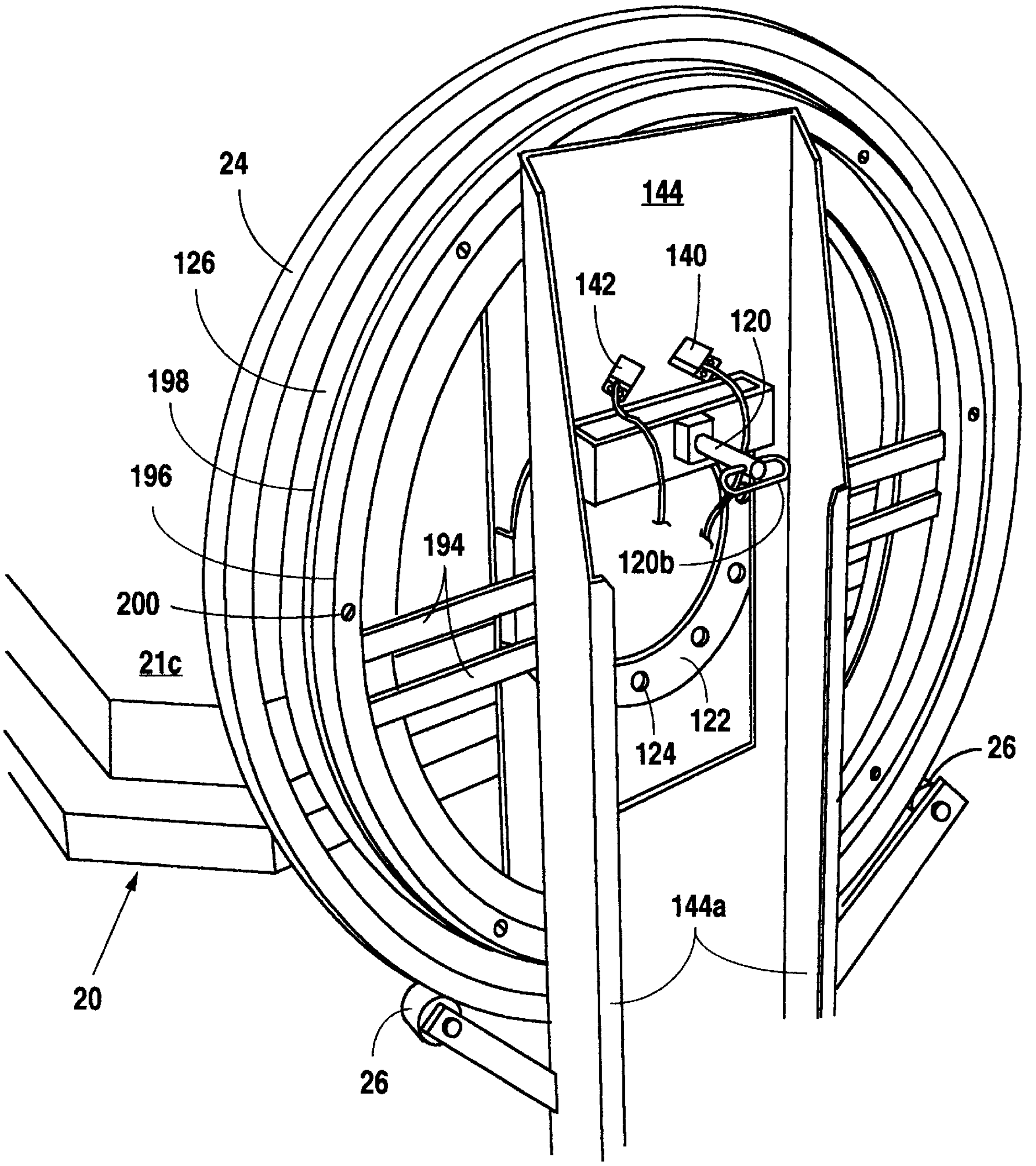
FIG. 12 is a perspective view of the foot portion of the therapeutic bed of FIG. 1 looking toward the head of the bed.
Figure 13:
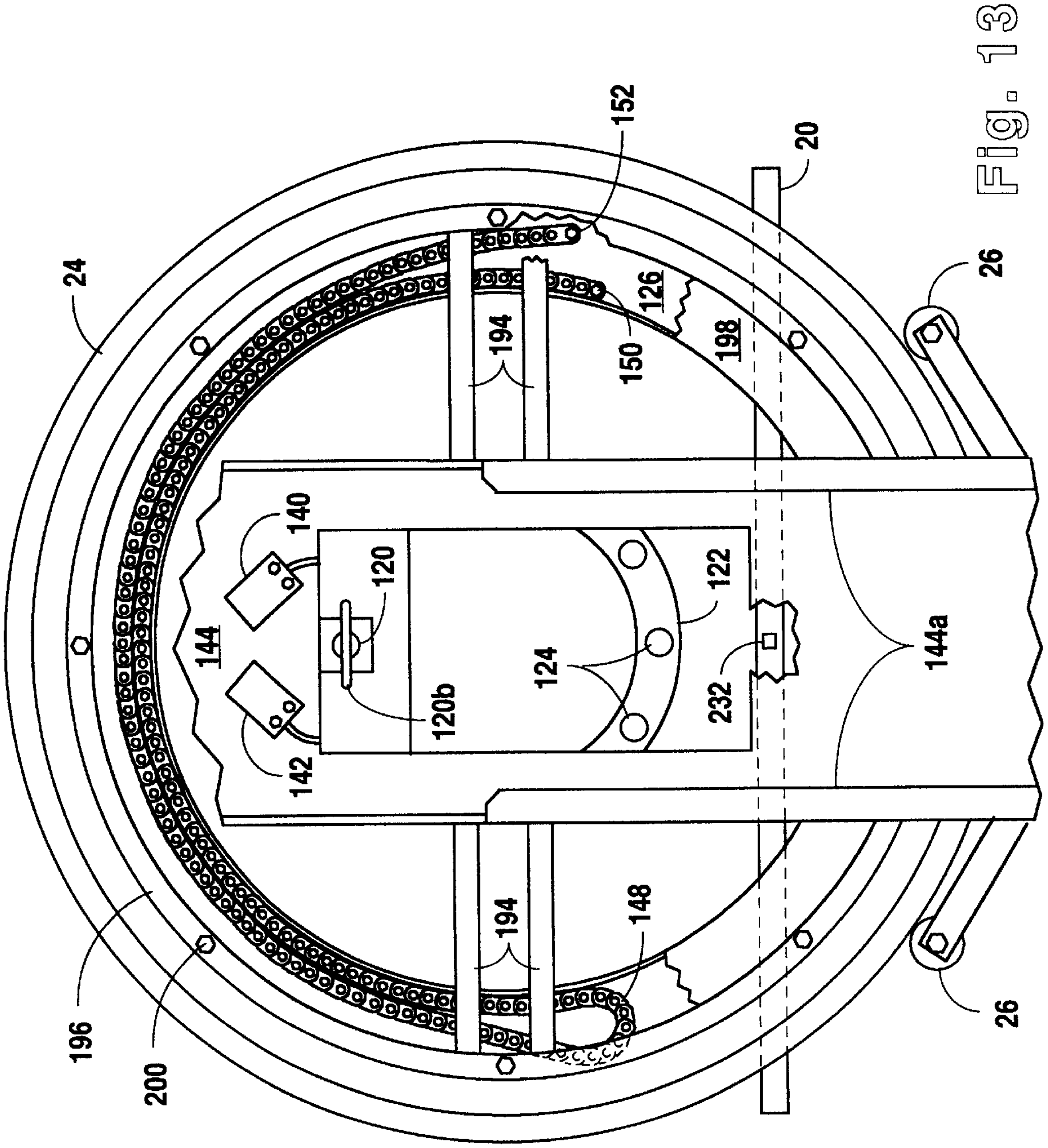
FIG. 13 is a rear elevational view of the therapeutic bed of FIG. 1.

FIGS. 8 through 13 illustrate an apparatus at the foot of bed 10 for supplying a direct electrical connection between non-rotating base frame 16 and rotating patient support platform 20. As best shown in FIGS. 8 and 13, end ring 24, which is fastened to rotating patient support platform 20, is also connected to an annular channel 126 that serves as a housing for a cable carrier 148. Cable carrier 148 carries an electrical cable (not shown) comprising power, ground, and signal wires as is customary in the art. Channel 126, which preferably has a C-shaped cross-section, may be attached to end ring 24 by way of support bars 192. Because channel

126 is attached to end ring 24, channel 126 rotates with patient support platform 20. As shown in FIGS. 12 and 13, an annular cover 198 is connected to upright foot frame 144, which extends upward from base frame 16. Cover 198 is preferably mounted on a ring 196 with fasteners 200, and ring 196 is preferably mounted to support bars 194 that extend from stiffeners 144*a* of foot frame 144. Cover 198, which is preferably made of metal to shield cable carrier 148 from radio frequency signals external of bed 10, is positioned longitudinally adjacent channel 126 to retain cable carrier 148 within channel 126, but cover 198 is not connected to channel 126. Thus, channel 126 is free to rotate with end ring 24, but cover 198 is stationary. One end 150 of cable carrier 148 is attached to channel 126, and the other end 152 of cable carrier 148 is attached to cover 198. The length of cable carrier 148 is preferably sufficient to allow patient support platform 20 to rotate a little more than 360 degrees in either direction. This arrangement provides a direct, wire-based electrical connection to the rotating part of bed 10 while still allowing a complete rotation of patient support platform 20 in either direction.

Figure 18:
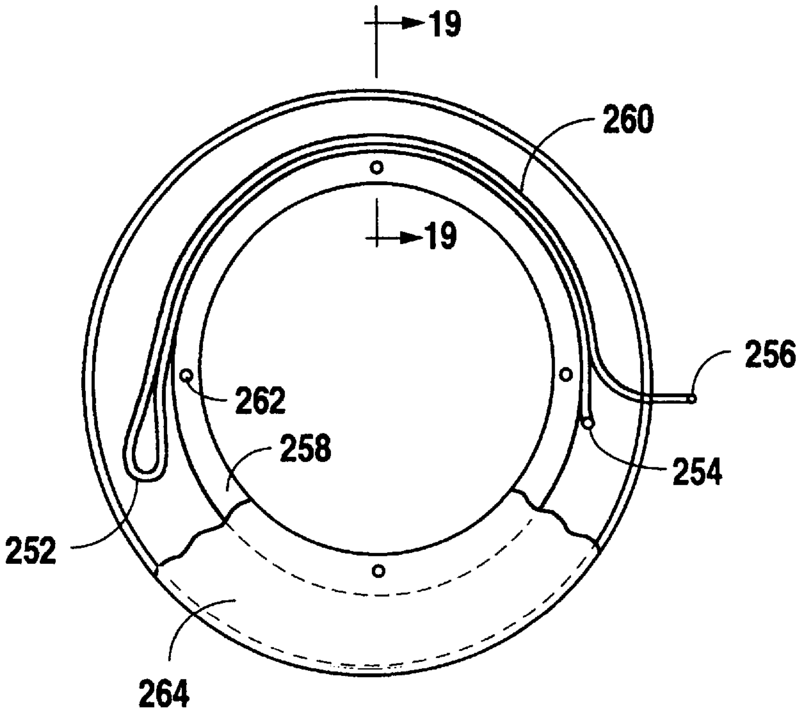
FIG. 18 is a rear elevational view of a flexible PCB disposed within an annular channel of a therapeutic bed in accordance with the present invention.
Figure 19:
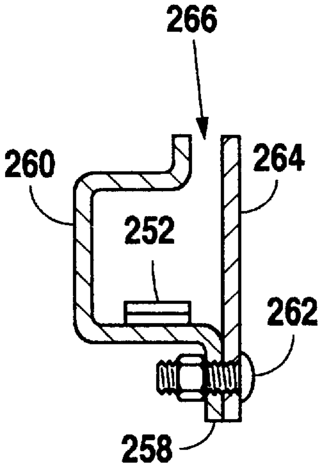
FIG. 19 is a cross-sectional view of the flexible PCB and annular channel of FIG. 18.
Figure 20:
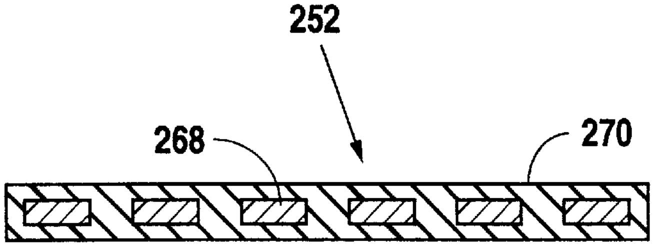
FIG. 20 is an enlarged cross-sectional view of the flexible PCB of FIG. 18.

More preferably, as shown in FIG. 18, instead of cable carrier 148, a flexible PCB 252 may be used to supply a direct electrical connection between non-rotating base frame 16 and rotating patient support platform 20. FIG. 18 is a view of a preferred embodiment in the same direction as FIG. 13, but FIG. 18 shows only flexible PCB 252 and its channel 260 and cover 264 for the sake of clarity. Like channel 126 described above, channel 260 is basically C-shaped in cross-section as shown in FIG. 19. However, channel 260 has an inner flange 258 to which cover 264 is attached, preferably with fasteners 262. Flexible PCB 252 resides generally within channel 260. A gap 266 exists between channel 260 and cover 264 through which one end of flexible PCB 252 may pass for attachment to non-rotating base frame 16 (not shown) at connection 256. The other end 254 of flexible PCB 252 is attached to channel 260, which is attached to rotating patient support platform 20. Like cover 198 above, cover 264 is preferably made of metal to shield flexible PCB 252 from radio frequency signals external of bed 10. As shown in FIG. 20, flexible PCB 252 comprises a plurality of flexible conductive strips 268 surrounded by a flexible insulator 270. Conductive strips 268 carry signals or ground connections, as desired, and multiple flexible PCB's 252 may be used if necessary, depending on the number of signals required. Like cable carrier 148 above, flexible PCB 252 is preferably long enough to allow patient support platform 20 to rotate a little more than 360 degrees in either direction.

Figure 10:
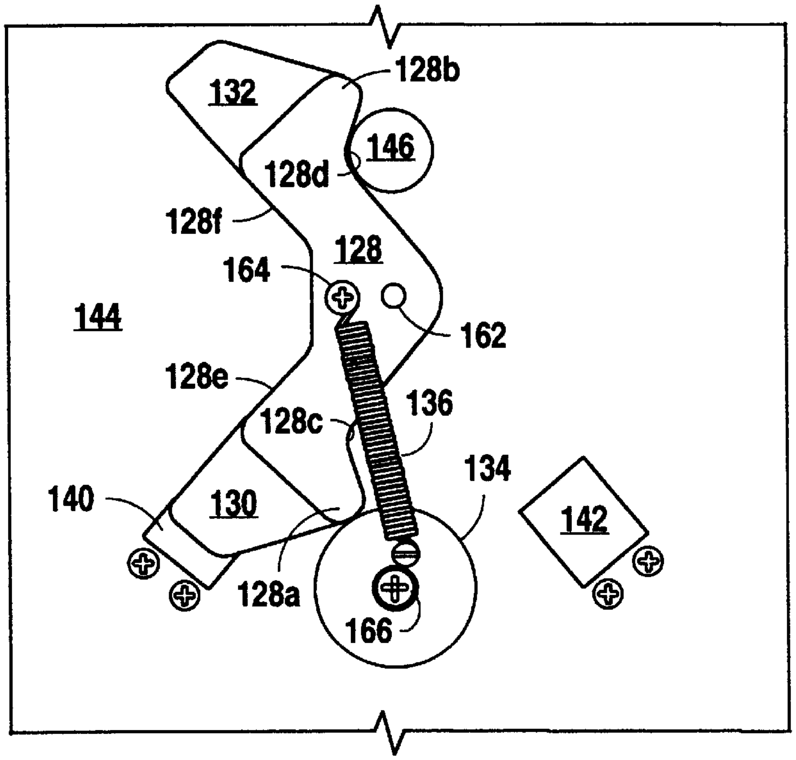
FIG. 10 is a front elevational view of the rotation limiter of the therapeutic bed of FIG. 1 shown in a position of maximum negative rotation.

To prevent excessive rotation of patient support platform 20 and the attendant damage that excessive rotation would cause to cable carrier 148 or flexible PCB 252 and its enclosed electrical wires, a rotation limiter 128 is provided on the inner surface of upright foot frame 144 as shown in FIGS. 8, 10, and 11. Rotation limiter 128 is pivotally mounted on frame 144 at point 162 and comprises contact nubs 128*a* and 128*b* for engaging a boss 134 that protrudes from frame 144. Thus, rotation limiter 128 may pivot about point 162 between the two extreme positions illustrated in FIGS. 10 and 11. Rotation limiter 128 preferably has a pair of tabs 130, 132 that cooperate with sensors 140 and 142, respectively, which are mounted in frame 144. Sensors 140, 142 are preferably micro switches but may be any type of sensor that is suitable for detecting the presence of tabs 130, 132. By respectively detecting the presence of tabs 130 and 132, sensors 140 and 142 provide an indication of the direction in which patient support platform 20 has been rotated. A spring 136 is attached to rotation limiter 128 at over-center point 164 and to boss 134 at point 166. Spring 136 keeps rotation limiter 128 in either of the two extreme positions until rotation limiter 128 is forced in the opposite direction by a stop pin 146, as discussed below.

Still referring to FIGS. 8, 10, and 11, rotation limiter 128 has fillets 128*c*, 128*d* and flats 128*e*, 128*f* for engaging stop pin 146, which is rigidly attached to crossbar 168. When patient support platform 20 is in its initial supine position (i.e., the position corresponding to zero degrees of rotation and referred to herein as the "neutral supine position"), stop pin 146 is located at the top of its circuit between flats 128*e* and 128*f*. As used herein to describe the rotation of end ring 24 and, necessarily, patient support platform 20, "positive" rotation means rotation in the direction of arrow 170 as shown in FIG. 8, and "negative" rotation means rotation in the direction of arrow 172. As end ring 24 is rotated in the positive direction, stop pin 146 engages flat 128*f* and forces rotation limiter 128 into the extreme position shown in FIG. 11 under the action of spring 136. End ring 24 may be rotated slightly more than 360 degrees in the positive direction until stop pin 146 engages fillet 128*c*, at which point rotation limiter 128 prevents further positive rotation. End ring 24 may then be rotated in the negative direction to return to the neutral supine position. As end ring 24 approaches the neutral supine position, stop pin 146 will engage flat 128*e*. Further rotation in the negative direction beyond the neutral supine position will force rotation limiter 128 into the extreme position shown in FIG. 10 under the action of spring 136. End ring 24 may be rotated slightly more than 360 degrees in the negative direction until stop pin 146 engages fillet 128*d*, at which point rotation limiter 128 prevents further negative rotation. In this manner, stop pin 146 and rotation limiter 128 cooperate to limit the rotation of platform 20 so that the electrical wires in cable carrier 148 will not be ripped out of their mountings and the direct electrical connection will be preserved. Limiting rotation also serves to prevent tangling or extubation of patient care lines.

Referring to FIGS. 8, 9, 12, and 13, the foot of bed 10 preferably has a positioning ring 122 with a central opening 118 through which patient care lines may pass as discussed above. Positioning ring 122, which is preferably fastened to support bars 192, has one or more circumferential holes 124 for cooperation with one or more longitudinal lock pins 120 to lock patient support platform 20 into one or more predetermined rotational positions. Preferably, the one or more lock pins 120 can only lock the patient support platform 20 into the zero degree supine position, so that the step of removing the lock pin will not impede quick rotation of the patient support platform 20 to the zero degrees supine position in the event that emergency care, such as cardiopulmonary resuscitation, is needed by the patient.

Lock pin 120, which is mounted in upright frame 144, is capable of limited longitudinal movement along its central axis to engage or disengage a hole 124 of positioning ring 122, as desired. Preferably, lock pin 120 and positioning ring 122 include a twistable locking mechanism for preventing accidental disengagement of lock pin 120 from positioning ring 122. For example, lock pin 120 may be provided with a protrusion such as nub 120*a* that fits through slot 124*a* of hole 124. After pin 120 is pushed through hole 124 sufficiently for nub 120*a* to clear positioning ring 122, handle 120*b* may be used to twist lock pin 120 such that nub 120*a* prevents retraction of pin 120. Alternatively, lock pin 120 and positioning ring 122 may be respectively provided with cooperating parts of a conventional quarter-turn fastener or the like. Any such suitable device for preventing disengagement of lock pin 120 from positioning ring 122 by twisting lock pin 120 about its central axis is referred to herein as a twist lock.

Figure 21:
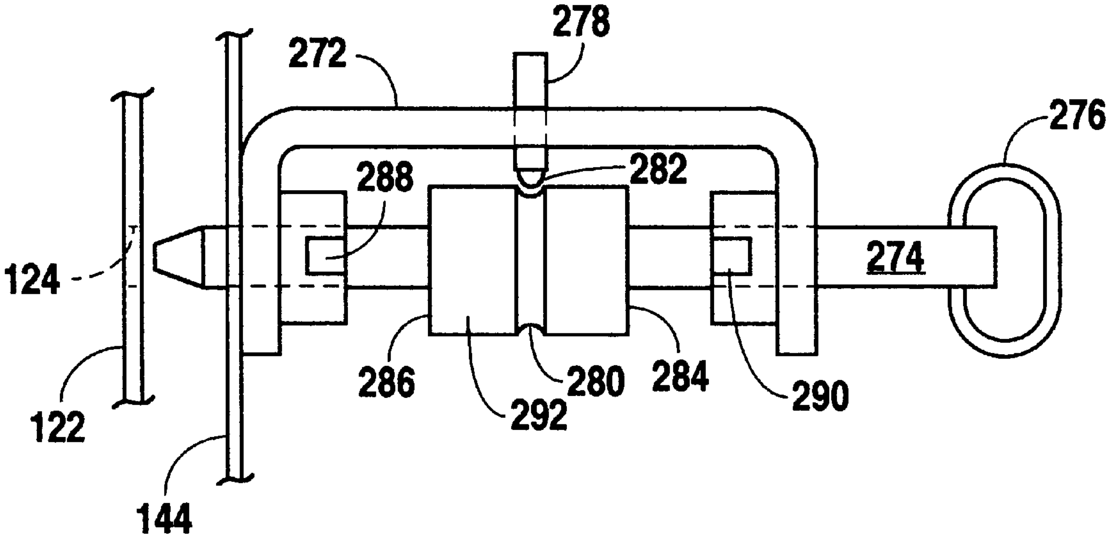
FIG. 21 is a top view of a lock pin assembly for a therapeutic bed in accordance with the present invention.

FIG. 21 illustrates a lock pin 274 with a spring-loaded detent 278 and proximity switches 288, 290 may be mounted to frame 144 with a bracket 272. Lock pin 274 has a central boss 292 with a peripheral groove 280 for cooperation with ball 282 of detent 278 in the neutral position shown in FIG. 21. In the neutral position, pin 274 is disengaged from hole 124 of locking ring 122, and proximity switches 288, 290 preferably send "neutral" signals to the control system to electrically prevent rotation of patient support platform 20. If handle 276 is used to push pin 274 into engagement with a hole 124 of locking ring 122, ball 282 of detent 278 engages edge 284 of boss 292, and proximity switch 288 senses edge 286 of boss 292 and sends a "locked" signal to the control system to electrically prevent rotation of patient support platform 20 in addition to the mechanical locking of pin 274 in locking ring 122. If motor-operated rotation of patient support platform 20 is desired, handle 276 may be used to pull pin 274 to its fully retracted position in which ball 282 of detent 278 engages edge 286 of boss 292, and proximity switch 290 senses edge 264 of boss 292 and sends an "unlocked" signal to the control system to allow automated rotation of patient support platform 20.

Figure 22:
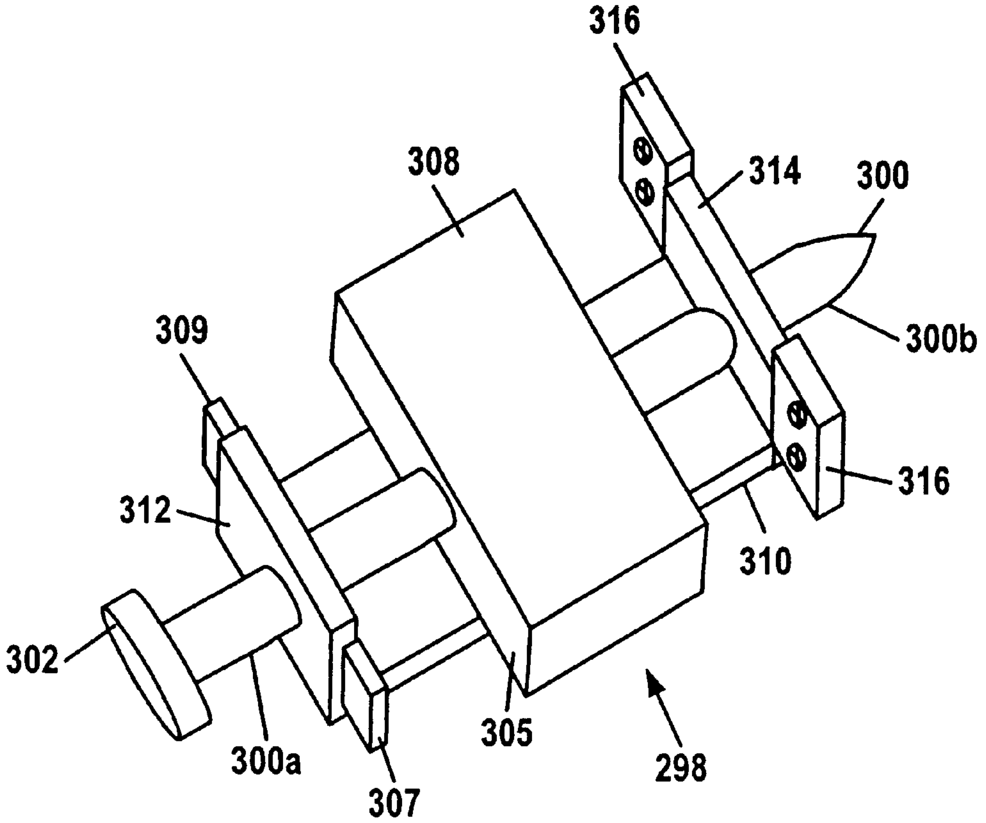
FIG. 22 is a perspective view of an alternative lock pin assembly for the therapeutic bed of FIG. 1.
Figure 22A:
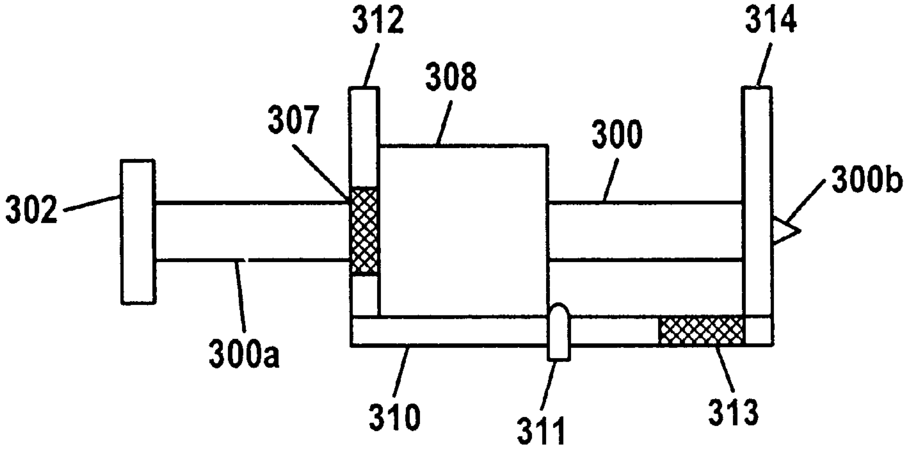
FIG. 22A is a side view of the lock pin assembly of FIG. 22.

FIGS. 22 and 22A illustrate an alternative three-position lock pin mechanism 298 comprising a lock pin 300 mounted on pin mounts 312 and 314 of yoke 310. A block 308 is rigidly mounted on the lock pin 300 and slides between the pin mounts 312 and 314. A push/pull knob 302 mounted on a back end 300*a* of the lock pin 300 is used to push or retract the lock pin 300 into one of three positions. In a "locked" position, the forward end 300*b* of the lock pin 300 is engaged into a hole 124 (FIG. 9) of locking ring 122, mechanically preventing rotation of patient support platform 20 (FIG. 1). In an "unlocked" position, the lock pin 300 is fully retracted so that edge 305 of block 308 abuts against pin mount 312. Any position between these the "locked" and "unlocked" positions is defined as a "neutral" position.

Position detection switches 307 and 309 are toggled from their default states (open or closed) into their non-default states (closed or open) by the edge 305 of block 308 when the push/pull knob 302 is fully retracted. Likewise, position detection switch 313 is toggled into its non-default state by block 308 when the push/pull knob 302 is fully inserted. When engaged by the block 308, position detection switch 307 closes a circuit that provides power to an electromechanical brake 332 (FIG. 23) used to impede movement of shaft 324 of a motor 322 that powers lateral rotation to the patient support platform 20. The other position detection switches 309 and 313 transmit logic signals to control the motor control logic 338 operating the same motor. The combined feedback from switches 309 and 313 indicate whether the lock pin 300 is in the locked, unlocked, or neutral position.

Mounting brackets 316 disposed on either side of pin mount 314 are provided for bolting the lock pin mechanism 298 to the upright frame 144 (FIG. 12). Furthermore, a spring loaded ball-bearing detent 311 impedes vibration or accidental movement of the block 308 out of the fully "locked" and "unlocked" positions.

Figure 14:
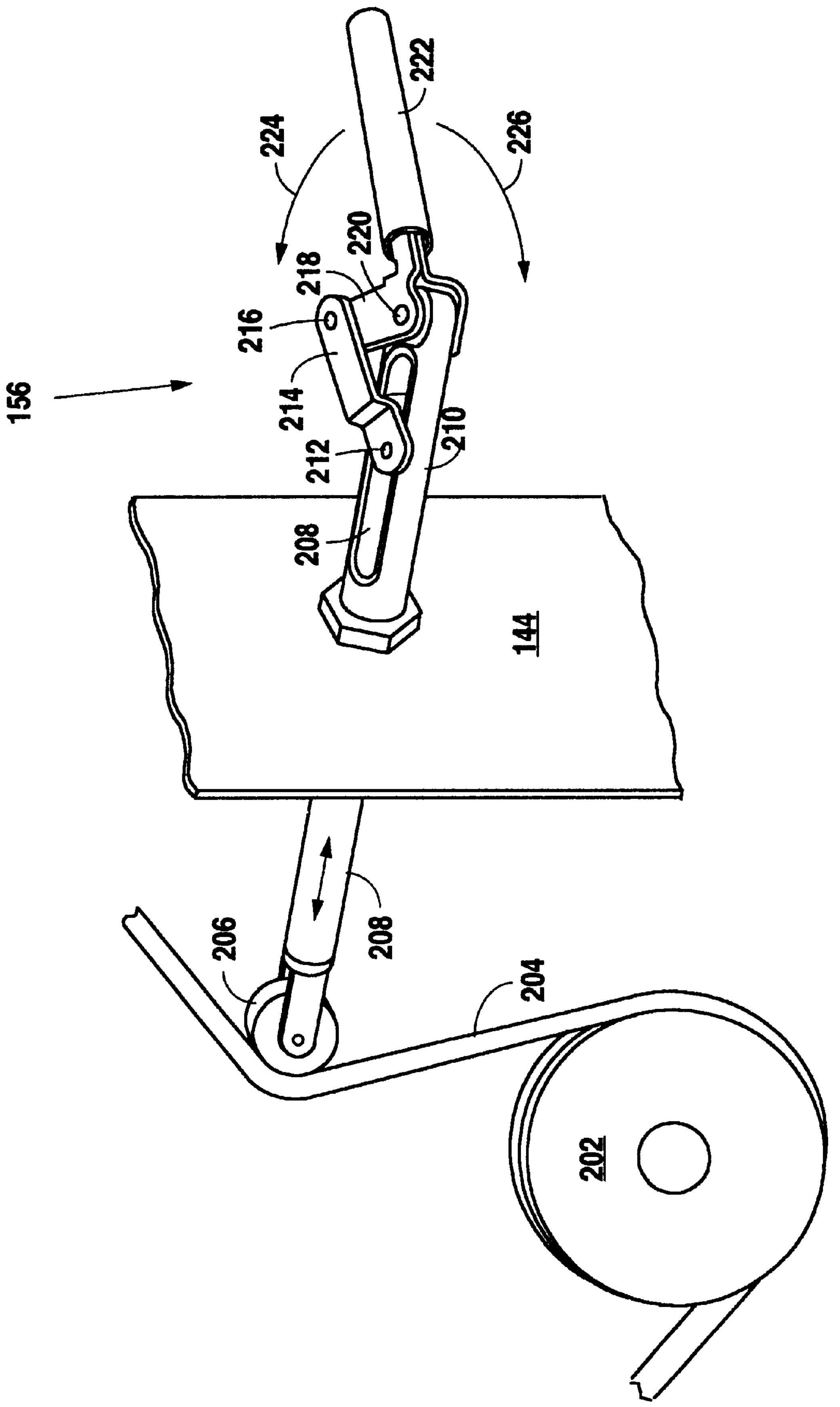
FIG. 14 is a perspective view of the quick release mechanism for the drive system of the therapeutic bed of FIG. 1.

As discussed in international application number PCT/IE99/00049, bed 10 preferably has a drive system essentially comprising a belt drive between patient support platform 20 and an associated electric motor 152 at the foot end of base frame 16. The drive system may be of the type described in Patent Specification No. WO97/22323, which is incorporated herein by reference. As illustrated in FIG. 14, bed 10 preferably includes a quick release mechanism 156 installed on foot frame 144 to provide a means to quickly disengage patient support platform 20 from the belt drive system. Quick release 156 may be conveniently made from a tool and jig lever available from WDS Standard Parts, Richardshaw Road, Grangefield Industry Estate, Pudsey, Leeds, England LS286LE. Quick release 156 comprises a mounting tube 210 secured to foot frame 144. A lever 222 is pinned to tube 210 at point 220. A tab 218 extends from lever 222, and a linkage 214 is pinned to tab 218 at point 216. Linkage 214 is also pinned at point 212 to a shaft 208 that is slidably disposed within tube 210. Shaft 208 extends through foot frame 144 toward belt 204 which is engaged with pulley 202 of the drive system. A roller 206 is attached to shaft 208 for engaging belt 204. By rotating lever 222 in the direction of arrow 224, roller 206 is forced into engagement with belt 204, which provides sufficient tension in belt 204 to engage patient support platform 20 with the drive system. By rotating lever 222 in the direction of arrow 226, roller 206 is retracted from belt 204, which disengages patient support platform 20 from the drive system thereby allowing manual rotation of patient support platform 20. This capability of quick disengagement of the drive system to allow manual rotation of patient support platform 20 is very useful in emergency situations, such as when a patient occupying bed 10 suddenly needs CPR. In such a circumstance, if patient support platform 20 is not in a supine position, a caregiver may quickly and easily disengage the drive system using quick release 156, manually rotate patient support platform 20 to a supine position, lock the support platform 20 in place, and begin administering CPR or other emergency medical care.

As disclosed in international application number PCT/IE99/00049, the rotational position of patient support platform 20, which is governed by motor 152 of the aforementioned drive system, may be controlled through the use of a rotary opto encoder. Alternatively, the rotational position of patient support platform 20 may be controlled through the use of an angle sensor 232 (shown schematically in FIG. 13) of the type disclosed in U.S. Pat. No. 5,611,096, which is incorporated herein by reference. As disclosed in the '096 patent, angle sensor 232 comprises a first inclinometer (not shown) that is sensitive to its position with respect to the direction of gravity. By mounting angle sensor 232 to patient support platform 20 in the proper orientation, the output signal from angle sensor 232 may be calibrated to control the rotational position of patient support platform 20 in cooperation with motor 152. Likewise, angle sensor 232 may include another properly oriented inclinometer (not shown) that may be used in association with rams 15 and 17 (see FIG. 1) to control the Trendelenburg position of patient support platform 20.

Figure 23:
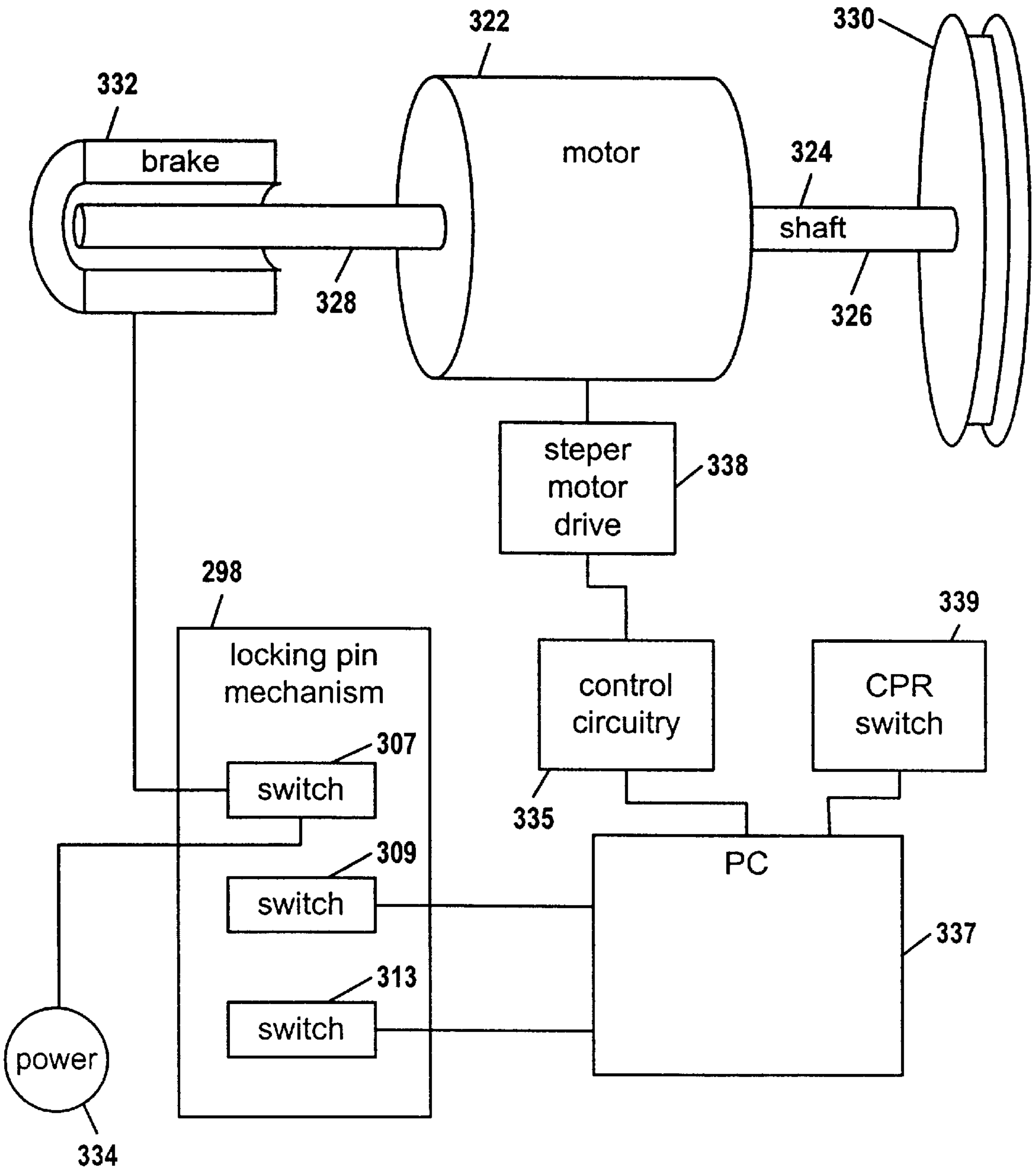
FIG. 23 is a block diagram of a system that brakes the movement of a motor shaft in one embodiment of a system that controls rotation of a patient support platform of the therapeutic bed of FIG. 1.

FIG. 23 illustrates an embodiment of a drive system 320 to control the rotational movement of the patient support platform 20 of therapeutic bed 10. The drive system 320 comprises a stepper motor 322 operated by a stepper motor drive 338 controlled by control circuitry 335 which is in turn commanded by a computer 337. The motor 322 further comprises a shaft 324 with a forward end 326 and a back end 328 opposite the forward end protruding from the motor 322. A pulley 330 mounted on the forward end 326 of the shaft 324 receives a belt 204 (FIG. 14) to control the rotational movement of patient support platform 20. A fail-safe electromechanical brake 332 is provided to engage shaft 324 and impede its rotation. The brake 332 is disengaged by supplying power to it, thereby allowing the shaft 324 to rotate freely under the control of motor 322. This configuration prevents the shaft 324, and by extension, the patient support platform 20, from freely spinning if there is an interruption of power to the motor 322 and the brake 332.

Preferably, the drive system 320 is integrated with the lock pin mechanism 298 (FIG. 22). The position detection switch 307 regulates the flow of power from a power supply 334 to the clutch 332. The switch 307 is closed when the lock pin 300 (FIG. 22) is fully retracted. When closed, power flows from the power supply 334 to the clutch 332, allowing the shaft 324 to rotate freely or under the power of motor 322. If the lock pin 300 is pushed into a "neutral" or "locked" position, the switch 336 reverts to the open position, engaging the clutch 332 to impede shaft 324 rotation.

The computer 337, which ultimately controls the operation of stepper motor 322, also receives signals from the locking pin mechanism 298, namely, from position detection switches 309 and 313, to detect the position of the lock pin 300. The computer 337 may also receive signals from a CPR switch 339. The CPR switch 339 is provided to interrupt any kinetic therapy program that may be running and cause the motor 322 to rotate the patient support platform 20 back to a supine position.

If the lock pin 300 is in the "locked" position, the computer 337 will cause the stepper motor 322 to halt rotation. This is in addition to the redundant stopping protection provided by the brake 332. Likewise, if the lock pin 300 is in the "neutral" position, the computer 337 will normally stop the motor 322 from rotating, unless a "CPR" signal 334 is received, in which case the motor 322 will rotate the patient support platform 20 back to a supine position.

Figure 24:
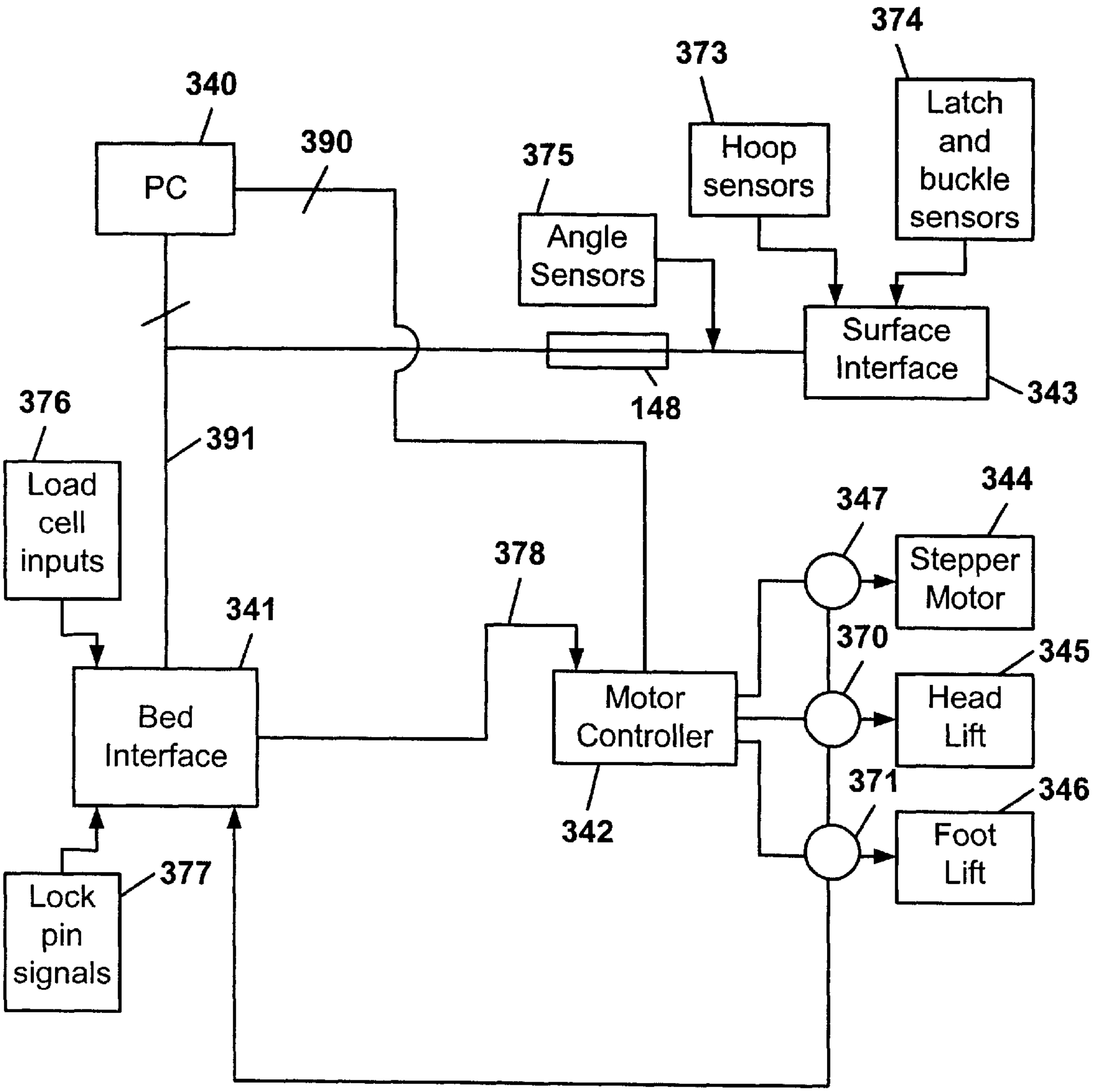
FIG. 24 is a block diagram illustrating one embodiment of a redundant hardware and software configuration for operating the motors of the therapeutic bed of FIG. 1.
Figure 25:
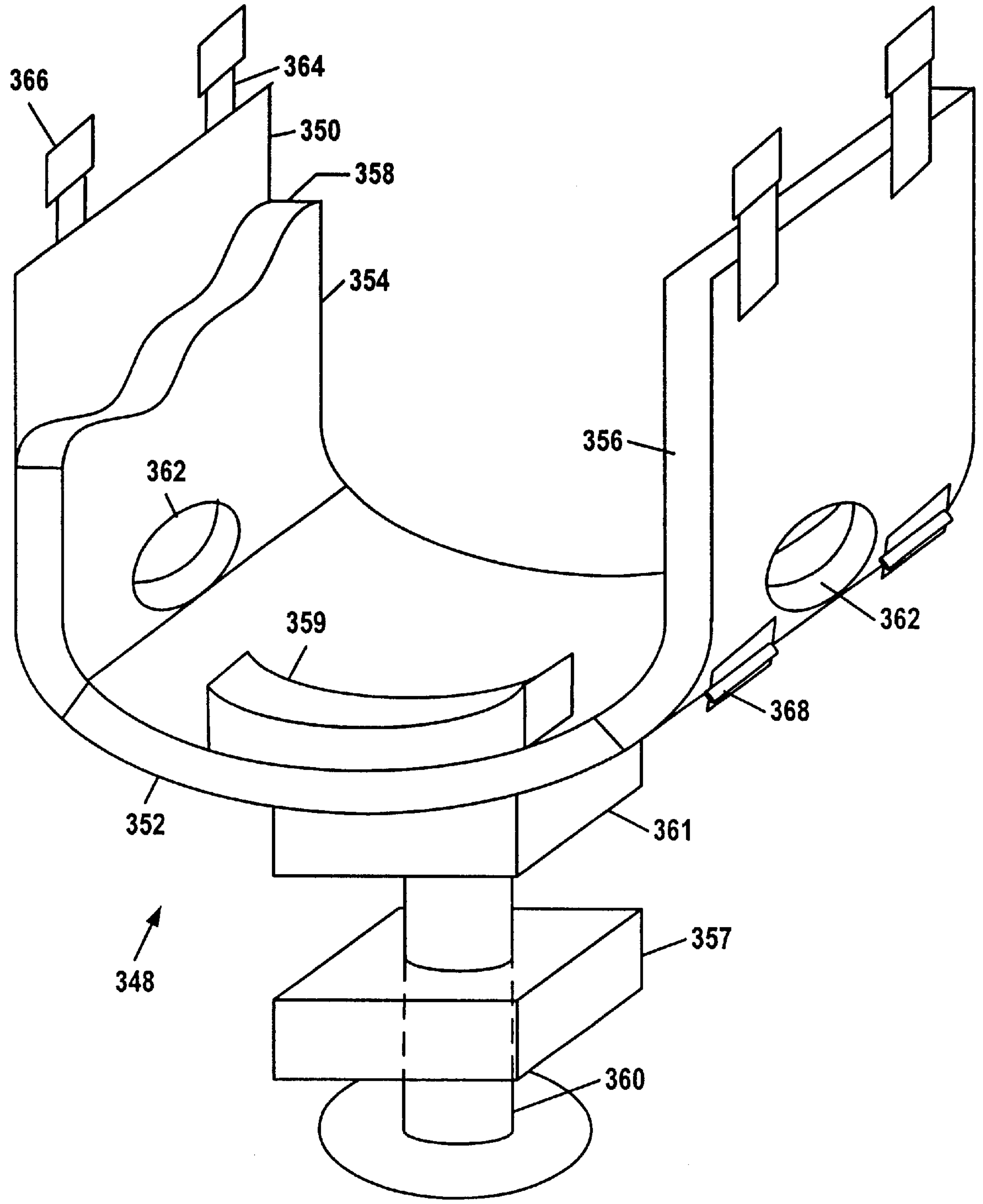
FIG. 25 is a perspective view of an alternative head restraint apparatus for the therapeutic bed of FIG. 1.

FIG. 24 is a block diagram illustrating another embodiment of a redundant hardware and software configuration 392 for operating the motors of therapeutic bed 10 of FIG. 1. A software-based computer 340 is provided to enable a user to monitor and control the operations of the therapeutic bed. The computer 390 relays signals to and from a motor controller circuit 342 through a parallel cable 390 to control the operation of the bed 10. The computer also relays serial signals through a serial bus 391 that is shared by the computer 340, a bed interface circuit 341, and a surface interface circuit. The motor controller 342 operates the bed's stepper motor 344, which rotates the patient support platform 20. The motor controller 342 also operates the bed's head and foot lifts 345 and 346, which incline the bed into Trendelenburg or reverse Trendelenburg positions.

Before the motor controller 342 can activate the stepper motor 344, head lift 345, or foot lift 346 in conformity with the commands received from the computer 340 via the parallel cable 390, the motor controller 342 must first receive an enable signal 378 from the bed interface circuit 341. The bed interface circuit 341, in turn, will only relay an enable signal 378 if it receives an expected sequence of serial signals from the computer 340 over the bus 391. Furthermore, the bed interface circuit 341 is configured to provide an enable signal 378 only if the sequence of serial enable signals from the computer 340 is received at regular intervals, for example, once every second. This redundancy minimizes the chances that an operating system crash on the computer 340 will cause the motors 344 through 346 to rotate in an unintended fashion. While it is not unusual for an operating system crash to freeze the output bits on a parallel port, the chances of an operating system crash causing the computer 340 to repeatedly generate the expected serial sequence over the bus 391 is infinitesimally small. In addition, both the computer 340 and the bed interface circuit 341 monitor the signals received from the other. If the computer 340 or bed interface circuit 341 detects a malfunction in the other, it will trigger an alarm to notify medical personnel of the malfunction.

It will be apparent to those of ordinary skill in the art, in light of the present specification, that other configurations could be devised to minimize the chances that the therapeutic bed 10 would rotate uncontrollably in the event of a system failure. For example, the motor controller 342 could be operated by the serial bus 391 rather than through the parallel cable 390. Alternatively, the motor controller 342 itself could be configured to require a coded serial data stream at repeated intervals in order to activate any of the motors 344 through 346. It will be understood that these alternative configurations fall within the scope of the present invention.

Further redundancy features are provided by monitoring devices 347 through 371, which verify proper operation of the therapeutic bed 10 by monitoring the signals communicated from the motor controller 342 to motors 344 through 346. The outputs of monitoring devices 347 through 371 are relayed to the bed interface circuit 341, which encodes them to a serial data format for output onto the serial data bus 391.

Also illustrated in FIG. 24 are various inputs received by the surface interface circuit 343, the bed interface circuit 341, and the serial bus 391, some or all of which information is encoded to a serial format so that it can be relayed to the computer 342 along the serial bus 391. Bed interface circuit 341 receives inputs 376 from load cells provided to monitor the patient's weight and signals 377 from the lock pin mechanism 298 to indicate whether the bed is locked or unlocked. The surface interface circuit 343 receives input signals 373 from hoop sensors to detect whether there is a break in the end ring 22 (FIG. 2) and signals 374 from latch and buckle sensors and pressure sensitive tape switches 234 (FIG. 17) to indicate whether a patient is sufficiently secured for kinetic or prone therapy. The surface interface circuit 343 encodes the signals and relays them along the serial bus 391 through the cable carrier 148 back to the computer 340. The serial bus 391 receives signals 375 from a Trendelenburg angle sensor indicating the angle at which the patient support platform 20 is inclined and from rotation angle sensors 232 (FIG. 13) indicating the angle of rotation of the patient support platform 20.

Figure 29:
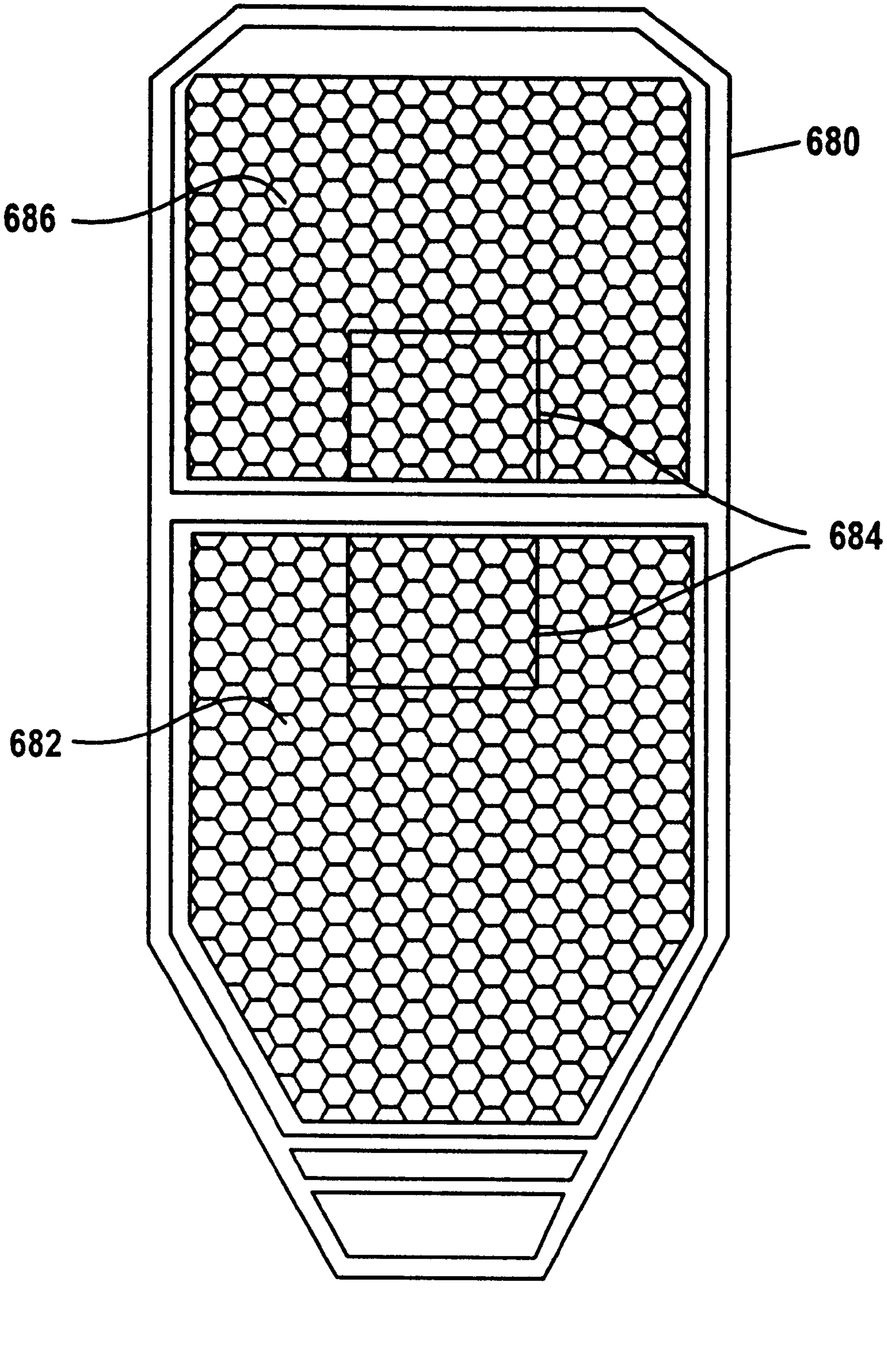
FIG. 29 is a top view illustrating the use of honeycomb composite core panels to provide a radiolucent surface for the patient support platform 20 of FIG. 1.

FIG. 29 is a top view illustrating the use of honeycomb composite core panels to provide a lightweight yet strong radiolucent surface for the patient support platform 20 of FIG. 1. First and second honeycomb composite core panels 682 and 686 with rectal hatches 684 are provided to support a patient. The first and second honeycomb composite core panels 682 and 686 are mounted on top of transverse beams (not shown) of a frame 680 of the patient support platform 20.

Figure 30A:
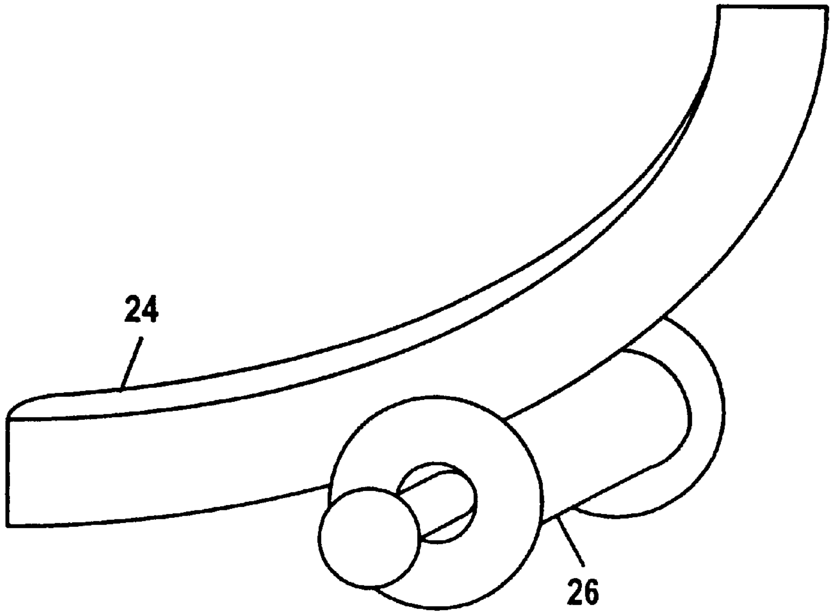
FIG. 30A is a perspective view of a floating roller used to guide the upright end rings of FIG. 12.
Figure 30B:
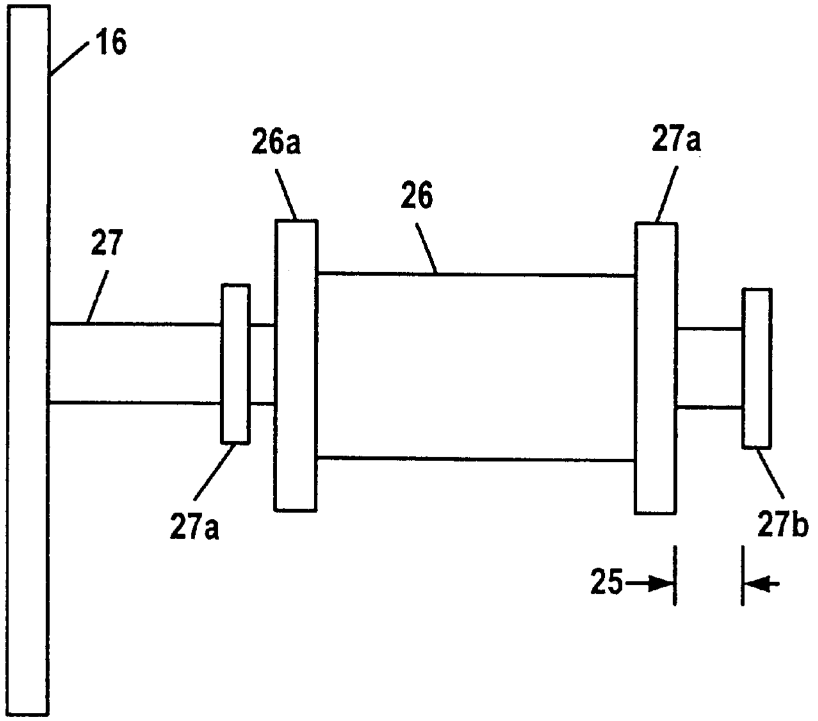
FIG. 30B is a side view of the floating roller of FIG. 30A.

FIGS. 30*a* and 30*b* illustrate one embodiment of the rollers 26 used to guide the upright end rings 22 and 24 of the therapeutic bed 20. Two flanged ends 26*a* and 26*b* of the roller 26 prevent the end rings 22 and 24 from slipping off the roller 26. The roller 26 is slidably and rotatably mounted on an axle 27 between two roller stops 27*a* and 27*b*. Preferably, one of the four or more rollers 26 used to guide the end rings 22 and 24 is fixed, that is, designed with minimal clearance 25 (such as less than 0.5 centimeters)

between the flanges 26*a* and 26*b* and the respective roller stops 27*a* and 27*b* to stabilize the base frame 16 and end rings 22 and 24 on which the base frame 16 is mounted. Preferably, however, the other rollers are floating, that is, they are provided with greater clearance 25 (such as between approximately one and three centimeters) than was provided for the fixed roller. Making all but one of the rollers "float" permits the patients support platform 20 with its accompanying upright end rings 22, 24, to be manufactured and assembled with wider tolerances. This innovation solves a problem that may occur when, due to minor variations in the manufacture and construction of the patient support platform 20, the end rings 22 and 24 would not otherwise be able to fit between the flanges 26*a* and 26*b* of all of the rollers 26 of the therapeutic bed 10.

Figure 31:
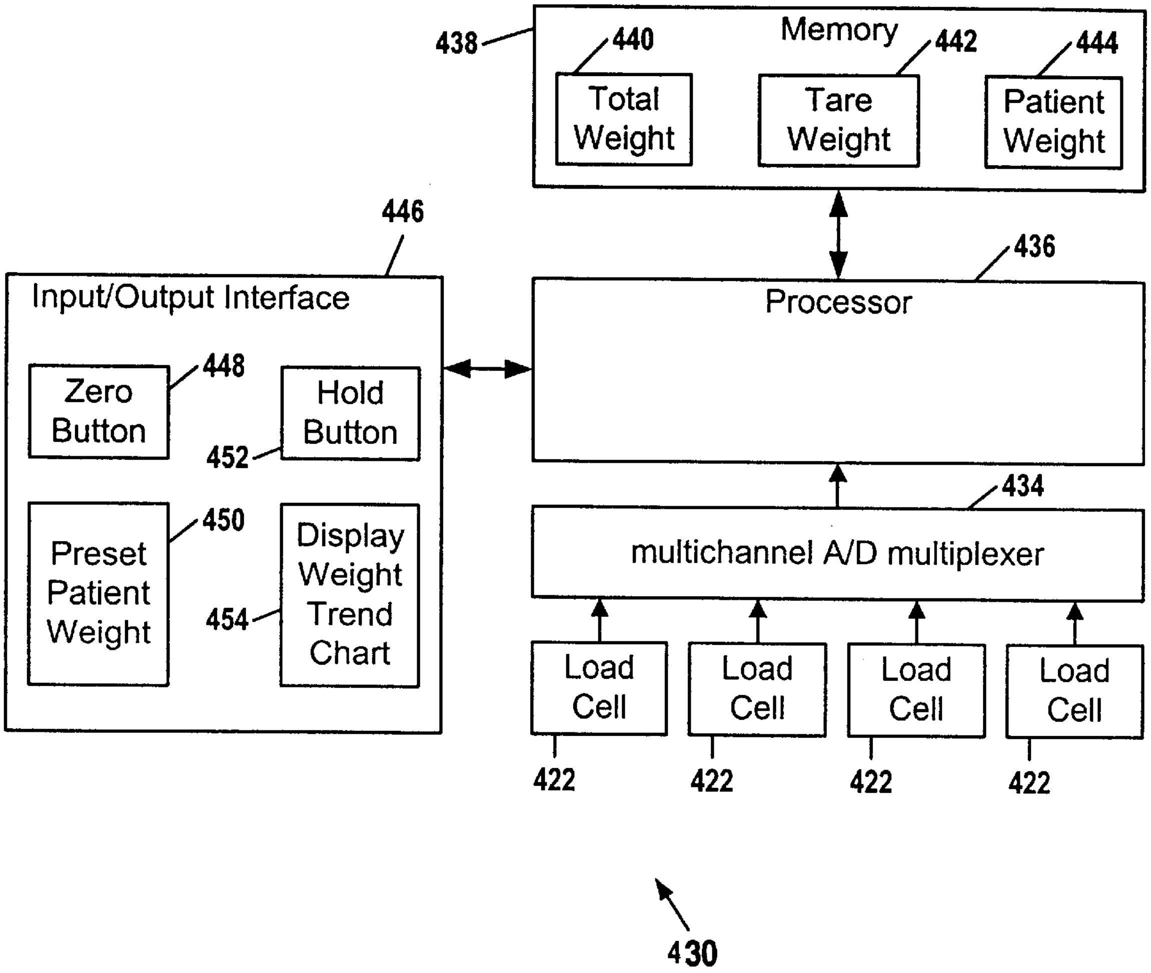
FIG. 31 is a block diagram illustrating a weight monitoring system for one embodiment of a therapeutic bed in accordance with the present invention.

A preferred embodiment of the therapeutic bed 10 of the present invention constantly monitors a patient's weight. FIG. 31 illustrates a weight monitoring system 430 comprising a plurality of caster mounted load cells 422 each providing a current or voltage output 423 proportional to the weight supported by each load cell 422. The current or voltage output 423 of each load cell 422 is received by a corresponding analog-to-digital converter 434 and converted into a digital signal that is sent to a processor 436 (which may be a computer). The processor 436 sums the digital signals to determine the total load. The processor is communicatively coupled to a memory bank 438, which stores the detected total weight 440, the tare weight 442 of the bed (i.e., the total weight of the bed frame, cushions, sheets, and other bed and medical equipment attached to the bed, but not including the patient), and the patient's weight 444. Preferably, the patient's weight 444 is recorded over time, providing a weight trend record for the patient.

Because the load cells 422 are mounted on the casters, a patient's weight can be measured regardless of the rotational or Trendelenberg angle of the patient support platform 20.

An input/output interface 446, such as a touch-screen monitor or a control unit having buttons, switches, and/or knobs, is communicatively coupled to the processor 436. The input/output interface 446 provides several functions for operating the weight monitoring system 430, including a zero function 448, a hold function 452, and a present patient weight function 450.

Engaging the zero function 448 (by, for example, pressing a "zero button") signals the processor 436 that the currently detected weight is the tare weight 442 of the bed. The processor 426 stores this load value in memory 438 as the tare weight 442 of the bed. Later, when a patient is placed on the bed, the processor 436 computes the patient's weight 444 by subtracting the tare weight 442 from the detected total weight 440.

Selecting the hold function 452 (by, for example, pressing a "hold button") signals the processor 436 to adjust the tare weight 442 to account for any weight added or subtracted during the hold period. The duration of the hold period may be preset, with the weight monitoring system 430 signaling the termination of the hold period with an indicator (such as a screen alert or audible beep). Alternatively, the hold function 452 may be toggled on and off, making the hold period last from the time the hold function 452 is toggled on until it is toggled off. While a hold is being applied, the weight monitoring system 430 may provide intermittent audible signals or a display reminding medical personnel to toggle the hold function 452 back off. The hold function permits medical personnel to add or remove bed accessories and medical equipment (such as pillows, IV bags, and intubation devices) to or from the bed without requiring the patient to be removed from the bed to recalibrate the tare weight 442. Additionally, a preferred embodiment of the weight monitoring system 430 alerts medical personnel (for example, through an audible alarm) if significant or abrupt weight changes are detected when the hold function 452 is not activated or toggled on. This reminds medical personnel to activate the hold function 452 before adding or removing accessories or equipment from the bed.

The preset patient weight function 450 is provided to manually enter a patient's weight 444 into the weight monitoring system 430. When this function is activated, the processor computes and records the tare weight 442 as the detected total weight 440 minus the value entered for the patient's weight 444.

The weight monitoring system 430 also provides one or more weight display functions, preferably including a weight trend chart function 454. The weight trend chart function 454 displays a group of statistics or graph representing the patient's weight trend over time. The weight trend chart function 454 helps medical personnel identify optimal and suboptimal courses of kinetic therapy. The weight trend chart function 454 also helps medical personnel detect excessive water retention or dehydration that may be caused by intubation-related treatments the patient is receiving.

The weight monitoring system 430 also comprises means for detecting and identifying malfunctioning load cells 422. In the preferred embodiment, a multichannel analog-to-digital multiplexer 434 serially converts the output of each load cell 422 into a digital signal. The digital signals are then summed by the processor 436 to determine the total weight 440 borne by the load cells 422. Because even an empty therapeutic bed 10 without any bed accessories or attached medical equipment will have some weight, each load cell 422 should signal at least a threshold amount of load. Accordingly, the processor 436 compares the digital signals received from the multiplexer 434 to preset digital thresholds corresponding to the minimum weight expected from each load cell 422 to detect anomolies that point to load cell failures. The processor may also compare the digital signals received from the analog-to-digital converters 434 to each other to detect unrealistic load disparities.

In light of the present disclosure, other means for detecting and identifying malfunctioning load cells will be readily apparent to those of ordinary skill in the art. For example, threshold comparisons could be done in analog rather than digital by using analog comparators to compare the output of each load cell 422 to present analog thresholds. Other analog comparators could compare the output of each load cell 422 to some multiple of the output of a nearby load cell 422, to detect unrealistic disparities. It will be understood that these and other modifications fall within the scope of the present invention.

Figure 32:
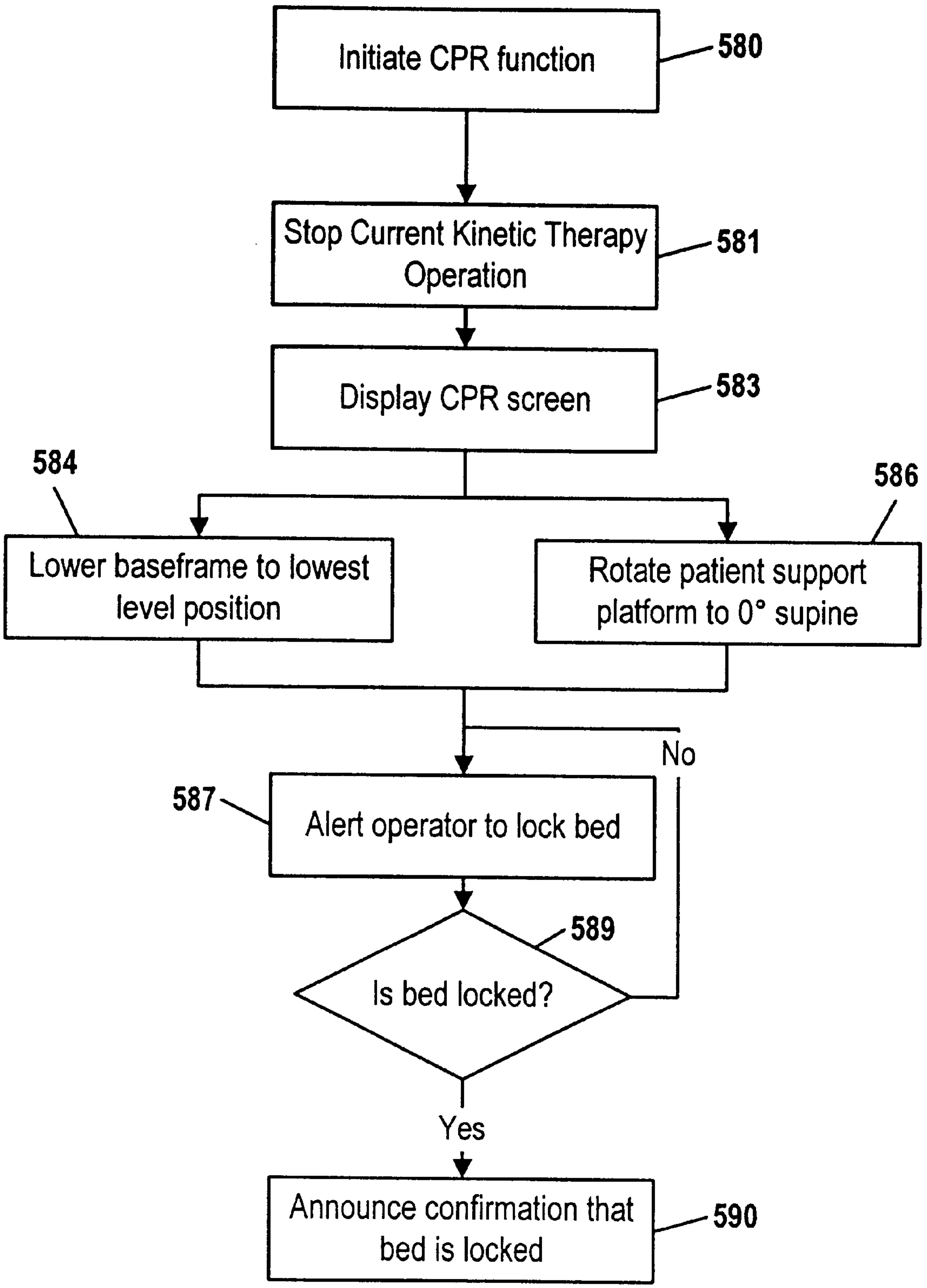
FIG. 32 is a flowchart illustrating a button-operated CPR function built into one embodiment of the therapeutic bed of the present invention.

FIG. 32 is a flowchart illustrating an automated CPR function built into one embodiment of the therapeutic bed 10 of FIG. 1. Preferably, one or more hardware-based CPR switches or buttons are mounted on the therapeutic bed 10. Additionally, a software-based CPR button is provided on each screen of the touch-screen interface whose functions are illustrated in FIGS. 35 through 44. Preferably, the automated CPR function, whether activated through a switch or through a touch screen interface button, is achieved through a computer on the therapeutic bed 10.

In block 580, a person initiates the automated CPR function in a single step by, for example, pressing a CPR button. In block 581, control circuitry on the bed 10 discontinues any ongoing kinetic therapy regimen. Next, in block 583 a CPR screen is displayed on a touch screen interface. Preferably, the patient support platform 20 can only be locked in the 0 degrees supine position. However, if the platform 20 is locked at an angle not at the 0 degrees supine position, the CPR screen (not shown) alerts the operator to unlock the bed. Then, in block 584, the base frame and patient support platform 20 are lowered to the lowest level position. Simultaneously in block 586, the patient support platform is rotated to 0 degrees supine, so that the patient support platform 20 is parallel to the floor. Preferably, all of these movements take place in 40 seconds or less. In block 587, the operator is alerted by a visual or audible signal to lock the bed. Once, as illustrated by function block 589, the bed is locked, in block 590 an audible or visual announcement is provided confirming that the bed is locked.

Figure 33:
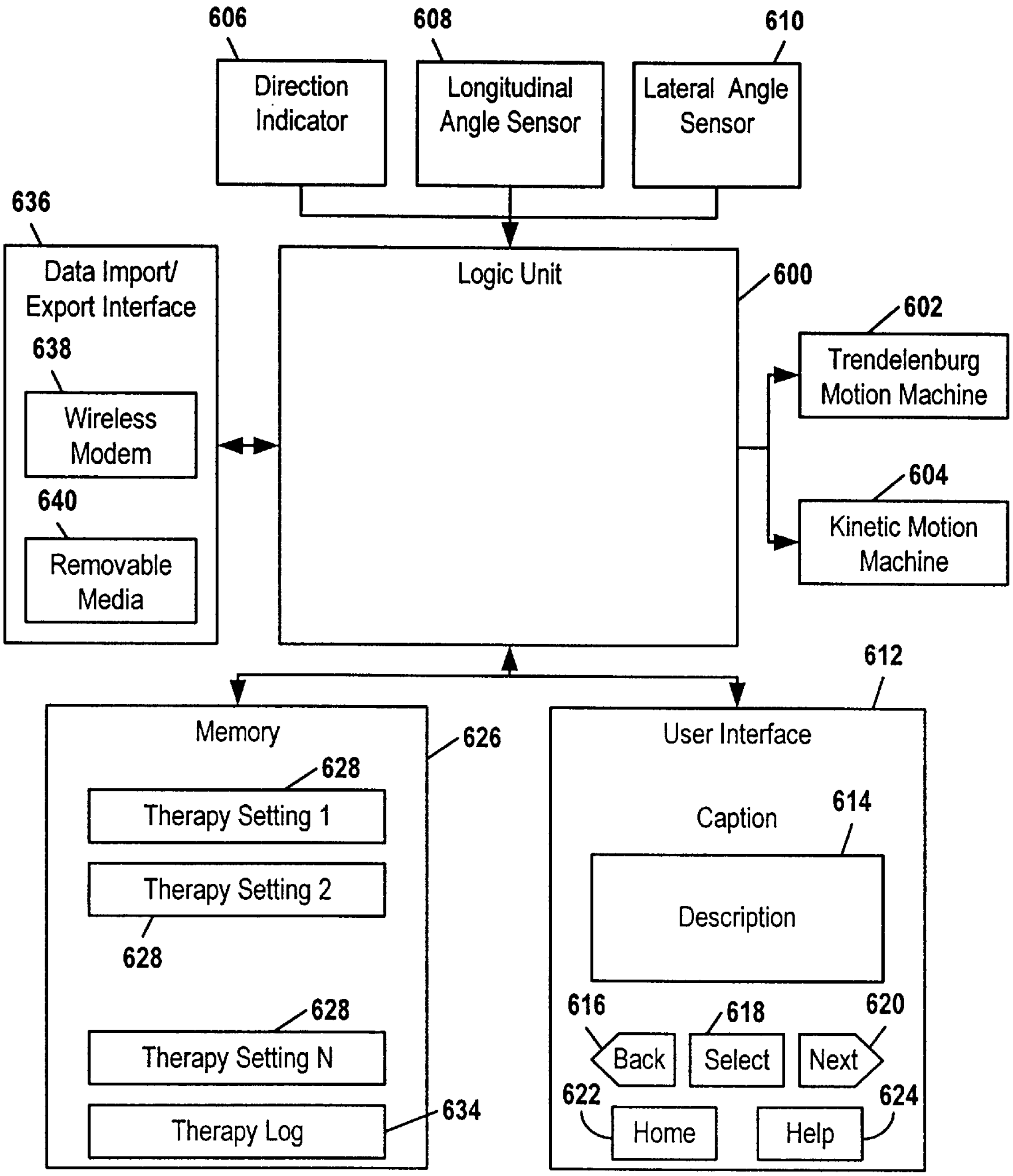
FIG. 33 is a block diagram illustrating an embodiment of the programmable therapy setting functionality of the therapeutic bed of the present invention.

FIG. 33 is a block diagram illustrating programmable therapy setting functionality incorporated into one embodiment of the therapeutic bed of the present invention. A logic unit 600 is provided to control the operation of one or more motors 602 to raise and lower the head and foot-ends of the patient support platform 20. The logic unit 600 also controls the motor 604 that rotates the patient support platform 20 along the longitudinal axis of the therapeutic bed 10. The logic unit 600 tracks the position of the patient support platform 20 with signals received from a direction indicator 606, a longitudinal angle sensor 608, and a lateral angle sensor 610.

The logic unit 600 is communicatively coupled to a user interface 612 (see, e.g., FIGS. 35–43) that enables an operator to select or program a course of kinetic therapy. The logic unit 600 is also communicatively coupled to memory 626 that stores a plurality of preprogrammed therapy settings 628 and statistics about past therapy in a therapy log 634. The user interface 612 displays a description 614 of one or more preprogrammed therapy settings 628, and allows an operator to scroll through other preprogrammed therapy settings 628 with buttons 616 and 620. The user interface 612 also provides home 622 and help 624 buttons to display a home screen or a help screen.

The logic unit 600 is also communicatively coupled to a data import/export interface 636, comprising, for example, a wireless modem 638, some form of removable media 640, such as a compact disc, floppy disc, or removable hard drive, or even a wired connection (not shown), such as a universal serial bus. The data import/export interface enables an operator to export the therapy settings 628 and therapy log 634 stored in memory 626 and to import new therapy settings 628 into memory 626.

This aspect of the present invention satisfies the need for means to facilitate greater compliance by participants in research studies to a uniform kinetic therapy protocol. It also satisfies the need by doctors to develop and implement standardized kinetic therapy regimens to provide their patients.

Figure 34:
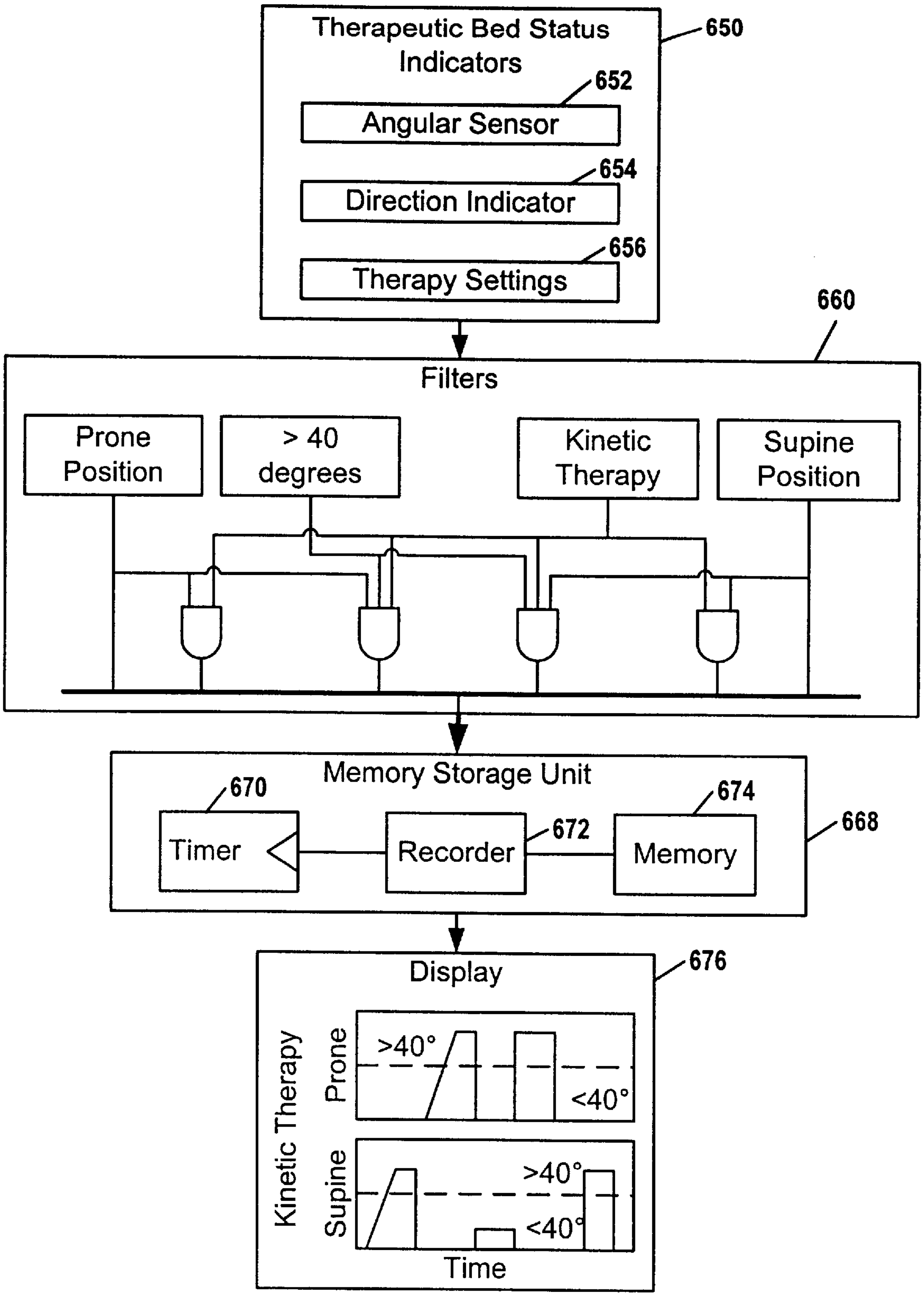
FIG. 34 is a block diagram illustrating one embodiment of the therapy logging functionality of the therapeutic bed of the present invention.
Figure 42:
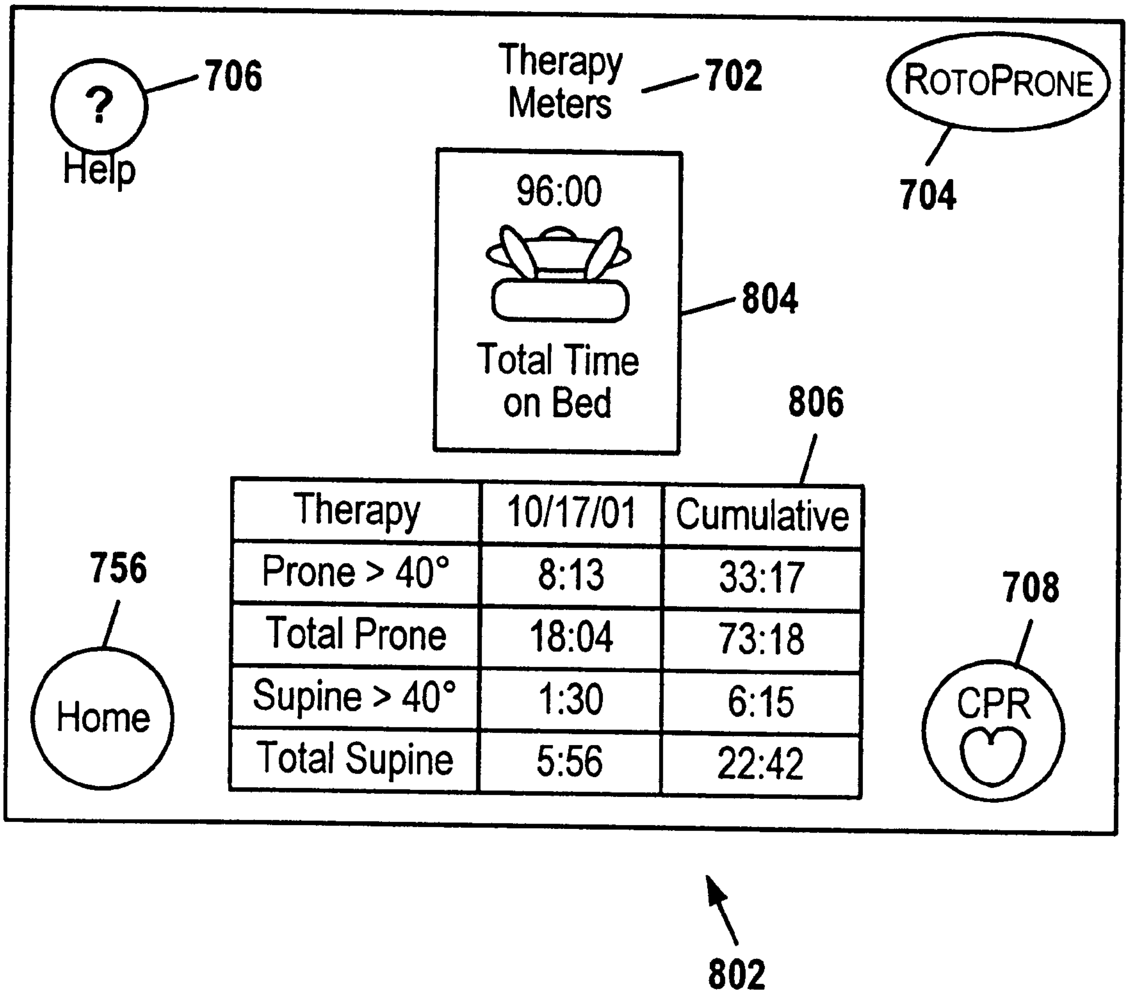
FIG. 42 illustrates a therapy meters screen of the touch screen interface of FIG. 35.

FIG. 34 is a block diagram illustrating therapy logging functionality incorporated into one embodiment of the therapeutic bed of the present invention. A plurality of filters 660 are provided that receive signals from several status indicators 650, including an angular sensor 652, a direction indicator 654, and a therapy setting indicator 656. The filters 660 indicate when the patient support platform 20 is in the prone or supine position, when it is rotated at an angle of greater than 40 degrees from the prone or supine positions, and when a patient is undergoing kinetic therapy. The information provided by the filters 660 is transmitted to a memory storage unit 668, which comprises a timer 670, a recorder 672, and memory 674 for recording total time spent in various types of stationary and kinetic therapy. The memory storage unit 668 is communicatively coupled to a display unit 676. The display unit 676 displays a graphical representation of the kinetic therapy applied to the patient with respect to time. Alternatively, the display unit 676 displays raw kinetic therapy statistics as illustrated in FIG. 42.

FIGS. 35 through 42 are graphical illustrations of several screens in one embodiment of a touch screen interface to monitor and control the various functions of the therapeutic bed 10 of the present invention.

Figure 35:
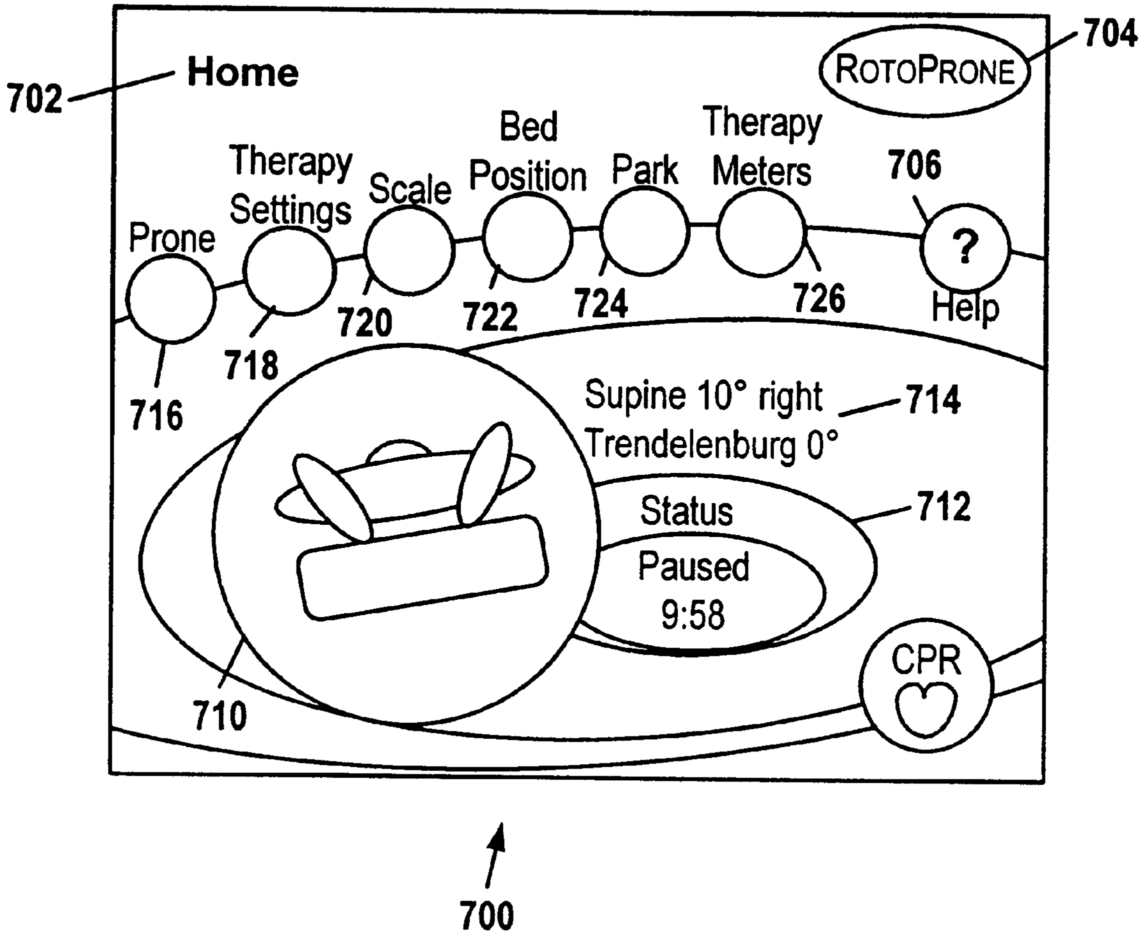
FIG. 35 illustrates one embodiment of a home screen of a touch screen interface used to monitor and control various functions of the therapeutic bed of FIG. 1.

FIG. 35 illustrates a home screen 700 which functions as a main menu for monitoring or operating the various functions of the therapeutic bed 10. The home screen 700 displays several elements that are common to many other screens as well, including a screen caption 702, a logo 704, a help button 706, and a CPR button 708 to initiate the automated CPR function of FIG. 30. The home screen 700 further comprises a bed position graphic 710 which displays the current rotational position of the bed, a text area 714 which displays the angular rotational and Trendelenburg positions of the bed 10, and a text area 712 which displays the current functional status of the bed (e.g., stopped, paused, parked, locked, and/or rotating).

The home screen 700 also displays several touch screen buttons 716–726 for monitoring or controlling the operation of the bed 10. A prone/supine button 716 is provided to rotate the bed into the 0 degrees prone or 0 degrees supine position. (Preferably, whether "prone" or "supine" is displayed will depend on the rotational position of the patient support platform 20. If in the supine position, the prone/supine button 716 will display "prone." If in the prone position, the prone/supine button 716 will display "supine.") A therapy settings button 718 is provided to program the angle limits and dwell times of a kinetic therapy regimen. A scale button 720 is provided to operate the weight monitoring system 430 (FIG. 31). A bed position button 722 is provided to raise or lower the foot and/or head of the bed. A park button 724 is provided to rotate the patient support platform 20 to a stationary rotational position. A therapy meters button 726 is provided to view the amount of time a patient has been in kinetic therapy (see, e.g., FIG. 34). The CPR button 708 mentioned earlier is provided to cause the patient support platform 10 to return to a supine and lowest possible flat position so that cardio-pulmonary resuscitation or other medical treatment can be applied to the patient (see FIG. 32). Preferably, both the CPR button 708 and the help button 706 are provided on every screen of the touch screen interface.

Preferably, the home screen 700 also provides a hidden screen lockout button 810 (FIG. 43) to make the touch screen interface non-responsive to tactile input unless a code or password is provided or some other non-public procedure is followed to reactivate the touch screen. The hidden lockout button 810 may be provided behind the screen caption 702, the logo 704, or in some other predefined area of the home screen 700. The hidden lockout button 810 may also be made provided in other screens. Providing a screen lockout function enables an operator to clean the touch screen interface without activating the bed, and also inhibits tampering by unauthorized persons (such as children) with the bed's functions.

Figure 36:
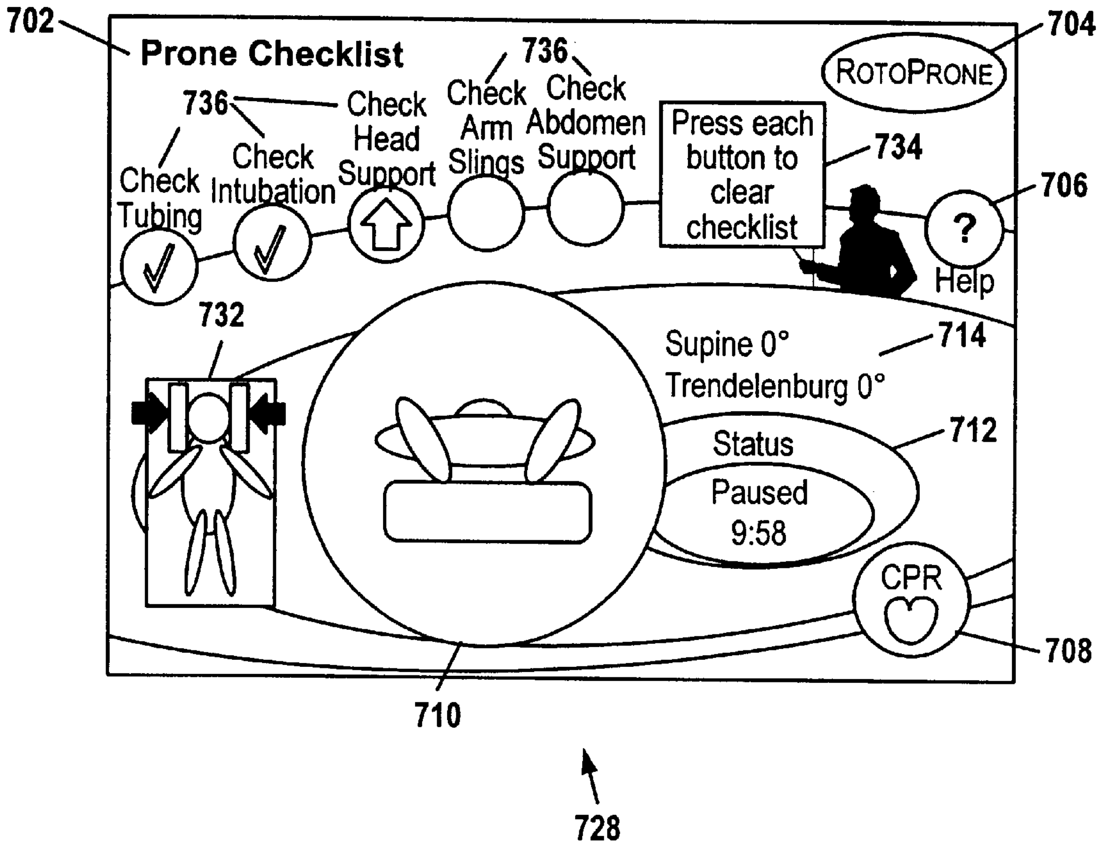
FIG. 36 illustrates a prone checklist screen of the touch screen interface of FIG. 35.

FIG. 36 illustrates a prone checklist screen 728 of the touch screen interface of FIG. 35. Like the home screen 700, the prone checklist screen 728 displays the screen caption 702, logo 704, help button 706, CPR button 708, bed position graphic 710, and text areas 712 and 714. The prone checklist screen 728 also displays a group of procedure buttons 736 and a textbox 734 instructing the operator to perform several procedures to ensure that the patient is adequately secured by the patient support platform 20. As the operator performs these operations, the prone checklist screen 728 displays a checkmark or some other indication next to each completed step. For those steps, if any, whose completion the therapeutic bed 10 is unable to automatically detect, the operator presses the displayed procedure button 736 to confirm that the associated procedure has been completed. A graphic 732 is optionally provided to illustrate each procedure that needs to be performed. Although not illustrated here, preferably a similar screen is provided to guide an operator through a checklist of procedures that must be performed prior to rotating a patient from prone to supine.

Figure 37:
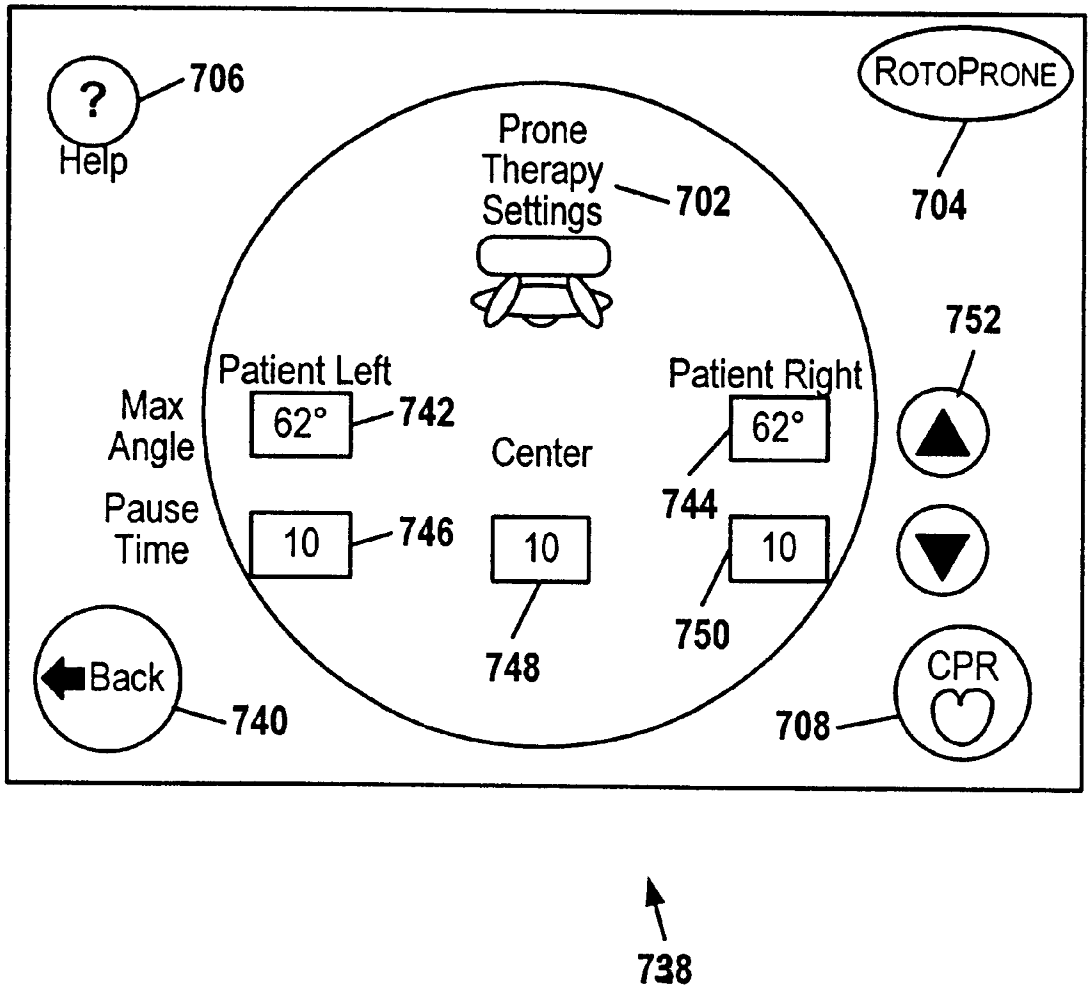
FIG. 37 illustrates a prone therapy settings screen of the touch screen interface of FIG. 35.

FIG. 37 illustrates a prone therapy settings screen 738 of the touch screen interface of FIG. 35. Like the home screen 700, the prone therapy settings screen 738 displays the screen caption 702, logo 704, help button 706, and CPR button 708. The prone therapy settings screen 738 also displays a back button 740 to return to the previous screen. Selectable text boxes and a set of increase and decrease buttons 752 are provided to set the left angle limit 742, the right angle limit 744, the left angle pause time 746, the center pause time 748, and the right angle pause time 750. Although not illustrated here, preferably a similar screen is provided to display adjustable supine therapy settings as well.

Figure 38:
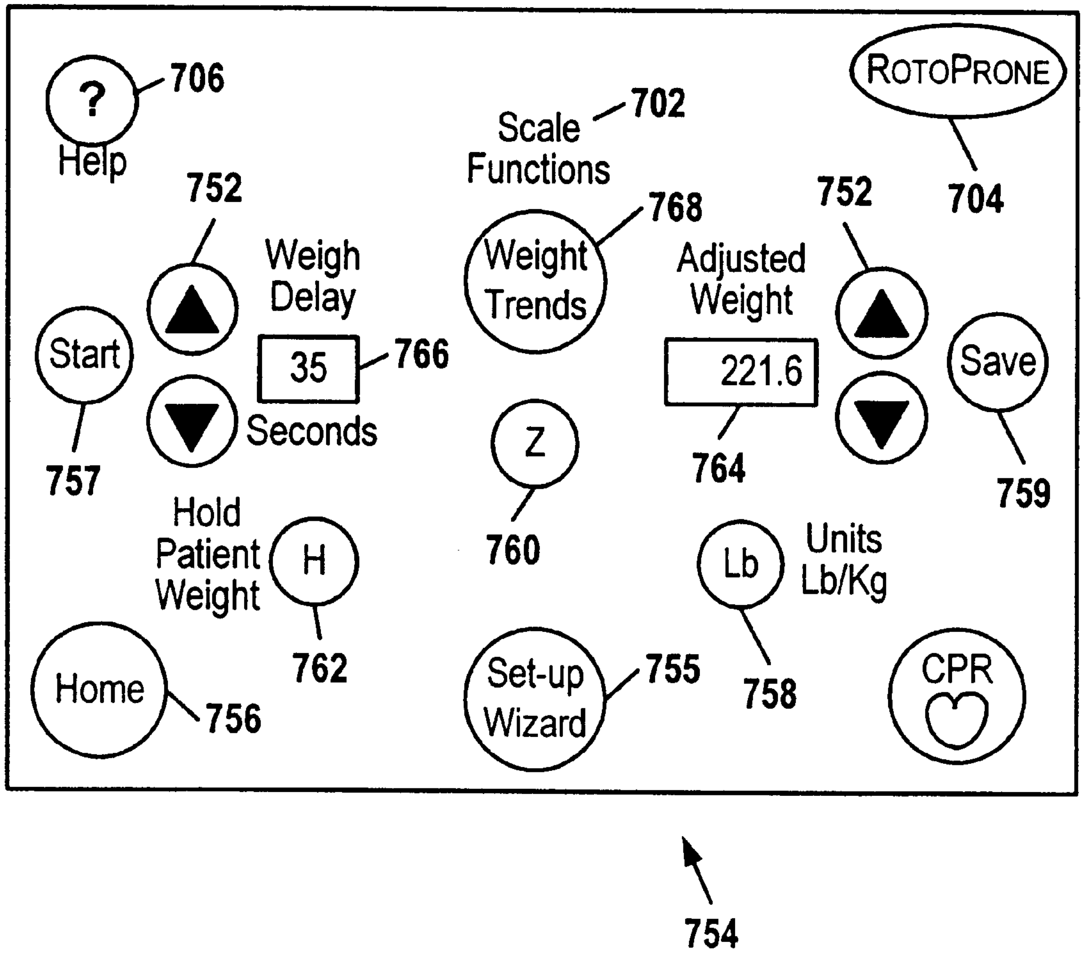
FIG. 38 illustrates a scale functions screen of the touch screen interface of FIG. 35.

FIG. 38 illustrates a scale functions screen 754 of the touch screen interface of FIG. 35. Like the prone therapy settings screen 738, the scale functions screen 754 displays the screen caption 702, logo 704, help button 706, and CPR button 708. The scale functions screen 754 also displays a home button 756 to return to the home screen 700 and a set-up wizard 755 to assist the operator in calibrating and operating the weight monitoring system 430 of the therapeutic bed 10. A weight trends button 768 is provided to display weight trend data stored in memory 438 (FIG. 31). A pair of increase and decrease buttons 752 are provided for inputting the patient weight 764. By pressing a units button 758, an operator can toggle between English and metric weight units. A save button 759 is provided to store the inputted patient weight 764 in memory 438. Another pair of increase and decrease buttons 752 are provided to set a weigh delay time 766 to delay weighing the patient. A zero button 760 is provided to indicate that the current detected weight is the tare weight of the bed (i.e., that the current load does not include the patient). A hold button 762 is provided to suspend weighing until the hold button 762 is pressed again. Any bed accessories and medical equipment added or removed during the intervening time is attributed to the tare weight, rather than the patient weight.

Figure 39:
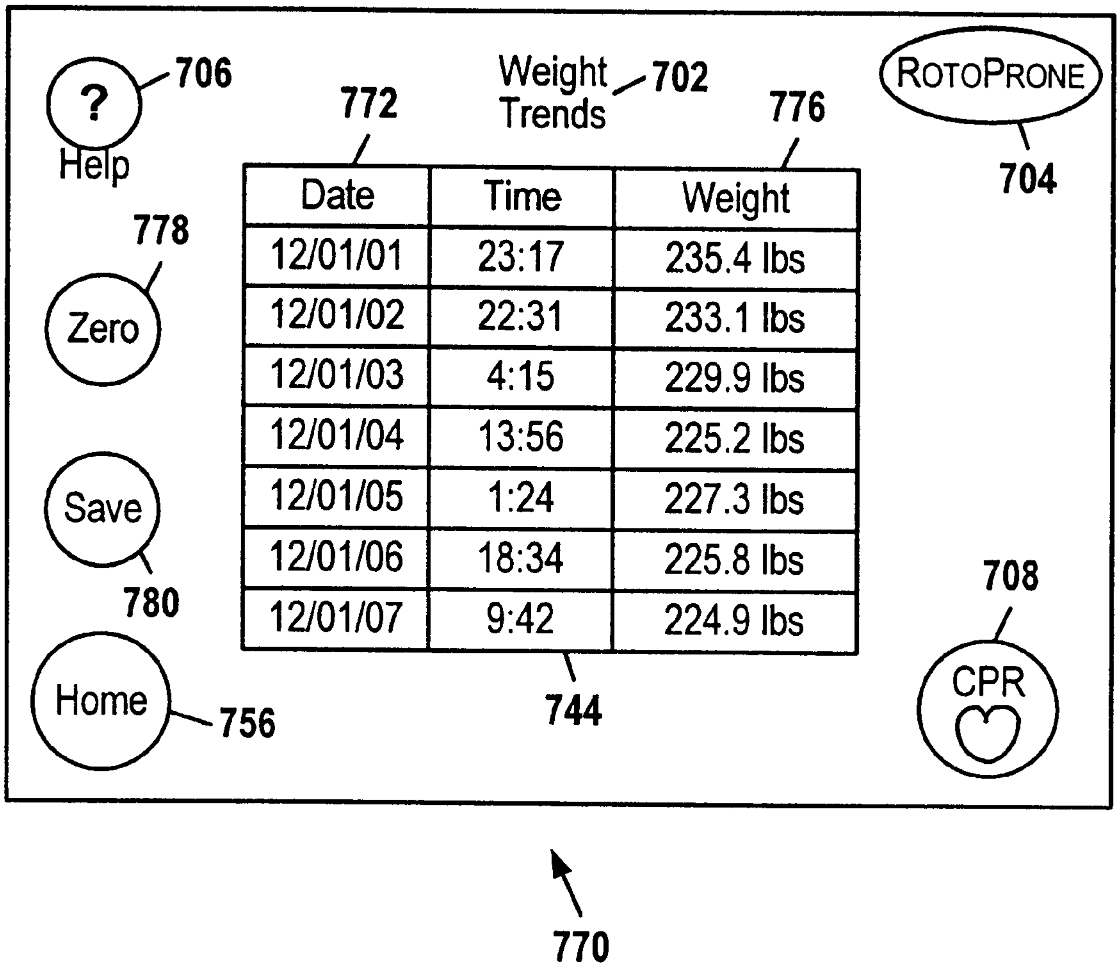
FIG. 39 illustrates a weight trend screen of the touch screen interface of FIG. 35.

FIG. 39 illustrates a weight trend screen 770 of the touch screen interface of FIG. 35. Like the scale functions screen 754, the weight trend screen 770 displays the screen caption 702, logo 704, help button 706, CPR button 708, and home button 756. The weight trends screen 702 displays weight trend data in the form of a chart showing the patient weight 776 for a given date 772 and time 776. A zero button 778 is provided to clear the chart. A save button 780 is provided to save the current patient weight to the weight trends chart.

Figure 40:
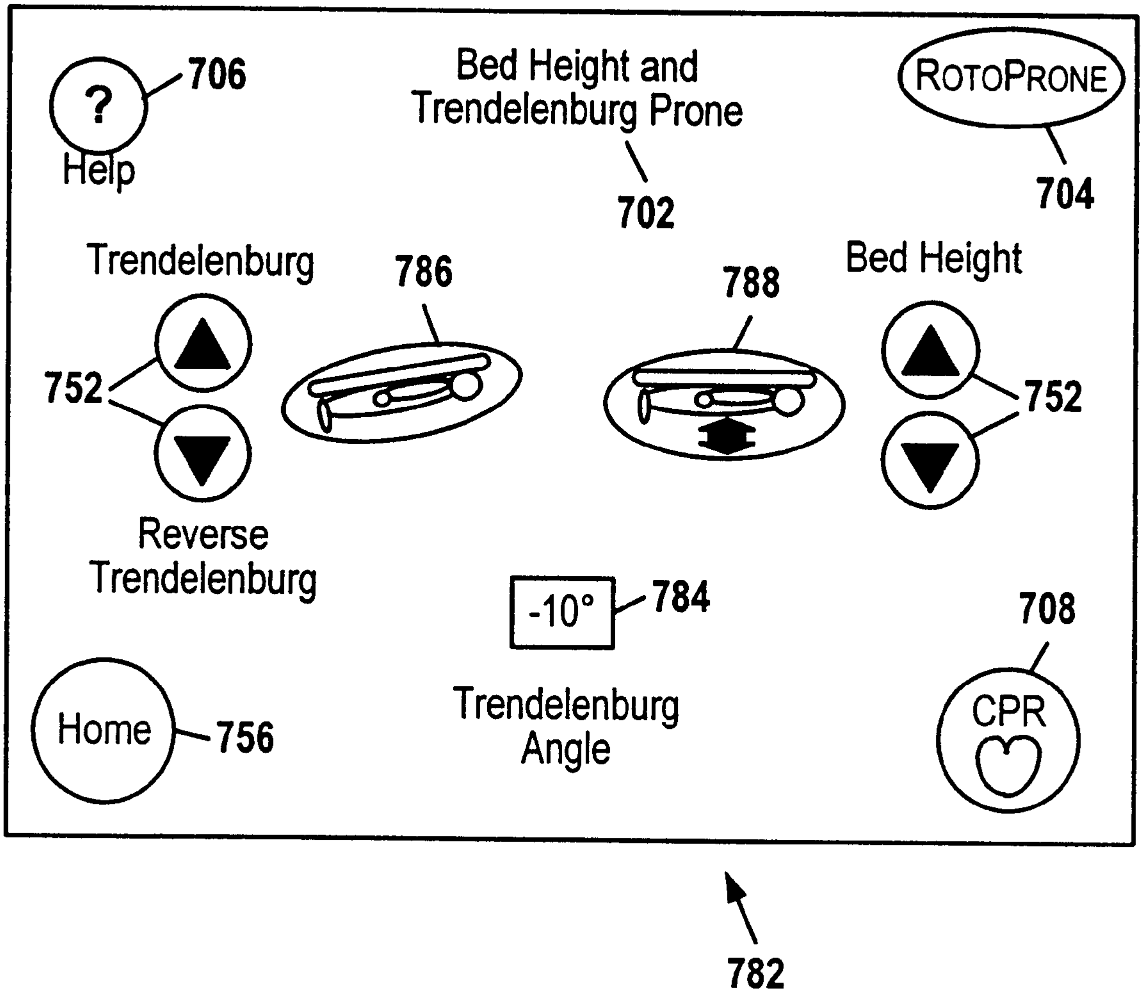
FIG. 40 illustrates a bed height/tilt screen of the touch screen interface of FIG. 35.

FIG. 40 illustrates a bed height/tilt screen 782 of the touch screen interface of FIG. 35. Like the scale functions screen 754, the bed height/tilt screen 782 displays the screen caption 702, logo 704, help button 706, CPR button 708, and home button 756. The bed height/tilt screen also displays graphics 786 and 788 illustrating the Trendelenburg tilt and overall height of the therapeutic bed 10. A text area 784 displays the current Trendelenburg angle. Pairs of increase and decrease buttons 752 are provided to modify the Trendelenburg angle and overall elevation of the therapeutic bed.

Figure 41:
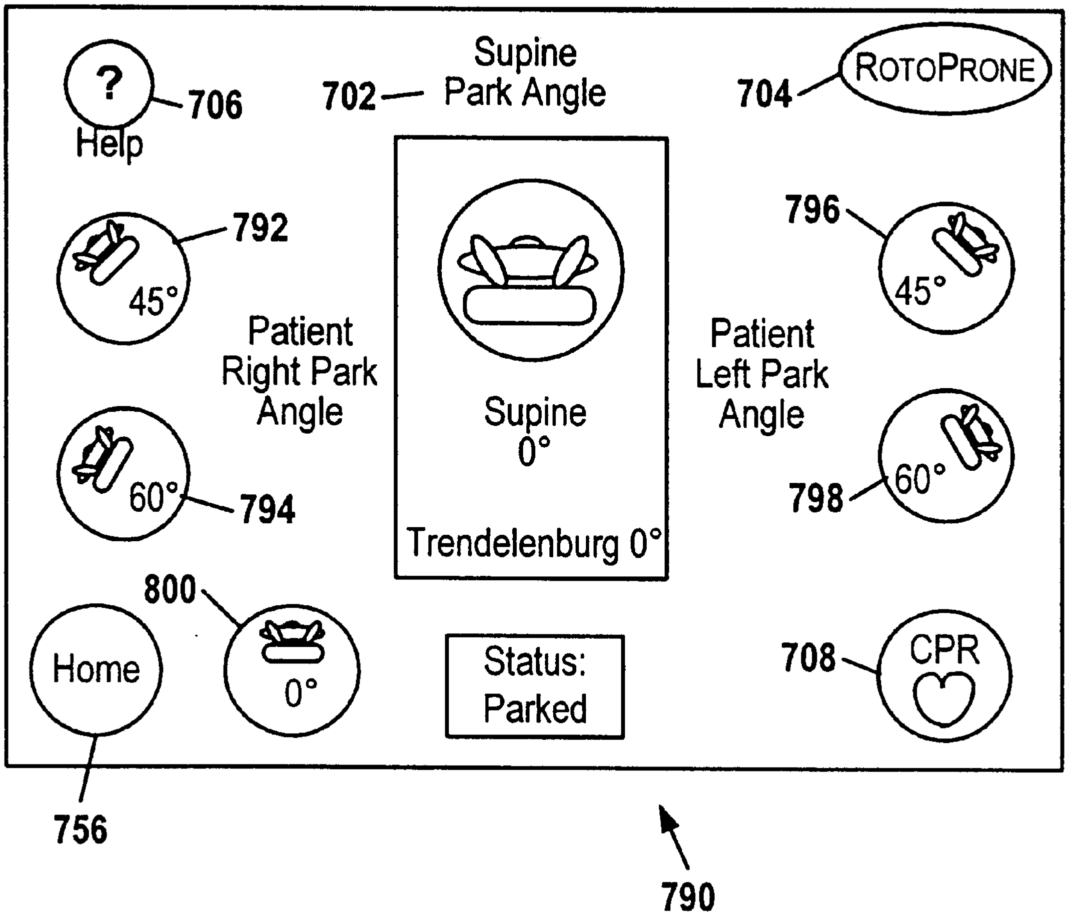
FIG. 41 illustrates a supine park angle screen of the touch screen interface of FIG. 35.

FIG. 41 illustrates a supine park angle screen 790 of the touch screen interface of FIG. 35. Like the scale functions screen 754, the supine park angle screen 790 displays the screen caption 702, logo 704, help button 706, CPR button 708, and home button 756. Selectable park angle buttons 792, 794, 796, 798, and 800 are provided to rotate the patient support platform 20 into one of several different standard park angles. An additional button or interface screen (not shown) may be provided to select a park angle other than 0 degrees, 45 degrees, or 60 degrees. Although not illustrated here, preferably a screen is provided that is similar to the supine park angle screen 790 to select a prone park angle.

FIG. 42 illustrates a therapy meters screen 802 of the touch screen interface of FIG. 35. Like the scale functions screen 754, the therapy meters screen 790 displays the screen caption 702, logo 704, help button 706, CPR button 708, and home button 756. The therapy meters screen 802 displays the total time on the bed 804 and a table 806 displaying the total current day's and cumulative time spent in prone therapy, therapy greater than 40 degrees prone, supine therapy, and supine greater than 40 degrees prone.

Figure 43:
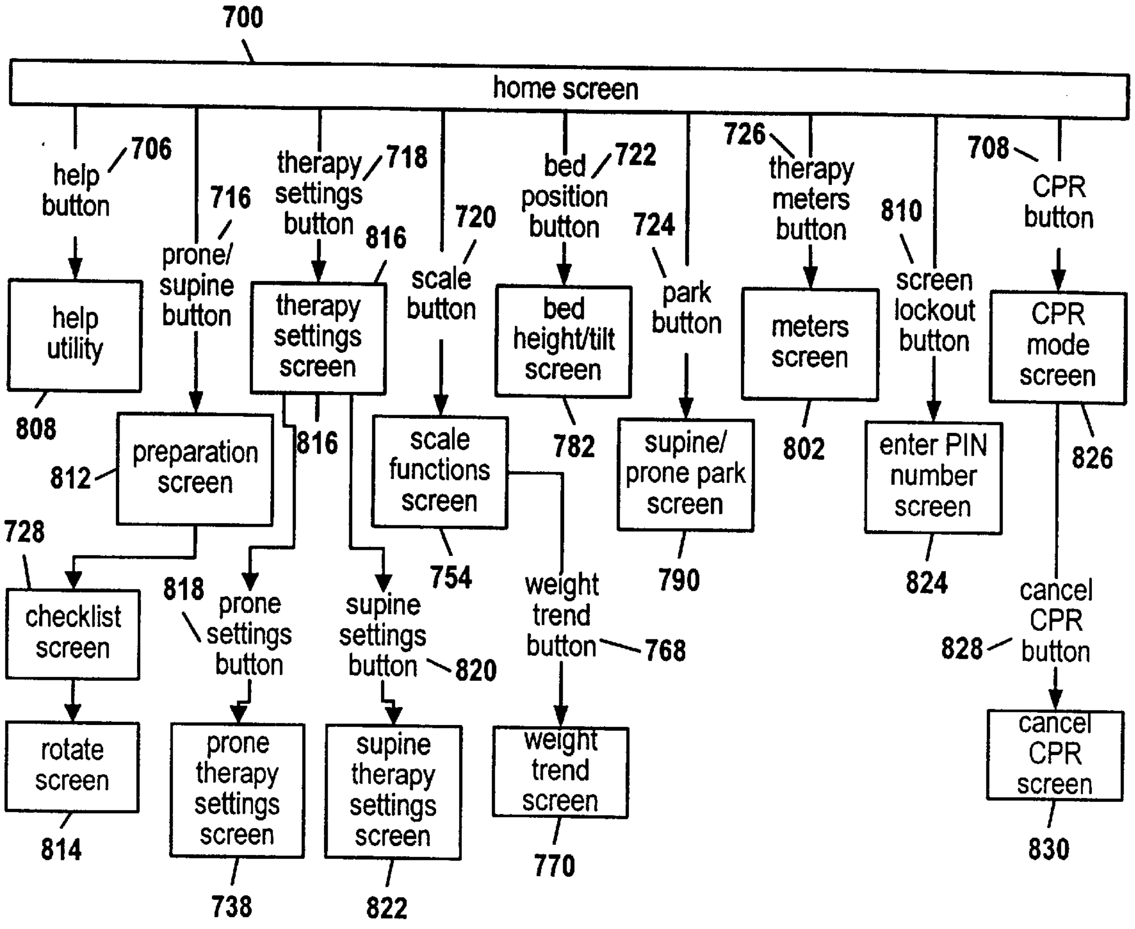
FIG. 43 is a functional flow diagram of the touch screen interface of FIGS. 35–42.

FIG. 43 is a flow diagram of the touch screen interface of FIGS. 35–42 showing the logical transition from the home screen 700 to other screens for controlling and monitoring the functions of the therapeutic bed 10. Selecting the help button 706 on the home screen 700 or any of the other screens 728, 738, 754, 770, 782, 790 or 802 activates a help utility 808. Selecting the prone/supine button 716 prompts the display of a preparation screen 812 as the patient support platform 20 rotates to a position amenable for checking the tubing, head support, abdomen support, and arm slings before rotating to prone or supine. The screen logic then flows to the prone checklist screen 728 (FIG. 36) or a similar supine checklist screen (not shown). When the checklisted procedures are completed, screen logic flows next to a rotate screen 814 and then back to the home screen 700.

Selecting the therapy settings button 718 invokes a therapy settings screen 816 having a prone settings selection button 818 and a supine settings selection button 820. Selecting the prone settings button 818 invokes the prone therapy settings screen 738 (FIG. 37). Selecting the supine settings button invokes a supine therapy settings screen 822 similar to the prone therapy settings screen 738.

Selecting the scale button 720 invokes the scale functions screen 754 (FIG. 38). Selecting the weight trend button 768 invokes the weight trend screen 770 (FIG. 39). Selecting the bed position button 722 invokes the bed height/tilt screen 782 (FIG. 40). Selecting the park button 724 invokes the supine park angle screen 790 (FIG. 41) if the bed is in a supine orientation, or a prone park angle screen (not shown) similar to the supine park angle screen 790 if the bed is in a prone orientation. Selecting the therapy meters button 726 invokes the therapy meters screen 802 (FIG. 42). Selecting the screen lockout button 810 invokes a password dialog box or screen 824 for deactivating or reactivating the touch screen interface.

Selecting the CPR button 708 on any of screens 700, 728, 738, 754, 770, 782, 790 or 802 invokes a CPR mode screen

826, which displays graphics and text areas illustrating the movement of the patient support platform 20 to the lowest flat supine position possible. The CPR mode screen 826 provides a cancel CPR button 828, which, if selected, invokes a cancel CPR screen 830 indicating the termination of the automated CPR function.

FIG. 44 illustrates a data matrix 840 for use by technicians to diagnose the bed. The data matrix 840 summarizes current instrumentation readings and data stored in memory, including matrix data filenames, past therapy provided, current therapy settings, current bed status (e.g., locked, unlocked, angular position, lock pin status, instrumentation readings), and the patient's weight trend. The data matrix 840 shown in FIG. 44 is illustrative and not exhaustive. Preferably, the touchscreen interface of FIG. 35 is operable to display the data matrix 840. Furthermore, the data matrix 840 may be exported through the data import/export interface 636 (FIG. 33) and sent to a technician who can diagnose the bed functions remotely.

FIGS. 35–44 are illustrative of some, but not all, of the screens or bed functions that may be provided for every embodiment of the therapeutic bed 10. It would be a matter of ordinary skill in the art to adapt the present disclosure to provide additional screens and bed functions. It will be understood that all such adaptations, enhancements, and the like fall within the scope of the present invention.

The therapeutic bed 10 of the present invention is useful for rotating a patient from the supine to the prone position. Preferably, proning is provided in conjunction with regular oscillating therapy or frequent movements between different angular positions to intermittently relieve pressure on the dependent surfaces of the body. For example, rotating the patient support platform 20 from a first angular position to a second angular position at least 40 degrees from the first angular position at least every two hours may be adequate to minimize the risk of skin breakdown. To provide an additional pulmonary benefit, however, it is preferred that the patient support platform 20 be rotated back and forth across an arc of at least 80 degrees while in the prone position.

Using the therapeutic bed 10 of the present invention, rotational therapy may be paused for predetermined intervals of time when the patient support platform 20 reaches the right or left angle limits, or when the platform 20 reaches the zero degree prone position. In this manner, time spent in angles greater than 40 degrees can be increased, facilitating more secretion drainage from the lungs. For example, the patient support platform 20 can be operated to periodically pause during rotation at two to three discrete angular positions, where each of said two to three discrete angular positions is at least 40 degrees from the other of said two to three discrete angular positions, and where each pause is for a period of between fifteen seconds and ten minutes. Furthermore, rotation between one of said discrete angular positions to another of said two to three angular positions might occur at least every fifteen minutes, in order to periodically alleviate pressure from the weight-bearing surfaces of the body. This will mimic the repositioning behavior of healthy sleeping adults, which studies have shown reposition themselves about once every 11.6 minutes.

In operation, lateral rotational therapy in the prone position is preferably provided by rotating the patient support platform 20 no faster than 2 degrees per second in order to minimize stimulation of the vestibular system. Some patients may tolerate faster speeds. Slower speeds, such as 1 degree per second or less, may be indicated for patients suffering severe vestibular abnormalities. Accordingly, the therapeutic bed of the present invention provides an acclimate function that permits an operator to fully adjust the rotational speed of the patient support platform 20.

Prone therapy is preferably provided in conjunction with kinetic therapy using an arc of rotation of at least 80 degrees. For example, the patient support platform 20 may be rotated from the prone position to a vertical (90 degree) position, back to the opposite (−90 degree) vertical position, and so forth. Alternatively, the patient support platform 20 may be rotated from the prone position all the way to the supine position, and then the rotation is reversed for 360 degrees until the platform 20 again reaches the supine position, and so forth. For patients with acute lung injury or ARDS, kinetic therapy in the prone position is preferably provided at least about 18 out of every 24 hours.

Angle limit modifications should be made for persons with injuries or fractures on one side of the body. For example, if one of patient's two lungs is more compromised than the other, rotation should be programmed to favor drainage away from the compromised lung. If the left lung is the more compromised lung, rotation should favor the right in order to place the "right lung" down. Preferably, the patient support platform 20 is paused at the right angle limit to maintain optimal oxygenation. Such therapy should be continued until the unilateral problem begins to resolve itself, at which point the patient support platform 20 can begin to be turned to the left side. Thereafter, the patient can be gradually acclimated to bilateral rotation by gradually increasing the left angle limits and left angle pause time every 2–4 hours until they match those given on the right. Also, patients with vestibular dysfunctions may be acclimated to kinetic therapy by gradually increasing the arc of oscillation from 0 degrees to preset angle of oscillation.

Also, kinetic therapy may be provided in conjunction with both the prone and supine positions. For example, a patient may be provided kinetic therapy in the supine position for a first interval of time (preferably for 1–6 hours), followed by prone therapy in the prone position for a second interval of time (again, preferably from 1–6 hours), and then returned to the supine position for further kinetic therapy. Such kinetic therapy may be punctuated by periods of static rest in the supine or prone positions.

A number of criteria may indicate that a course of kinetic therapy has accomplished its mission and may be discontinued. If the patient's perfusion to ventilation ratio rises above 250 for 24 hours and shows an upward trend, if the patient is extubated due to improvement, or if the patient becomes mobile or can sit up in a chair more three times a day for at least an hour each time, kinetic therapy may be discontinued.

Although the foregoing specific details describe a preferred embodiment of this invention, persons reasonably skilled in the art will recognize that various changes may be made in the details of the method and apparatus of this invention without departing from the spirit and scope of the invention as defined in the appended claims. Therefore, it should be understood that this invention is not to be limited to the specific details shown and described herein.

I claim:

1. A therapeutic patient support apparatus comprising:

a movable patient support surface;

a machine that supplies mechanical energy to move the patient support surface;

a computer to control the movement of the patient support surface;

a controller communicatively coupled to the computer and operatively coupled to the machine, the controller being operable to enable or disable the machine;

a first data connection between the computer and the controller; and a second data connection between the computer and the controller, the second data connection being independent of the first data connection;

wherein the controller is configured to disable the machine unless it receives enabling data signals through both the first data connection and the second data connection.

2. The therapeutic patient support apparatus of claim 1, wherein the first data connection is a serial data connection.

3. The therapeutic patient support apparatus of claim 2, wherein the controller is configured to disable the machine unless it receives a sequence of serial enable signals from the computer.

4. The therapeutic patient support of claim 2, wherein the controller is configured to disable the machine unless it receives a sequence of serial enable signals from the computer at regular intervals.

5. The therapeutic patient support apparatus of claim 4, wherein the second data connection is a parallel data connection.

6. The therapeutic patient support apparatus of claim 2, wherein the second data connection is a parallel data connection.

7. The therapeutic patient support apparatus of claim 1, wherein the second data connection is a parallel data connection.

8. A therapeutic bed comprising:

a base;

a patient support surface mounted on the base and movable with respect to the base;

a motor that supplies mechanical energy to move the patient support surface;

a computer to control the movement of the patient support surface;

a controller communicatively coupled to the computer and operatively coupled to the motor, the controller being operable to enable or disable the motor;

a first data connection between the computer and the controller; and a second data connection between the computer and the controller, the second data connection being independent of the first data connection;

wherein the controller is configured to disable the motor unless it receives enabling data signals through both the first data connection and the second data connection.

9. The therapeutic bed of claim 8, wherein the first data connection is a serial data connection.

10. The therapeutic bed of claim 9, wherein the controller is configured to disable the motor unless it a receives a sequence of serial enable signals from the computer.

11. The therapeutic bed of claim 9, wherein the controller is configured to disable the motor unless it a receives a sequence of serial enable signals from the computer at regular intervals.

12. The therapeutic bed of claim 11, wherein the second data connection is a parallel data connection.

13. The therapeutic bed of claim 9, wherein the second data connection is a parallel data connection.

14. The therapeutic bed of claim 8, wherein the second data connection is a parallel data connection.

15. A therapeutic bed comprising:

a base;

a patient support platform having a longitudinal rotational axis, the patient support platform being rotationally mounted on the base such that the patient support platform is capable of rotation about the longitudinal rotational axis;

a motor that supplies mechanical energy to move the patient support platform;

a computer to control the movement of the patient support platform;

a controller communicatively coupled to the computer and operatively coupled to the motor, the controller being operable to enable or disable the motor;

a first data connection between the computer and the controller; and a second data connection between the computer and the controller, the second data connection being independent of the first data connection;

wherein the controller is configured to disable the motor unless it receives enabling data signals through both the first data connection and the second data connection.

16. The therapeutic bed of claim 15, wherein the first data connection is a serial data connection.

17. The therapeutic bed of claim 16, wherein the controller is configured to disable the motor unless it receives a sequence of serial enable signals from the computer.

18. The therapeutic bed of claim 16, wherein the controller is configured to disable the motor unless it receives a sequence of serial enable signals from the computer at regular intervals.

19. The therapeutic bed of claim 18, wherein the second data connection is a parallel data connection.

20. The therapeutic bed of claim 16, wherein the second data connection is a parallel data connection.

21. The therapeutic bed of claim 15, wherein the second data connection is a parallel data connection.

22. The therapeutic bed of claim 15, wherein the motor comprises a rotating shaft and a brake proximate to the shaft; and wherein the controller is operable to disable the motor by causing the brake to impede rotation of the shaft.

23. A therapeutic patient support apparatus comprising:

a movable patient support surface;

a motor that supplies mechanical energy to move the patient support surface;

a computer to control the movement of the patient support surface;

means for disabling the motor;

a first data connection between the computer and the disabling means; and a second data connection between the computer and the disabling means, the second data connection being independent of the first data connection;

wherein the disabling means is configured to disable the motor unless it receives enabling data signals through both the first data connection and the second data connection.

24. The therapeutic patient support apparatus of claim 23, wherein the first data connection is a serial data connection.

25. The therapeutic patient support apparatus of claim 24, wherein the controller is configured to disable the motor unless it receives a sequence of serial enable signals from the computer.

26. The therapeutic patient support apparatus of claim 25, wherein the second data connection is a parallel data connection.

27. The therapeutic patient support apparatus of claim 24, wherein the controller is configured to disable the motor unless it receives a sequence of serial enable signals from the computer at regular intervals.

28. The therapeutic patient support apparatus of claim 27, wherein the disabling means comprises a controller operatively coupled to the motor.

29. The therapeutic patient support apparatus of claim 24, wherein the second data connection is a parallel data connection.

30. The therapeutic patient support apparatus of claim 23, wherein the second data connection is a parallel data connection.

31. The therapeutic patient support apparatus of claim 23, wherein the motor comprises a motor having a rotating shaft and the means for disabling the motor comprises an electromagnetic brake proximate to the shaft.

* * * * *